US012237752B2

(12) United States Patent
Todeschini Hilgert et al.

(10) Patent No.: US 12,237,752 B2
(45) Date of Patent: Feb. 25, 2025

(54) LINEAR ELECTRIC DEVICE

(71) Applicant: HTS LLC, Houston, TX (US)

(72) Inventors: Carlos Marcelo Todeschini Hilgert, Bento Goncalves (BR); Gustavo Ludwig Schneider, Rio de Janeiro (BR)

(73) Assignee: HTS LLC, Houston, TX (US)

( * ) Notice: Subject to any disclaimer, the term of this patent is extended or adjusted under 35 U.S.C. 154(b) by 311 days.

(21) Appl. No.: 17/762,294

(22) PCT Filed: Sep. 18, 2020

(86) PCT No.: PCT/US2020/051417
§ 371 (c)(1),
(2) Date: Mar. 21, 2022

(87) PCT Pub. No.: WO2021/055695
PCT Pub. Date: Mar. 25, 2021

(65) Prior Publication Data
US 2022/0345004 A1 Oct. 27, 2022

Related U.S. Application Data

(60) Provisional application No. 62/903,463, filed on Sep. 20, 2019.

(51) Int. Cl.
*H02K 7/07* (2006.01)
*F16H 25/12* (2006.01)
(Continued)

(52) U.S. Cl.
CPC ........... *H02K 7/075* (2013.01); *F16H 25/125* (2013.01); *F16H 53/02* (2013.01); *H02K 1/18* (2013.01);
(Continued)

(58) Field of Classification Search
CPC ............ F02B 2075/1808; F02B 63/041; F02B 63/043; F02B 75/24; F02B 75/26;
(Continued)

(56) References Cited

U.S. PATENT DOCUMENTS 2,206,667 A * 7/1940 Field ...................... H02K 25/00
310/46
3,132,290 A * 5/1964 Kumpf ...................... H01F 7/08
335/254
(Continued)

OTHER PUBLICATIONS

International Search Report and Written Opinion issued for International Patent Application No. PCT/US2020/051417, dated Dec. 8, 2020, 16 pages, ISA/US.

*Primary Examiner* — Naishadh N Desai
(74) *Attorney, Agent, or Firm* — Haynes and Boone, LLP; Mark A. Tidwell

(57) ABSTRACT

An electric device has a driveshaft with at least one stator cylinder positioned between opposing, curvilinear shaped cams mounted on the driveshaft, where the center axis of the stator cylinder is parallel with but spaced apart from the driveshaft axis. A magnet assembly is disposed in each end of the stator cylinder, with one magnet assembly engaging one cam and the other magnet assembly engaging the other cam. Each magnet assembly includes a cam follower that can move along a curvilinear shaped cam. A magnet slide arm attached to the cam reciprocates magnets carried on the magnet slide arm through electromagnetic windings disposed around the stator cylinder. An electrical input delivered to the windings can reciprocate the arm, driving the cams to rotate the driveshaft. Alternatively, rotation of the driveshaft can be used to reciprocate the arm to induce electric current in the windings.

19 Claims, 28 Drawing Sheets

(51) Int. Cl.

| | | |
|---|---|---|
| *F16H 53/02* | (2006.01) | |
| *H02K 1/18* | (2006.01) | |
| *H02K 7/00* | (2006.01) | |
| *H02K 7/075* | (2006.01) | |
| *H02K 7/18* | (2006.01) | |
| *H02K 16/04* | (2006.01) | |
| *H02K 33/16* | (2006.01) | |
| *F02B 63/04* | (2006.01) | |
| *F02B 75/18* | (2006.01) | |
| *F02B 75/24* | (2006.01) | |
| *F02B 75/26* | (2006.01) | |
| *F02B 75/28* | (2006.01) | |
| *F02B 75/32* | (2006.01) | |

(52) U.S. Cl.
CPC ........... *H02K 7/006* (2013.01); *H02K 7/1876* (2013.01); *H02K 16/04* (2013.01); *H02K 33/16* (2013.01); *F02B 63/041* (2013.01); *F02B 63/043* (2013.01); *F02B 2075/1808* (2013.01); *F02B 75/24* (2013.01); *F02B 75/26* (2013.01); *F02B 75/28* (2013.01); *F02B 75/282* (2013.01); *F02B 75/32* (2013.01)

(58) Field of Classification Search
CPC ........ F02B 75/28; F02B 75/282; F02B 75/32; F16H 25/125; F16H 53/02; H02K 1/18; H02K 16/00; H02K 16/04; H02K 33/16; H02K 7/006; H02K 7/06; H02K 7/075; H02K 7/1876; C21D 8/1261; H01F 1/0306; H01F 1/047; H01F 1/147; H03K 19/0013; H03K 19/018507; H03K 19/018521; H03K 19/018571; G11C 5/147; G11C 7/06; G11C 7/12; G11C 8/08

See application file for complete search history.

(56) References Cited

U.S. PATENT DOCUMENTS

| | | | |
|---|---|---|---|
| 6,048,288 A * | 4/2000 | Tsujii | ............... B60W 10/30 |
| | | | 903/910 |
| 7,654,234 B2 * | 2/2010 | Polt | .................. F02B 75/32 |
| | | | 123/56.1 |
| 2006/0108886 A1 | 5/2006 | Kehr et al. | |
| 2007/0193555 A1 * | 8/2007 | Polt | .................. F01B 3/04 |
| | | | 123/43 AA |
| 2008/0247897 A1 | 10/2008 | Guthrie | |
| 2016/0025002 A1 * | 1/2016 | Ellis | ................... F01L 5/20 |
| | | | 123/51 R |
| 2018/0323673 A1 | 11/2018 | Shiraki et al. | |

* cited by examiner

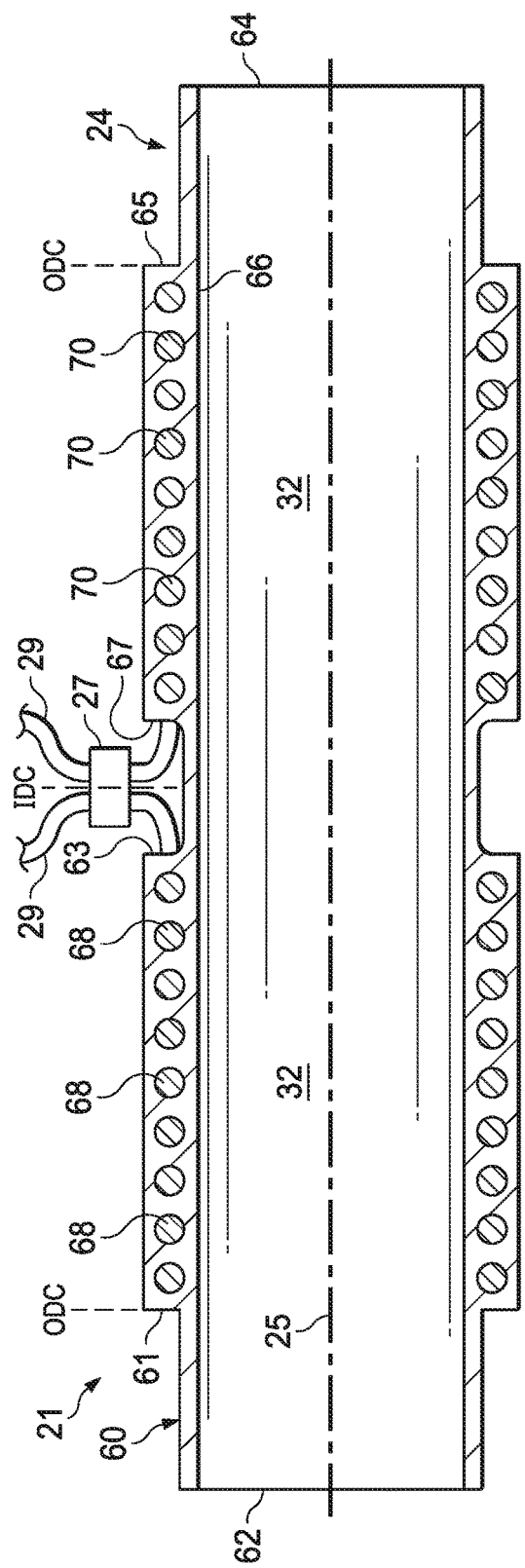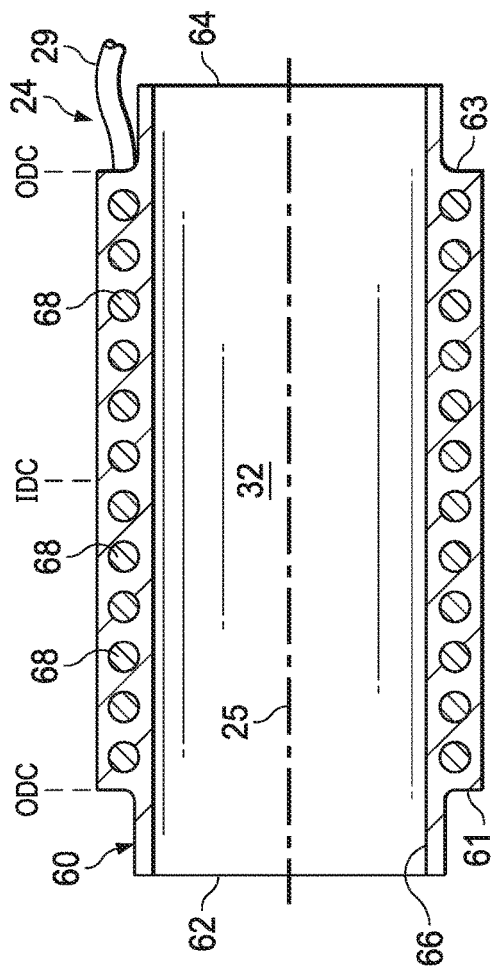
Fig. 3a
Fig. 3b

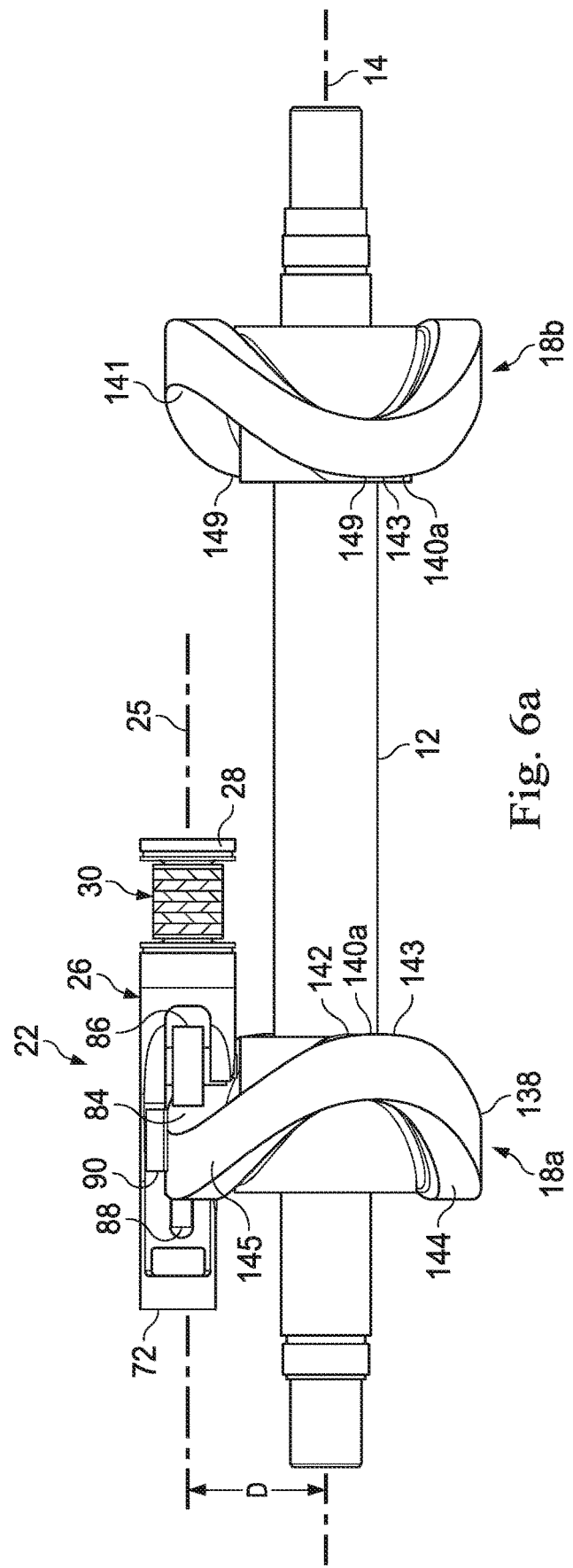

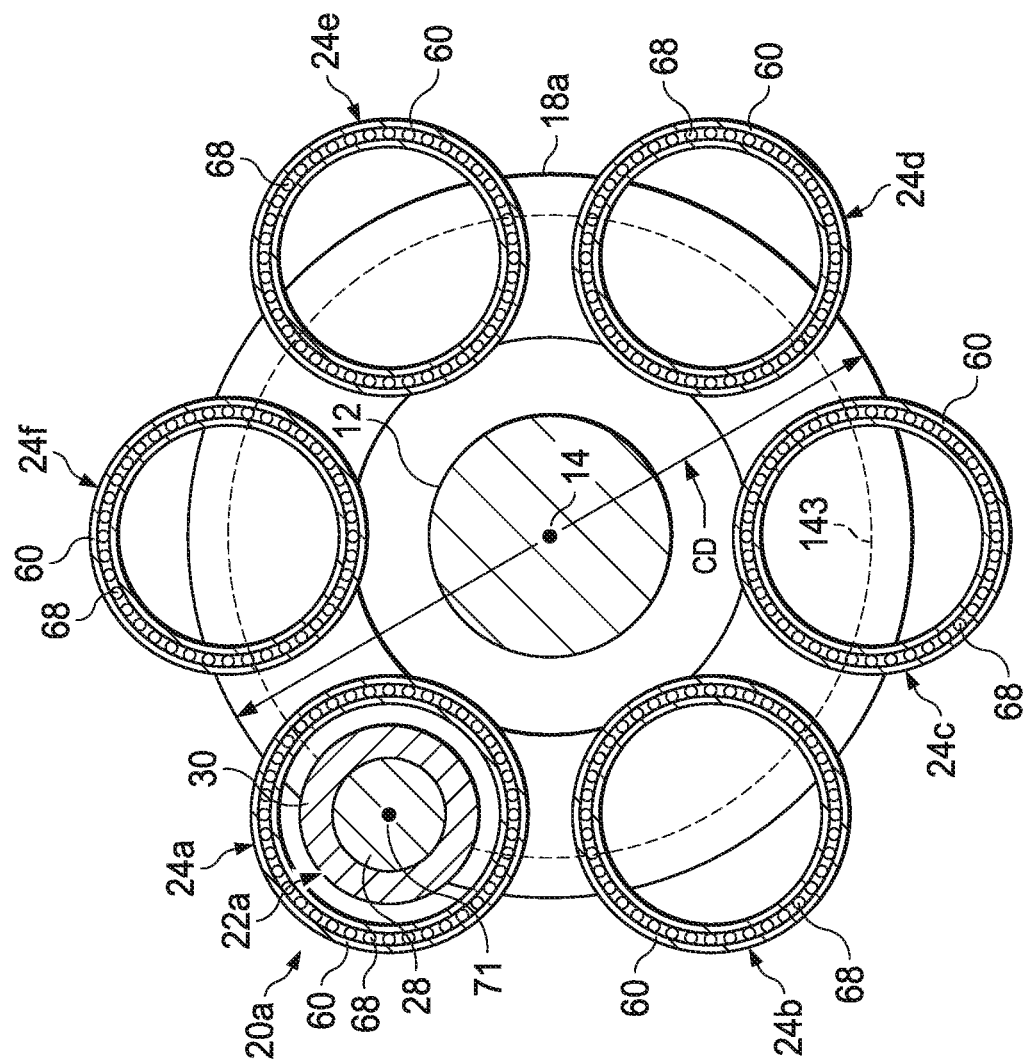

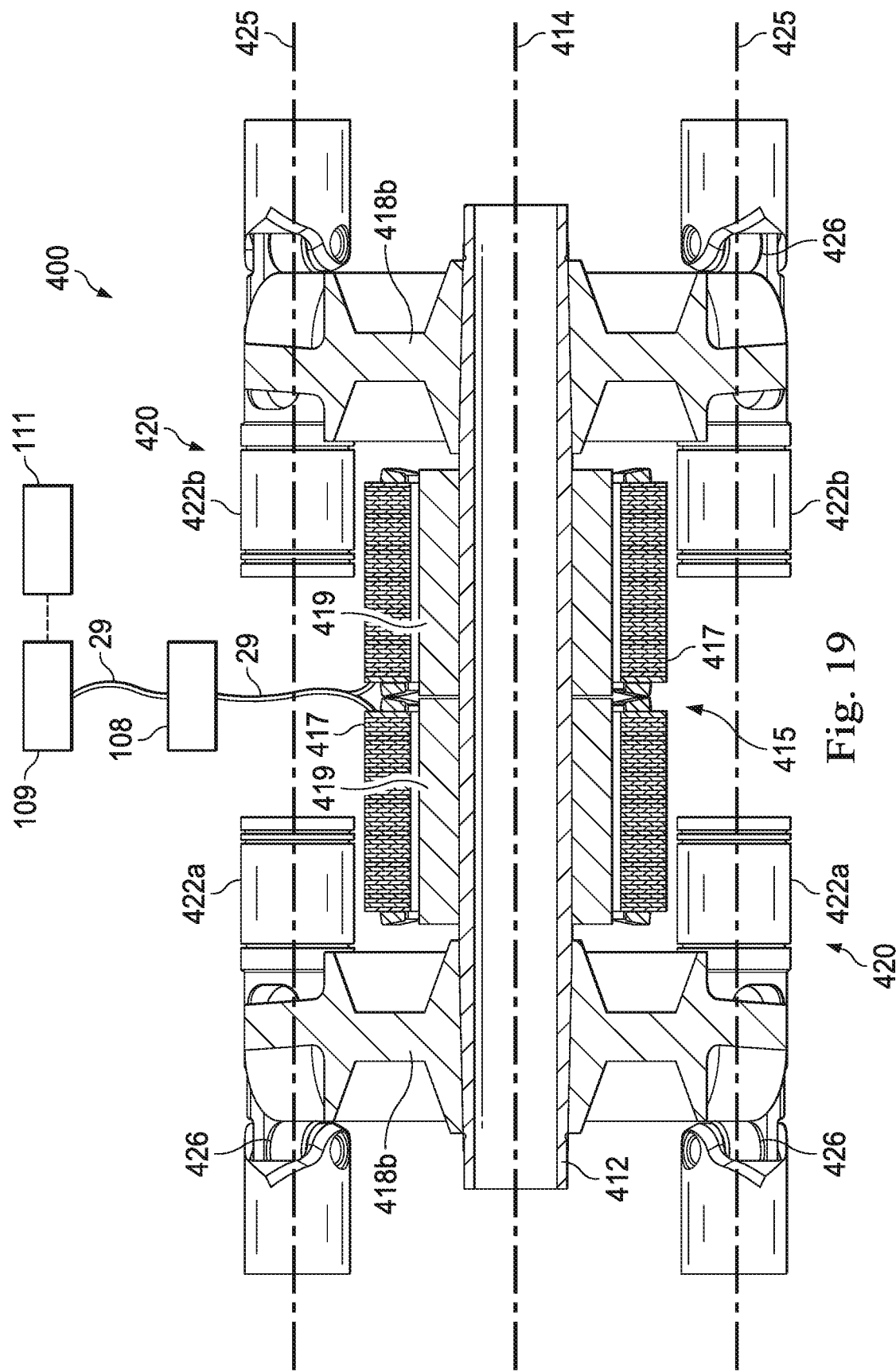

LINEAR ELECTRIC DEVICE

PRIORITY CLAIM

This application claims the benefit of priority to PCT/US2020/051417, filed on Sep. 18, 2020, which claims priority to U.S. Provisional Application No. 62/903,463, filed Sep. 20, 2019. The disclosure of each of these applications is hereby incorporated by reference in its entirety.

TECHNICAL FIELD OF THE INVENTION

The present disclosure relates to electrical devices, and more particularly to a linear electric alternator and linear electric motor where reciprocating movement of a rotor relative to a stator is linked to rotational movement of a shaped cam mounted on a driveshaft, wherein the shape of the cams can be utilized to alter the output of the electrical device.

BRIEF DESCRIPTION OF THE DRAWINGS

For a more complete understanding of the present disclosure and the advantages thereof, reference is now made to the following brief description, taken in connection with the accompanying drawings and detailed description:

FIG. 3a is an elevation view of one embodiment of a cylindrical coil assembly;

FIG. 3b is an elevation view of another embodiment of a cylindrical coil assembly;

FIG. 6a-6d are elevation views of embodiments of magnet assemblies engaging harmonic cams;

FIG. 7b is a cut away axial view of six stator cylinder assemblies deployed about a driveshaft;

FIG. 8 is a perspective view of a support block for the electric device of FIG. 7a;

FIG. 19 is a section view of the electric device of FIG. 17.

DETAILED DESCRIPTION OF THE EMBODIMENTS

Figure 1:
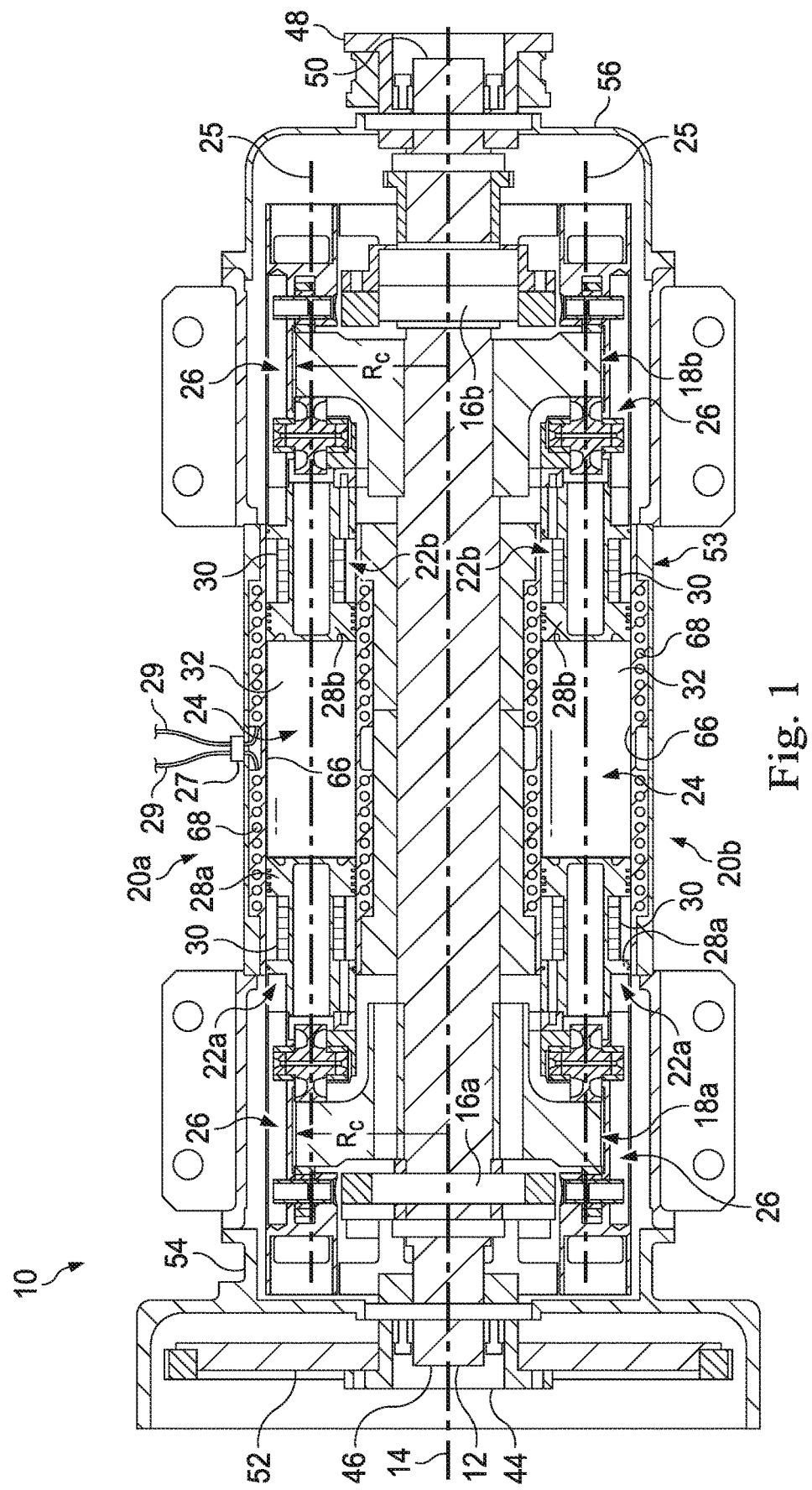
FIG. 1 is a sectional elevation view of a linear electric device constructed according to the present invention showing a cylindrical coil assembly in which opposed, magnets linearly translated by harmonic cams.
Figure 2:
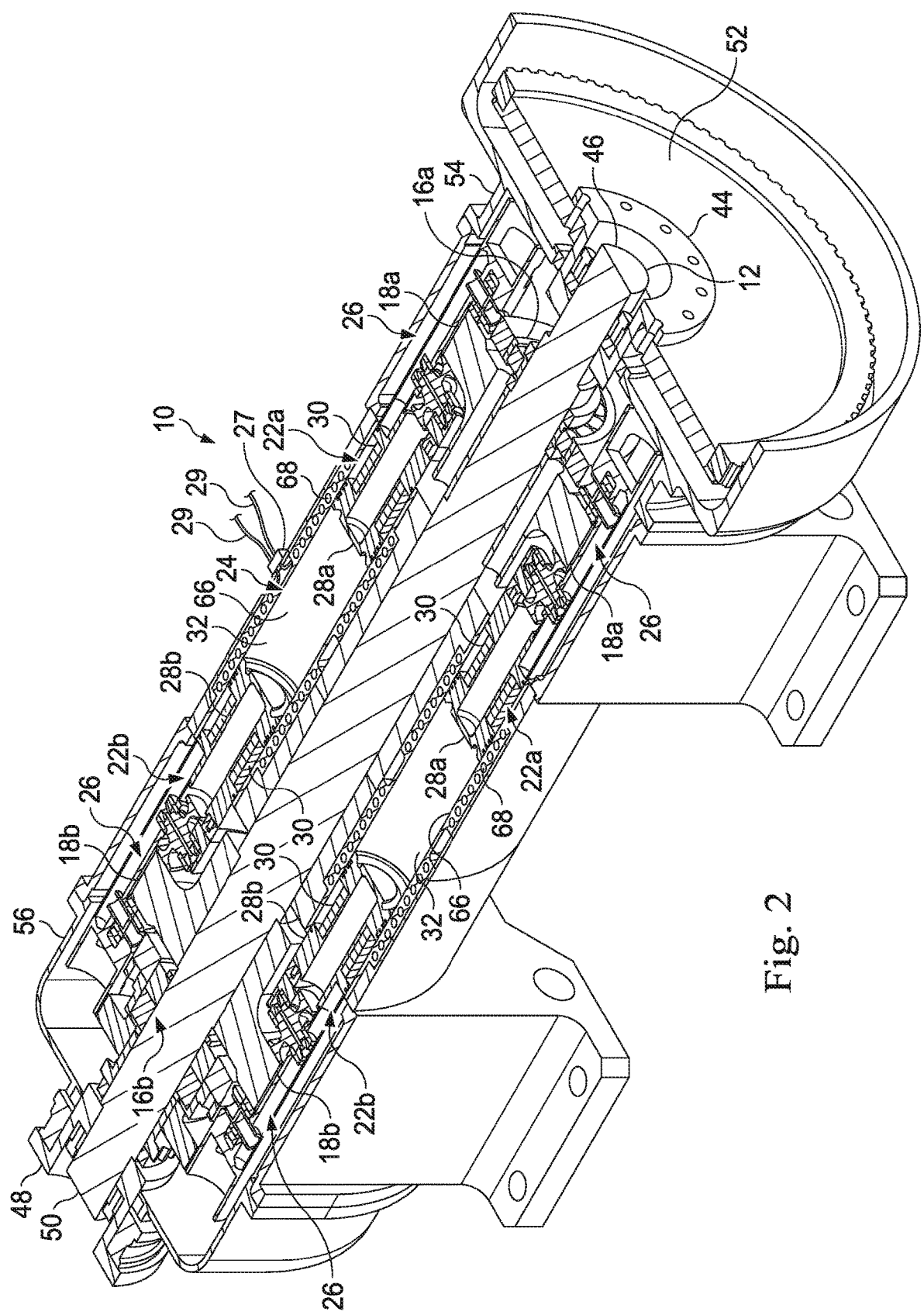
FIG. 2 is a perspective view of the linear electric device of FIG. 1.

FIG. 1 shows a sectional elevation view of an electric device 10, while FIG. 2 shows a perspective view of electric device 10. In one or more embodiments, electric device 10 is an electrical alternator while in other embodiments, electric device 10 is an electrical motor. For ease of description, electric device 10 will be described as a linear electric alternator to generate an electric output based on rotation of a driveshaft 12 by an outside source, however, it will be appreciated that electric device 10 may alternatively be provided with an electric input in order to drive driveshaft 12 as an electric motor. In any event, a driveshaft 12 extends along a driveshaft axis 14 and passes axially through the center of the linear electric alternator assembly 10. Driveshaft 12 is supported by a pair of bearings 16a, 16b in a fixed axial position. Positioned along driveshaft 12 is at least one harmonic cam 18 with a cam radius $R_c$. In one or more embodiments, positioned along driveshaft 12 in spaced apart relationship to one another are two harmonic cams 18a, 18b. Positioned radially outward from driveshaft 12 is at least one power generation assembly 20, which power generation assembly 20 may generally be positioned adjacent the outer periphery of a cam 18 at approximately the cam radius $R_c$. Each power generation assembly 20 has a magnet assembly 22 and a coil assembly 21 axially aligned with one another along a coil assembly axis 25, wherein at least a portion of the magnet assembly 22 is reciprocatingly disposed within a stator cylinder assembly 24 of the coil assembly 21. In one or more embodiments, such as in the illustrated embodiment, a portion of each of a first magnet assembly 22a and second magnet assembly 22b may be reciprocatingly disposed within coil assembly 21 along coil assembly axis 25. In one or more embodiments, such as in the illustrated embodiment, two power generation assemblies 20a, 20b are provided, each power generation assembly 20 having first and second magnet assemblies 22a, 22b. Each coil assembly 21 is defined along coil assembly axis 25 and includes a stator cylinder assembly 24 having a stator cylinder 60 along which is radially disposed at least one electromagnetic windings or coil 68. Windings 68 may connect to an electrical terminal 27 from which one or more leads 29 extend. Coil assembly axis 25 is spaced apart from but generally parallel with driveshaft axis 14 of driveshaft 12. Each magnet assembly 22 generally includes a cam follower assembly 26 attached to a magnet slide arm 28, which may be any reciprocatable member, such as a magnet slide or yolk, to which is mounted a magnet 30. In one or more embodiments, magnet 30 is one or more permanent magnets. In such embodiments, magnet 30 may be a plurality of discreet permanent magnets arranged to have alternating polarities. In other embodiments, magnet 30 may be an electromagnet formed of energizable electromagnetic windings or coil. In embodiments with first and second magnet assemblies 22a, 22b, the respective magnet slide arms 28a, 28b oppose one another in coil assembly 21 and are adapted in some embodiments to reciprocate along coil assembly axis 25, thereby causing the magnet 30 to induce a flow of electric current in windings 68. Each cam follower assembly 26 engages a corresponding cam 18 and acts on its associated magnet slide arm 28. A magnet slide chamber 32 is generally defined within coil assembly 21 and disposed to receive at least a portion of magnet slide arms 28a, 28b. Depending on the particular power output requirements of linear electric device 10, in some embodiments, movement of opposed magnet slide arms 28a, 28b may mirror one another, moving away from or towards each other during a stroke, while in other embodiments, movement of opposed magnet slide arms 28a, 28b may follow one another, moving in the same direction along coil assembly axis 25 during a stroke. In other embodiments, only a single cam 18 may be provided on driveshaft 12 and only a single magnet assembly 22 may be disposed within a coil assembly 21.

In one or more embodiments, linear electric device 10 includes at least two power generation assemblies 20 symmetrically spaced about driveshaft axis 14. In the illustrated embodiment, a first power generation assembly 20a and a second power generation assembly 20b are shown, each having a magnet assembly 22 and a coil assembly 21. In other embodiments, three or more power generation assemblies 20, each with a corresponding magnet assembly 22 and coil assembly 21, may be symmetrically spaced about driveshaft axis 14. Each coil assembly 21 may have either one or two magnet assemblies 22 disposed for reciprocating movement within the coil assembly 21.

Where linear electric device 10 is an alternator, as will be explained in more detail below, as driveshaft 12 is rotated by an external source (not shown), such as from an internal combustion electric alternator, wind turbine, water turbine or other rotary equipment, cam 18 is likewise rotated. As cam 18 rotates, the harmonic or undulating shape of cam 18 forces each cam follower assembly 26 engaging cam 18 to have a back and forth, linear movement. Moreover, because each cam follower assembly 26 is constrained within a stator cylinder 24, the linear movement is along coil assembly axis 25 within coil assembly 21. As such, rotational movement of cam 18 results in linear movement of cam follower assembly 26. Since cams 18 are fixedly mounted on driveshaft 12, cam 18 is rotated through an angle by driveshaft 12. The harmonic or undulating shape of cam 18, therefore determines the stroke of each magnet assembly 22, and in particular, the linear movement of magnet slide arm 28, within a stator cylinder 24 of coil assembly 21.

In one or more embodiments, a first flange 44 is attached to a first end 46 of driveshaft 12 and a second flange 48 is attached to a second end 50 of driveshaft 12. As shown, a flywheel 52 may be mounted on first flange 44.

The power generation assemblies 20 are mounted in a housing or enclosure 53. A sump casing 54 may be attached to the enclosure 53 adjacent the first end 46 of driveshaft 12 and a sump casing 56 may be attached to enclosure 53 adjacent the second end 50 of driveshaft 12.

FIG. 3a illustrates one embodiment of a coil assembly 21 disposed along a coil assembly axis 25. Specifically, coil assembly 21 has a stator cylinder assembly 24 formed of a stator cylinder 60 extending between a first end 62 and a second end 64 and generally formed of a cylinder wall 66. A first set of electromagnetic windings 68 is disposed along cylinder wall 66 between the first and second ends 62, 64. In one or more embodiments, the windings 68 may be one or more electric coils. In one or more embodiments, a second set of windings 70 may likewise be disposed along cylinder wall 66. In some embodiments, second set of windings 70 may be spaced apart from first set of windings 68, while in other embodiments, windings 68, 70 may abut one another. Although not necessary, in one or more embodiments, windings 68 extend around the full perimeter of cylinder wall 66. Windings 68 as described herein are not intended to be limited to a particular shape or configuration along cylinder wall 66, but may take any form known in the prior art and may generally include, but are not limited to, one or more wires which form loops perpendicular to coil assembly axis 25, parallel to coil assembly axis 25 or angled relative to coil assembly axis 25. In this regard, the coil density the first set of electromagnetic windings 68 may be the same as or different than the coil density the second set of electromagnetic windings 70. For example, the first set of electromagnetic windings 68 may have a first coil density and the second set of electromagnetic windings 70 may have a second coil density different than the first coil density. Windings 68 may connect to an electrical terminal 27 from which one or more leads 29 extend. Thus, where the electric device 10 is a linear electric alternator, persons of skill in the art will appreciate that leads 29 may be used to deliver an electrical output from windings 68, whereas, where the electric device 10 is an electric motor, persons of skill in the art will appreciate that leads 29 may be used to deliver an electrical input to windings 68, as described below.

In one or more embodiments, windings 68 have an outer winding edge 61 closest to the first end 62 and an inner winding edge 63 closest to second end 64. Similarly, windings 70 have an outer winding edge 65 closest to the second end 64 and an inner winding edge 67 closest to first end 62. Inner dead center (IDC) of the stator cylinder 60 is defined approximately equidistance between the outer edge 61 of windings 68 and the outer edge 65 of windings 70. In one or more embodiments, the inner winding edge 67 of windings 70 is closer to IDC than the inner winding edge 63 of windings, while the outer winding edge 65 of windings 70 is approximately the same distance from IDC as the outer winding edge 61 of windings 68. Moreover, outer dead center (ODC) of the stator cylinder 60 is defined approximately at the outer edges 61, 65 of the respective windings 68, 70. Magnet slide chamber 23 is defined within stator cylinder 60 between the outer edges 61, 65, and thus represents the portion of stator cylinder 60 where current is generated by movement of a magnet slide arm 28 therein.

FIG. 3b illustrates another embodiment of a coil assembly 21, where only a single set of windings 68 is carried by stator cylinder 60. Specifically, coil assembly 21 has a stator cylinder assembly 24 formed of a stator cylinder 60 extending between a first end 62 and a second end 64 and generally formed of a cylinder wall 66. Windings 68 are disposed along at least a portion of cylinder wall 66 between the first and second ends 62, 64. Windings 68 have a first outer winding edge 61 closest to the first end 62 and a second winding edge 63 closest to second end 64. IDC of the stator cylinder 60 of FIG. 3b is defined approximately equidistance between the outer edges 61 63 of windings 68. ODC of the stator cylinder 60 of FIG. 3b is defined approximately at the outer edges 61, 63 of windings 68. Windings 68 is shown as having leads 29 for electrical connection thereto. Coil assembly 21 may also be characterized as having a particular coil density of electromagnetic windings 68. It will be appreciated that in or more embodiments, where multiple coil assemblies 21 may be present in an electric device 10, the coil densities of the coil assemblies 21 may differ in order to permit greater output options for electric device 10, as described in more detail below.

One benefit to the above described electric device 10 is because of the manner in which forces are transferred from the driveshaft 12, to the cam 18 to the cam follower assembly 26, the forces are balanced with little torque placed on the components. For these reasons, lower strength, lower temperature materials may be used to manufacture certain components of electric device 10. Such materials may include plastics, ceramics, glass, composites or lighter metals, which also have the added benefit of reducing the overall weight of the electric device of the disclosure.

Figure 4A:
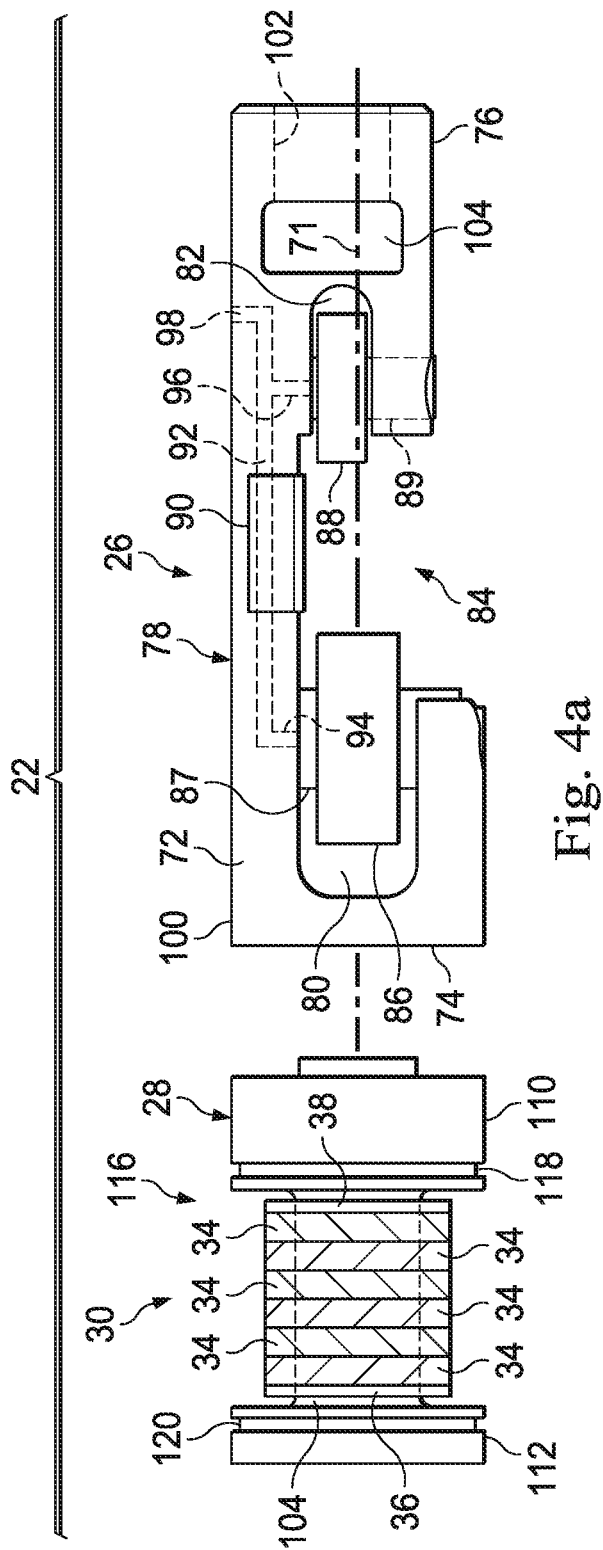
FIG. 4a is an exploded elevation view of a magnet assembly.

Turning to FIG. 4A, an exploded side view of a magnet assembly 22 is illustrated. Magnet assembly 22 generally includes a magnet slide arm 28 to which is mounted a magnet 30. Magnet assembly 22 is attached to a cam follower assembly 26 attached, all generally aligned along axis 71.

Cam follower assembly 26 is an elongated structure 72 having a first end 74 and a second end 76. A notch or opening 84 in structure 72 is formed between ends 74, 76, which notch or opening 84, as described herein, is disposed for receipt of a cam 18 and in particular, a cam shoulder 138 (see FIG. 5a). Each end 74, 76 may be a cylinder which ends 74, 76 may be interconnected by a cam follower arm 78. In some embodiments, cylindrical end 74 may be of a larger diameter than cylindrical end 76, while in other embodiments, cylinder ends 74, 76 may be of the same diameter. Cam follower arm 78 may be rigidly attached to each cylindrical end 74, 76, or pivotally attached to one or both cylindrical ends 74, 76. In this regard, elongated structure 72 may be a unitary body or may be formed of interconnected components, such as cylindrical ends 74, 76 interconnected by cam follower arm 78. In one or more embodiments, cam follower arm 78 is pivotally attached to cylindrical end 74 and rigidly fixed to cylindrical end 76. In one embodiment, cam follower arm 78 is pivotally attached to cylindrical first end 74 and pivotally attached to cylindrical second end 76, permitting at least one degree of freedom therebetween. In one or more embodiments, an axially extending slot 80 may be formed in first end 74 and an additional axially extending slot 82 may be formed in second end 76. First and second cylindrical ends 74, 76 may be interconnected by cam follower arm 78 so that slots 80, 82 are oriented to extend along planes that are generally parallel to one another. Cylindrical ends 74, 76 are spaced apart from one another by cam follower arm 78 to form opening 84 between slots 80, 82. In any event, cam follower assembly 26 may include at least one engagement mechanism 86 carried by the first end 74 and adjacent opening 84. In one or more embodiments, cam follower assembly 26 may include a first engagement mechanism 86 carried by the first end 74 and adjacent opening 84 and a second engagement mechanism 88 carried by the second end 76 and adjacent opening 84 so that the first and second engagement mechanisms 86, 88 oppose one another. Engagement mechanisms 86, 88 may be mounted on their respective ends 74, 76 so as to extend into opening 84. The opposing engagement mechanisms 86, 88 are disposed to clamp, bear against or otherwise engage the harmonic surface of cam 18. In one embodiments, engagement mechanisms 86, 88 may be rollers that are mounted in above described slots 80, 82 and at least partially extend into opening 84. Thus, in FIG. 4a, a first roller 86 is mounted in first slot 80, and a second roller 88 is mounted in second slot 82. Preferably, each roller has a rotational axis that is generally parallel with the rotational axis of the other roller and which axii are generally perpendicular to the planes along which the slots 80, 82 are formed. In one embodiment, roller 86 is of a larger diameter than roller 88 because roller 86 is utilized primarily to transfer the load to magnet slide. An adjustable spacer 90 may be mounted on arm 78 between rollers 86, 88 and opening 84. Spacer 90 is adjustable to move radially relative to combined assembly axis 71, towards or away from opening 84 in order to align cam follower assembly 26 with a cam 18. In one embodiment, adjustable spacer 90 may be a pad that bears against outer surface 145. An internal lubrication passage 92 may be defined and extend within arm 78. Lubrication passage 92 is in fluid communication with a port 94 opening adjacent roller 86 so as to lubricate the bearings 87 of roller 86; a port 96 opening adjacent roller 88 so as to lubricate the bearings 89 of roller 88; and a port 98 disposed along the outer surface 100 of arm 78. Cylindrically shaped second end 76 of cam follower assembly 26 may have a bore 102 formed therein, and may have one or more windows 103 opening into bore 102.

While the engagement mechanisms 86, 88 of cam follower assembly 26 have generally been described as rollers in some embodiments, it will be appreciated that the engagement mechanisms 86, 88 of cam follower assembly 26 can be any structure that is disposed to bear against, ride along or otherwise engaged one or more surfaces of harmonic cam 18. For example, rollers 86, 88 and slots 80, 82 may be replaced with opposing pads (not shown) that clasp opposite surface of cam 18. In this regard, elongated structure 72 of cam follower assembly 26 may simply be an elongated body having a first end 74 and a second end 76 with a radially extending notch or opening 84 formed in elongated structure 72 between the two ends but without the additional slots 80, 82. In this embodiment, one or more engagement mechanisms 86, 88 may be mounted in the radially extending notch 84 to engage a cam 18.

Magnet slide arm 28 is attached to cam follower assembly 26 at the first end 74 of structure 72. Disposed on magnet slide arm 28 is a magnet 30. In one or more embodiments, magnet 30 is a permanent magnet. In other embodiments, magnet 30 may be electromagnetic windings or coil. Although not limited to a particular shape, in one or more embodiments, magnet slide arm 28 is a central rod or shaft 104 on which magnet 30 is mounted. In one or more embodiments, magnet slide arm 28 may be formed of a first annular guide body 110 spaced apart from a second annular guide body 112 of similar diameters and interconnected by shaft 104. Shaft 104 may be solid or have a bore formed therein, but is of a smaller diameter than annular guide bodies 110, 112 so as to form an annulus 116 between the spaced apart annular guide bodies 110, 112. At least one, and preferably two or more, annular grooves 118 may be formed around first annular guide body 110 for receipt of a seal ring (not shown). Likewise, at least one, and preferably two or more, annular grooves 120 may be formed around second annular guide body 112 for receipt of a seal ring (not shown). Although two annular guide bodies are not necessary, in some embodiments, magnet slide arm 28 utilizes two annular guide bodies 110, 112 spaced apart from one another along shaft 104 in order to ensure proper alignment of magnet 30 as magnet slide arm 28 reciprocates within stator cylinder assembly 24 (see FIGS. 1 and 2) as described herein.

In one or more embodiments, magnet 30 may include a plurality of discrete permanent magnets 34 generally axially adjacent one another on shaft 104, each adjacent discrete permanent magnet 34 having axially opposed polarities or poles (not shown). In one or more embodiments, the plurality of discrete permanent magnets 34 may be arranged in an alternating magnetic configuration so that adjacent discrete magnets 34 face one another with the opposite magnetic polarity. The discrete magnets 34 may be mounted on shaft 104 and held in position by annular guide bodies 110, 112, or as shown, in between first and second retainers 36, 37, respectively. Retainers 36, 37 may be lock washers, retaining rings, bolts, fasteners or any other mechanism that can be utilized to promote radial orientation f a magnetic field (not shown) of the discrete magnets 34 forming magnet 30, i.e., substantially perpendicular to the stator cylinder assembly 24 (see FIGS. 1 and 2) for increased efficiency of linear electric device 10. In one or more embodiments, magnet 30 may extend fully within annulus 116 between first and second annular guide bodies 110, 112 and be secured on shaft 104 by first and second annular guide bodies 110, 112.

Figure 5A:
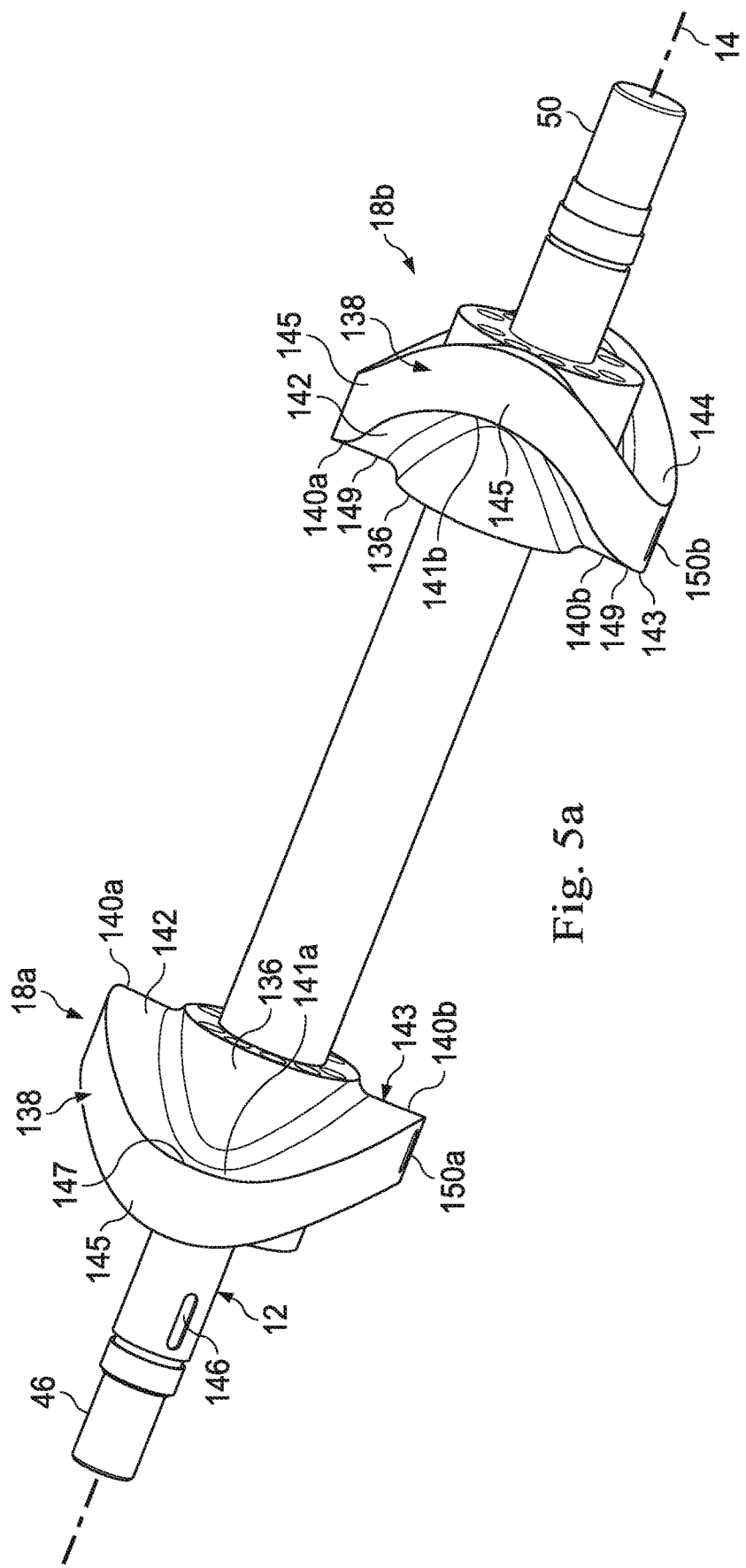
FIG. 5a is an elevation view of a driveshaft with harmonic cams mounted thereon.

With reference to FIG. 5a, harmonic cams 18a, 18b are shown in more detail mounted on driveshaft 12. As described above, driveshaft 12 extends along a driveshaft axis 14 between a driveshaft first end 46 and a driveshaft second end 50. Barrel cams 18a, 18b are mounted along driveshaft 12 in spaced apart relation to one another. Each cam 18 includes a cam hub 136 formed about a hub axis which cam hub 136 is mounted on driveshaft 12 to be coaxial therewith. Each cam 18 further includes a circumferential cam shoulder, disk or plate 138 extending around the periphery of cam hub 136. Cam shoulder 138 is generally of an undulating, harmonic curvilinear shape, and can be characterized as having a certain frequency, where frequency may generally refer to the number of occurrences of peaks and troughs about the 360-degree circumference of cam shoulder 138, a peak and abutting troughs together forming a lobe.

In the electric device 10 as described herein, the cam shoulders need not be limited to a particular shape. However, in one or more embodiments, the amplitude of the peaks of each cam shoulder 138 of each cam 18a, 18b are the same, with the depth of the troughs and the height of the peaks being substantially equal, while in other embodiments, the depth of the troughs may differ from height of the peaks. Likewise, in some embodiments, the frequencies of the cams 18a, 18b may be the same, while in other embodiments, the frequencies of cams 18a, 18b may differ. By altering the depth of the troughs, the height of the peaks and the number of lobes, the power generation, as well as the waveform shape of the electrical output, from any given power generation assembly 20 engaging a cam 18 can be precisely controlled. In this regard, by altering the number of lobes and/or the shape of a cam 18, the function of a gearbox as used with prior art power alternators can be replicated, and thus, the need for a gearbox between the prior art alternator and a driving source (such as an internal combustion engine, wind turbine, water turbine or the like) can be eliminated. This in turn, eliminates the frictional losses that would otherwise arise from a gearbox, thus improving overall efficiencies of the power alternator of the current disclosure as compared to those power alternators of the prior art. For example, a cam 18 with only two lobes will result in slower reciprocation of a magnet of magnet assembly 22 through windings of a coil assembly 21 as described above, when compared to a cam 18 having more lobes. Thus, in one or more embodiments, by increasing the number of lobes of a cam 18, a higher electrical output may be achieved. Where electric device 10 is an electric motor, in one or more embodiments, by increasing the number of lobes of a cam 18, a higher revolution per minute (RPM) of driveshaft 12 can be achieved without the use of a gearbox.

In the embodiment of FIG. 5a, each curvilinear shaped cam shoulder 138 extending around cam hub 136 is illustrated with two peaks, namely a first peak 140a and a second peak 140b, with a corresponding number of troughs 141 formed therebetween, such as a first trough 141a (not shown on cam 18b) and a second trough 141b (not shown on cam 18a). As such, the illustrated cam shoulder 138 creates two complete cycles about the 360-degree circumference of cam hub 136 and thus represents double harmonics. In other embodiments, cam shoulder 138 may have a different number of peaks 140 and troughs 141. In other words, the frequency of the curvilinear shape forming cam shoulder 138 may be selected to exhibit a desired number of peaks 140 and troughs 141 for a specific power generation requirement.

Cam shoulder 138 is further characterized as having an inwardly facing track or first surface 142 and an outwardly facing track or second surface 144, as well as an outer circumferential surface 145. First and second surfaces 142, 144 may generally oppose one another on opposite sides of cam shoulder 138 and may be disposed for engagement by one or more engagement mechanisms such as first and second engagement mechanisms 86, 88. Each cam 18a, 18b may be mounted on driveshaft 12 so as to be aligned with a driveshaft index reference 146. In particular, each cam 18 may include a cam index 150, such as the first cam index 150a and second cam index 150b of cams 18a, 18b, respectively.

In one or more embodiments, cams 18a, 18b are generally mounted on driveshaft 12 so that the indexes 150a, 150b are generally aligned with one another relative to a specific reference point 146 on driveshaft 12. When the indices 150a, 150b are aligned with one another, the opposing cams 18a, 18b mirror one another and the respective peaks 140 of the two cams 18a, 18b align with one another, meaning that the respective peaks and troughs occur at the same angular position about driveshaft 12 relative to reference point 146. As such, the peaks 140 of each cam 18a, 18b face one another and the troughs 141 of each cam 18a, 18b face one another. When the indices 150a, 150b are aligned, opposing magnet slide arms 28 as described above within a stator cylinder assembly 24 will move harmonically in unison. For the avoidance of doubt, references to cams 18 "mirroring" one another herein simply mean that the respective troughs or peaks occur at the same angular position about driveshaft 12, but not necessarily that the curvilinear shape of the cam shoulders 138a, 138b are the same.

Finally, the top of each peak 140 corresponds with inner dead center (IDC) of stator cylinder assembly 24 (see FIG. 3), while the bottom of each trough 141 corresponds with outer dead center (ODC) of stator cylinder assembly 24. In other words, when a cam follower assembly 26 (see FIG. 4A) engages a cam shoulder 138 at a lobe peak 140, the magnet slide arm 28 (see FIG. 4A) driven by the cam follower assembly 26 is closest to IDC of stator cylinder 60 (see FIG. 3). Likewise, when a cam follower assembly 26 (see FIG. 4A) engages a cam shoulder 138 at a trough 141, the magnet slide arm 28 (see FIG. 4A) driven by the cam follower assembly 26 is closest to ODC of stator cylinder 60 (see FIG. 3).

Figure 5B:
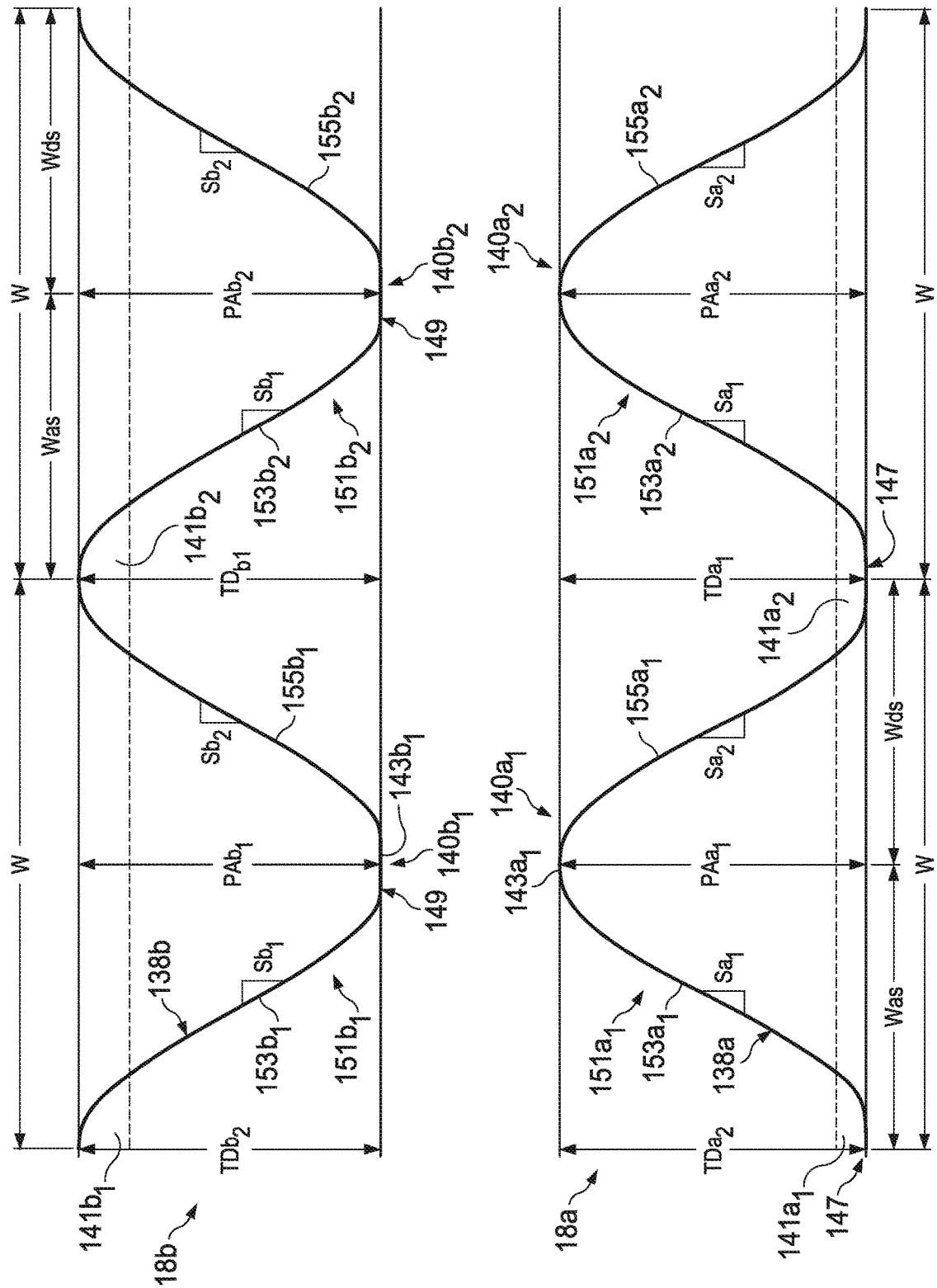
FIG. 5b is a cam shoulder profile having a substantially sinusoidal shape.
Figure 5C:
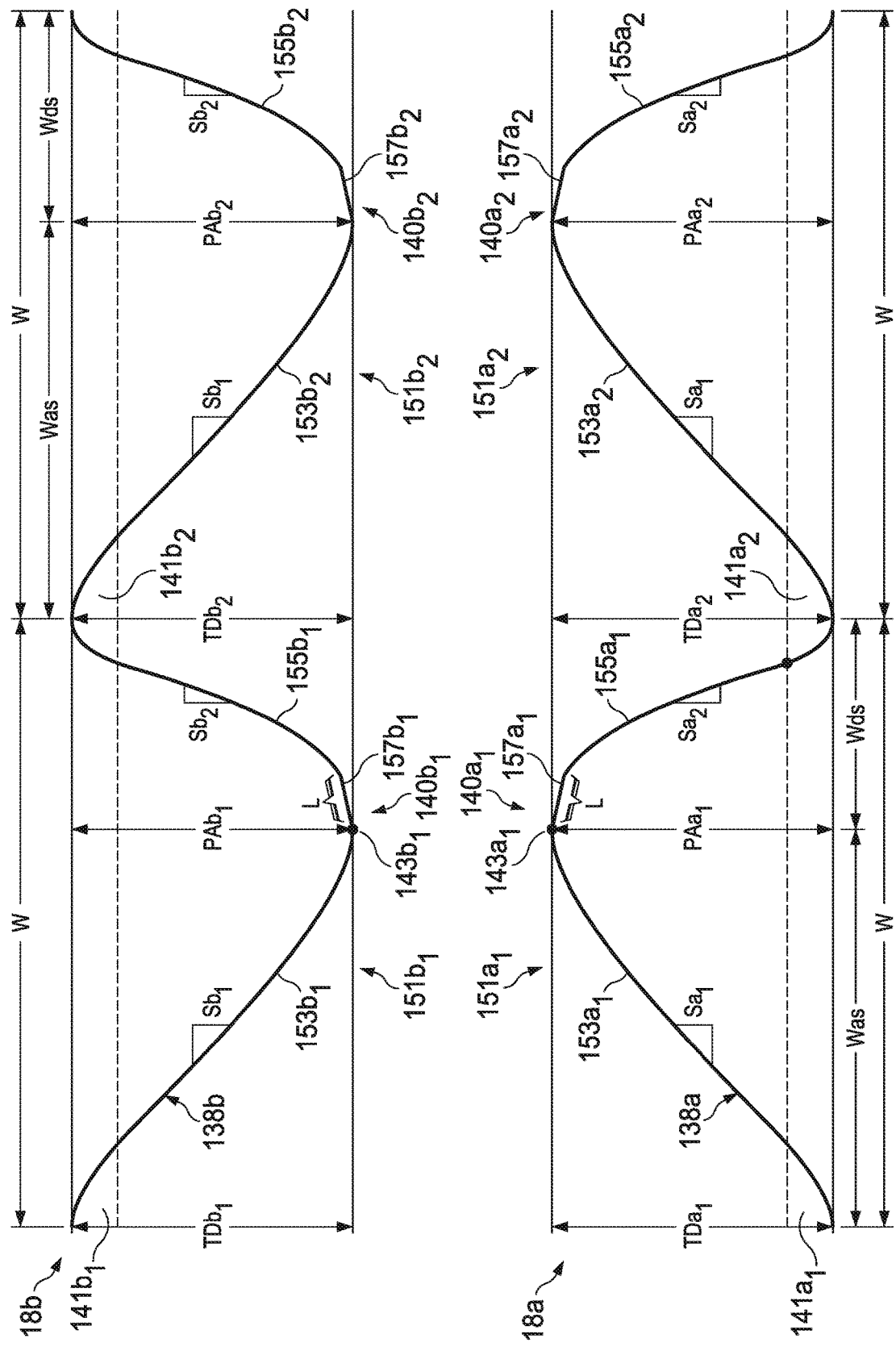
FIG. 5c is a cam shoulder profile having a segmented polynomial shape.

FIGS. 5b and 5c are illustrative cam profiles of cam shoulders 138a, 138b to better describe possible embodiments of the curvilinear shape of cam shoulders 138a, 138b. In one or more embodiments as illustrated in FIG. 5b, the curvilinear shape may be a sinusoidal shape, with a peak 140 occurring equidistance between successive troughs 141, while in other embodiments as illustrated in FIG. 5c, the curvilinear shape may be a segmented polynomial shape, with the peak 140 occurring between two successive troughs 141 but skewed or shifted closer to one trough 141. In any event, cam shoulder 138a may be associated with the first cam 18a and cam shoulder 138b may be associated with the second cam 18b. Each cam shoulder 138 forms a guide or track along which a cam follower (see FIG. 4A) moves. As such, the shape of cam shoulder 138 governs reciprocating, axial movement of a corresponding magnet slides within a stator cylinder, such as stator cylinder 60 described above. The shoulder shape, as represented by the profiles of FIGS. 5a, 5b is therefore an important part of the operation of some embodiments of electric device 10.

It will be appreciated that cam shoulders 138a, 138b are illustrated in FIGS. 5b and 5c as they would oppose one another on driveshaft 12 when radially indexed to substantially mirror one another. As such, peaks 140 oppose one another and troughs 141 oppose one another so that the opposing features have approximately the same radial position on driveshaft 12 relative to the driveshaft index 146 (see FIG. 5). Generally, each cam 18 has at least one lobe 151 formed of a peak 140 bounded by a trough 141. In the illustrated embodiment, each cam 18 is shown with a first lobe 151a and a second lobe 151b. Each peak 140 has a maximum peak amplitude PA. Each lobe 151 has an overall wavelength distance W, defined as the distance between successive troughs 141 across a peak 140. Each trough 141 has a maximum trough depth TD. Moving clockwise along the circumference of a cam shoulder 138 (or left to right as shown in FIGS. 5b and 5c), each lobe 151 has an ascending side or shoulder portion 153 and a descending side or shoulder portion 155.

Additionally, in some embodiments, to ensure that the opposing magnet slide arms 28 driven by cams 18a, 18b are continuously moving, no portion of the curvilinear shaped shoulder of cam 18a is parallel with any portion of curvilinear shaped shoulder of cam 18b. As such, opposing curvilinear shaped cam shoulders 138a, 138b, whether of a sinusoidal shape or a segmented polynomial shape, are constantly diverging or converging from one another. In other words, no portion of cam shoulders 138a, 138b are parallel since this would result in a loss of momentum of movement of the opposing magnet slide arms 28 within the magnet slide chamber 23.

With specific reference to FIG. 5b, cam 18a is shown as having a sinusoidal shaped cam shoulder 138a. As such, first lobe $151a_1$ is located approximately equidistance between a first trough $141a_1$ and a second trough $141a_2$. In particular, the maximum peak amplitude $PAa_1$ occurs at approximately ½ the overall wavelength distance W for lobe $151a_1$. As such, first lobe $151a_1$ is symmetrical in shape, illustrated by wavelength distance $W_{as}$ of an ascending shoulder portion $153a_1$ from the first trough $141a_1$ to the peak or apex $143a_1$ of lobe $151a_1$ being equal to the wavelength distance $W_{ds}$ of descending shoulder portion $155a_1$ from the peak or apex $143a_1$ of lobe $151a_1$ to second trough $141a_2$. First trough $141a_1$ has a trough depth $TDa_1$ that is substantially the same as trough depth $TDa_1$ of second trough $141a_2$. Similarly, second lobe $151a_2$ is of substantially the same shape as first lobe $151a_1$. In this regard, lobe $151a_1$ has an ascending shoulder portion $153a_1$ that is of substantially the same shape as descending shoulder portion $155a_1$. As such, the absolute value of the average slope $Sa_1$ of ascending shoulder portion $153a_1$ between trough $141a_1$ and peak $140a_1$ is approximately the same as the absolute value of the average slope $Sa_2$ of descending shoulder portion $155a_1$ between peak $140a_1$ and trough $141a_2$ moving clockwise (left to right in FIG. 5b) along cam shoulder 138a.

As with cam 18a, cam 18b is shown as having a symmetrical sinusoidal shaped cam shoulder 138b. As such, first lobe $151b_1$ is located approximately equidistance between a first trough $141b_1$ and a second trough $141b_2$. In particular, the maximum peak amplitude $PAb_1$ occurs at approximately ½ the overall wavelength distance W for lobe $151b_1$. First trough $141b_1$ has a trough depth $TDb_1$ that is substantially the same as trough depth $TDb_1$ of second trough $141b_2$. Similarly, second lobe $151b_2$ is of substantially the same shape as first lobe $151b_1$. In this regard, lobe $151b_1$ has an ascending shoulder portion $153b_1$ that is of substantially the same shape as descending shoulder portion $155b_1$. As such, the absolute value of the average slope $Sb_1$ of ascending shoulder portion $153b_1$ between trough $141b_1$ and peak $140b_1$ is approximately the same as the absolute value of the average slope $Sb_2$ of descending shoulder portion $155b_1$ between peak $140b_1$ and trough $141b_2$ moving clockwise (left to right in FIG. 5b) along cam shoulder 138b.

In any event, cams 18a, 18b are angularly mounted on driveshaft 12 (see FIG. 5a) to mirror one another so that the lobes 151 of the respective cams opposed one another with corresponding peaks 140 in general alignment and the number of lobes 151a of cam 18a corresponds with the number of lobes 151b of cam 18b. In this regard, the opposing features may be angularly aligned with one another so that opposing peaks 140 and opposing troughs 141 generally occur at the same angular position about driveshaft 12 relative to index 146.

Although in some embodiments, the opposing cam shoulders 138a, 138b of spaced apart cams 18a, 18b are generally disposed to have substantially the same sinusoidal shape, adjustments to portions of the shape of a particular shoulder, including the width of circumferential surface 145 and/or the shape of inwardly facing track 142 of a cam shoulder 138 may be utilized to adjust relative movements of opposing first and second magnet assemblies 22a, 22b, respectively, for a desired purpose. Thus, in some embodiments, the trough $141a_1$ of one cam 18a may be shaped to include a flat portion 147 that lies in a plane perpendicular to driveshaft axis 14 and the axis of cam hub 136 or otherwise be deeper than the corresponding opposing trough $141b_1$ of cam 18b, which is illustrated as generally curved through the entire trough $141b_1$. In other words, the trough depth $TDb_1$ of trough $141b_1$ is greater than opposing trough depth $TDa_1$ of corresponding trough $141a_1$. Similarly, peak $140a_1$ of cam 18a may have a rounded shape at its apex 143, while the shape of opposing peak $140b_1$ of cam 18b may have a flat portion 149 that lies in a plane perpendicular to driveshaft axis 14 and the axis of cam hub 136 at its corresponding apex 143. In the illustrated embodiments, because each flat portion 147, 149 of the corresponding cams 18a, 18b lies in a plane perpendicular to driveshaft axis 14 and the axis of cam hub 136, it will be appreciated that flat portions 147, 149 are in parallel planes.

With specific reference to FIG. 5c, cam 18a is shown as having a segmented polynomial shaped cam shoulder 138a. As such, first lobe $151a_1$ is asymmetrical in shape, with the maximum peak amplitude $PAa_1$ occurring closer to second trough $141a_2$ as opposed to first trough $141a_1$, illustrated by wavelength distance $W_{as}$ from the first trough $141a_1$ to the apex 143 of lobe $151a_1$ as being greater than the wavelength distance $W_{ds}$ from the apex $143a_1$ of lobe $151a_1$ to second trough $141a_2$. In other words, wavelength distance $W_{as}$ from the first trough $141a_1$ to peak $140a_1$ of an ascending shoulder portion $153a_1$ of lobe $151a_1$ is greater than the wavelength distance $W_{ds}$ from the peak $140a_1$ to the second trough $141a_2$ of a descending shoulder portion $155a_1$ of the lobe $151a_1$. In these embodiments, first trough $141a_1$ has a trough depth $TDa_1$ that is substantially the same as trough depth $TDa_2$ of second trough $141a_2$, which is substantially the same as maximum peak amplitudes $PAa_1$ and $PAa_2$ of lobes $151a_1$ and $151a_2$, respectively. Similarly, second lobe $151a_2$ is of substantially the same shape as first lobe $151a_1$. However, because lobes $151a_1$ and $151a_2$ are asymmetrical, lobe $151a_1$ has an ascending shoulder portion $153a_1$ that is shallower in shape than the steeper shape of descending shoulder portion $155a_1$. As such, the absolute value of the average slope $Sa_1$ of ascending shoulder portion $153a_1$ between trough $141a_1$ and peak $140a_1$ is less than the absolute value of the average slope $Sa_2$ of descending shoulder portion $155a_1$ between peak $140a_1$ and trough $141a_2$ moving clockwise along cam shoulder $138a$. It will be appreciated that the steeper shape (or greater slope) of descending shoulder portion $155a_1$ results in faster movement of a corresponding magnet during a retraction stroke of a magnet assembly as compared to the extension stroke of a magnet assembly within a stator cylinder.

Cam $18b$ is shown in FIG. $5c$ as having a segmented polynomial shaped cam shoulder $138b$. As such, first lobe $151b_1$ is asymmetrical in shape, with the maximum peak amplitude $PAb_1$ occurring closer to second trough $141b_2$ as opposed to first trough $141b_1$, illustrated by wavelength distance $W_{as}$ from the first trough $141b_1$ to the apex $143b_1$ of lobe $151b_1$ as being greater than the wavelength distance $W_{ds}$ from the apex $143b_1$ of lobe $151b_1$ to second trough $141b_2$. In these embodiments, first trough $141b_1$ has a trough depth $TDb_1$ that is substantially the same as trough depth $TDb_2$ of second trough $141b_2$, which is substantially the same as maximum peak amplitudes $PAb_1$ and $PAb_2$ of lobes $151b_1$ and $151b_2$, respectively. Similarly, second lobe $151b_2$ is of substantially the same shape as first lobe $151b_1$. However, because lobes $151b_1$ and $151b_2$ are asymmetrical, lobe $151b_1$ has an ascending shoulder portion $153b_1$ that is shallower in shape than the steeper shape of descending shoulder portion $155b_1$. As such, the absolute value of the average slope $Sb_1$ of ascending shoulder portion $153b_1$ between trough $141b_1$ and peak $140b_1$ is less than the absolute value of the average slope $Sb_2$ of descending shoulder portion $155b_1$ between peak $140b_1$ and trough $141b_2$ moving clockwise (left to right in FIG. $5c$) along cam shoulder $138b$.

In any event, cams $18a$, $18b$ are angularly mounted on driveshaft 12 relative to index 146 (see FIG. $5a$) to mirror one another so that the lobes 151 of the respective cams opposed one another with corresponding peaks 140 in general alignment and the number of lobes $151a$ of cam $18a$ corresponds with the number of lobes $151b$ of cam $18b$. In this regard, the opposing features may be angularly aligned with one another so that opposing peaks 140 and opposing troughs 141 generally occur at the same angular position about driveshaft 12 relative to index 146.

In one or more embodiments, each descending shoulder portion 155 of a segmented polynomial shaped cam shoulder 138 further includes a substantially linear portion 157 extending from each lobe apex 143 toward the second trough 141. While portion 157 may be linear or flat, it will be appreciated that it is not perpendicular to driveshaft axis 14 or the axis of cam hub 136 (and thus, a magnet slide continues to move as its associated cam follower moves across linear portion 157 during operation of electric device 10.) In other words, linear portion 157 has a slope greater than zero. In preferred embodiments, linear portion 157 has a slope of greater than zero and less than approximately 20 degrees. Thus, descending shoulder portion $155a_1$ of lobe $151a_1$ of cam $18a$ includes a linear portion $157a_1$ extending from apex $143a_1$. Similarly, opposing cam $18b$ has a descending shoulder portion $155b_1$ of lobe $151b_1$ with a linear portion $157b_1$ extending from apex $143b_1$. The other lobes $151a_2$, $151b_2$ likewise include linear portions 157 as described. In one or more embodiments, opposing linear portions 157 have the same slope. In one or more embodiments, at least one, or both ascending shoulder portion 153 of a segmented polynomial shaped cam shoulder 138 may likewise include a substantially linear portion (not shown) similar to linear portion 157, extending from each lobe trough 141 extending towards an apex 143. Again, while such portion may be linear or flat, it will be appreciated that it is not perpendicular to driveshaft axis 14 or the axis of cam hub 136, and thus, a magnet continues to move within its stator cylinder as its associated cam follower moves across such linear portion and the slope of such portion would be greater than zero.

The cam shoulders $138a$, $138b$ of spaced apart cams $18a$, $18b$ illustrated in FIG. $5c$ are generally disposed to have substantially the same segmented polynomial shape at least along the opposing descending shoulder portions $155a_1$, $155b_1$. However, because the shape of the segmented polynomial shoulder governs movement of a magnet within a stator cylinder, and in particular, how fast a magnet moves within its stator cylinder, then the opposing ascending shoulder portion 153 of cams $18a$, $18b$ may differ. As such, in one or more embodiments, the discreet slope $Sa_1$ at any given point along the ascending shoulder portion $153a_1$ of cam $18a$ may differ from the discreet slope $Sb_1$ at any given point along the ascending shoulder portion $153b_1$ of cam $18b$. For example, the initial shape of ascending shoulder portion $153b_1$ adjacent trough $141b_1$ may be steeper than the initial shape of ascending shoulder portion $153a_1$ adjacent trough $141a_1$, resulting in faster movement of the one magnet towards IDC and thus faster movement of the opposing magnet as compared to the movement of the opposing magnet governed by ascending shoulder portion $153a_1$. Regardless, it will be appreciated that for the overall segmented polynomial shape of opposing cam shoulders $138a$, $138b$, the trough depth $TDa_1$ of trough $141a_1$ is substantially the same as the opposing trough depth $TDb_1$ of corresponding trough $141b_1$. Similarly, peak $140a_1$ of cam $18a$ has substantially the same peak amplitude $PAa_1$ as the peak amplitude $PAb_1$ of opposing peak $140b_1$.

The length L of linear portion 157 may be selected to correspond with a particular desired waveform. It will be appreciated that while opposing cam shoulders $138a$, $138b$ are constantly diverging or converging without any parallel portions of their respective segmented polynomial shapes, the opposing linear portions 157 of a shallow slope result in slower movement apart of opposing magnet assemblies in a stator cylinder, thereby permitting a substantially constant magnet slide chamber volume for a period of time without having the magnets stop in the stator cylinder. In one or more embodiments, opposing linear portions 157 have the same length L. However, it will be appreciated that in this embodiment, while the peak $140a$ of each lobe $151a$ of cam $18a$ is substantially aligned with the corresponding peak 140b of each lobe 151b of cam 18b, no portion of segmented polynomial shaped cam shoulder 138a is parallel with any portion of segmented polynomial shaped cam shoulder 138b.

Likewise, the angular alignment of cams 18a, 18b relative to the driveshaft index reference 146, and also to one another, may be adjusted to achieve a particular purpose. Cam 18a may be angularly rotated a desired number of degrees relative to driveshaft index reference 146 (and cam 18b) in order to adjust the movement of the magnet slide arm 28 associated with cam 18a relative to the magnet slide arm 28 associated with cam 18b. In some embodiments, one cam 18, such as cam 18b, may be rotated approximately 0.5 to 11 degrees relative to the other cam 18, such as cam 18a.

FIG. 6a illustrates a magnet assembly 22 engaged with cam 18a on a driveshaft 12 which includes an opposing cam 18b. While only one magnet assembly 22 is illustrated engaged with cam 18a, it will be appreciated that multiple magnet assemblies 22 may be engaged with cam 18a as described herein. Moreover, where an opposing cam 18b is mounted on driveshaft 12 as shown, cam 18b is likewise disposed for engagement by one or more magnet assemblies 22. For purposes of clarity, however only magnet assembly 22 as illustrated will be discussed. Specifically, cam follower assembly 26 engages cam 18a so that the shoulder 138 of cam 18a extends into opening 84 of cam follower assembly 26, allowing first roller 86 to engage inwardly facing track 142 of cam 18a and second roller 88 to engage outwardly facing track 144 of cam 18a. Adjustable spacer 90 bears against outer surface 145 of cam shoulder 138. Spacer 90 can be radially adjusted to correspondingly adjust the position and alignment of rollers 86, 88 on tracks 142, 144, respectively. Magnet assembly 22 is constrained to reciprocate along coil assembly axis 25 which is spaced apart from driveshaft axis 14 a distance D, which may be approximately the cam radius $R_c$. As such, rotational movement of driveshaft 12 about driveshaft axis 14 is translated into axial movement of magnet assembly 22, and thus, magnet 30, along coil assembly axis 25 by virtue of rotation of cams 18a and 18b. In the illustrated embodiment, it will be appreciated that the shape of cam shoulder 138 is generally sinusoidal and peak 140a of cam 18a has a rounded shape at its apex 143, while the corresponding surface of peak 140a of cam 18b has a linear or flat portion 149 (as described above) at its apex 143. In other embodiments, the cam shoulder 138 may have a segmented polynomial shape, in which case, opposing peaks 140 would be rounded at apex 143 of both cams 18 and opposing troughs 141 would likewise be similarly rounded at their bottom.

Figure 6B:
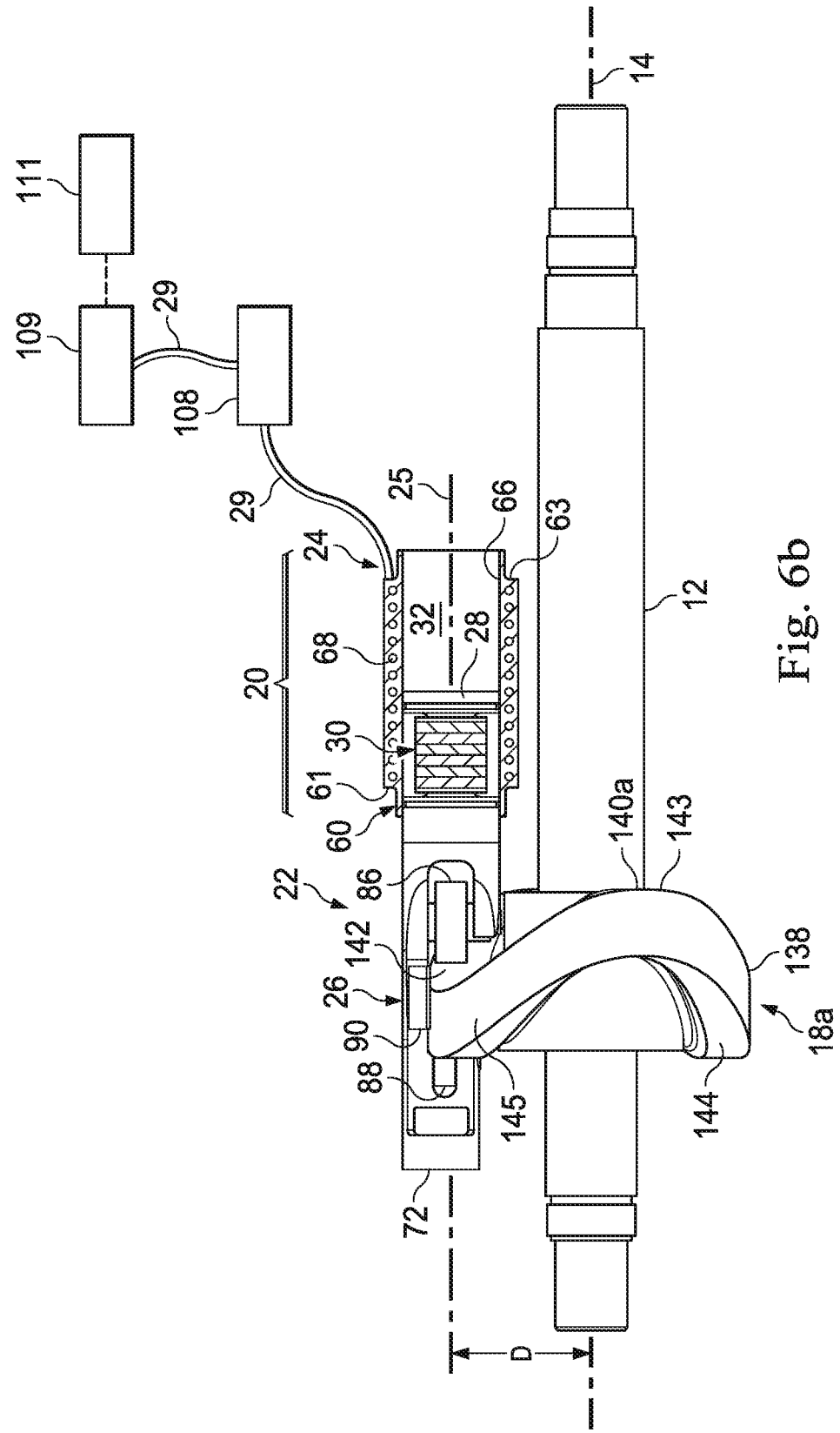

FIG. 6b illustrates a driveshaft 12 having only a single cam 18a mounted thereon and engaged by a single radial power generation assembly 20, with a magnet assembly 22 engaged with cam 18a. In the illustrated embodiment, magnet assembly 22 has a single cam follower assembly 26 that engages cam 18a in order to reciprocate a single magnet slide arm 28 relative to a stator cylinder assembly 24 so as to generate power. Cam follower assembly 26 engages cam 18a so that the shoulder 138 of cam 18a extends into opening 84 of cam follower assembly 26, allowing first roller 86 to engage inwardly facing track 142 of cam 18a and second roller 88 to engage outwardly facing track 144 of cam 18a. Adjustable spacer 90 bears against outer surface 145 of cam shoulder 138. Spacer 90 can be radially adjusted to correspondingly adjust the position and alignment of rollers 86, 88 on tracks 142, 144, respectively. Magnet assembly 22 is constrained to reciprocate along coil assembly axis 25 which is spaced apart from driveshaft axis 14 a distance D, which may be approximately the cam radius $R_c$. As such, rotational movement of driveshaft 12 about driveshaft axis 14 is translated into axial movement of magnet assembly 22, and thus, magnet 30, along coil assembly axis 25 by virtue of rotation of cam 18a, whereby the magnet slide arm 28 of magnet assembly 22 moves within stator cylinder 60. Specifically, the magnet 30 carried by magnet slide arm 28 is moved along coil assembly axis 25 within magnet slide chamber 32 formed in stator cylinder 60 of the stator cylinder assembly 24. Windings 68 are mounted along cylinder wall 66 of stator cylinder 60 around magnet slide chamber 32 and extend between a first winding edge 61 and a second winding edge 63. As magnet 30 moves within magnet slide chamber 32 of stator cylinder 60 between the winding edges 61, 63, current is generated within windings 68 in a manner well known in the industry.

In the illustrated embodiment, it will be appreciated that the shape of cam shoulder 138 is generally sinusoidal and peak 140a of cam 18a has a rounded shape at its apex 143, while the corresponding surface of peak 140a of cam 18b has a linear or flat portion 149 (as described above) at its apex 143. In other embodiments, the cam shoulder 138 may have a segmented polynomial shape, in which case, opposing peaks 140 would be rounded at apex 143 of both cams 18 and opposing troughs 141 would likewise be similarly rounded at their bottom.

Also shown in FIG. 6b is an electrical inverter 108 electrically connected to a power source 109 via electrical leads 29, which also interconnect electrical inverter 108 to windings 69 of the stator cylinder assembly 24 to convert alternating current generated by stator cylinder assembly 24 into direct current that can be stored by power source 109. In other embodiments, electrical inverter 108 may be eliminated. Power source 109 may be any device for storing an electric charge generated by a stator cylinder assembly 24 including without limitation, batteries, capacitors and the like. It will be appreciated that power source 109 may be utilized to operate electric device 10 whereby power source 109 may supply electrical current, either directly or through electrical inverter 108, to windings 69 in order to energize windings 69 to cause magnet slide arms 31 to reciprocate within their respective stator cylinders 47. A controller 111 may also be provided to control operation of power generation assembly 20, power source 109 and inverter 108.

Figure 6C:
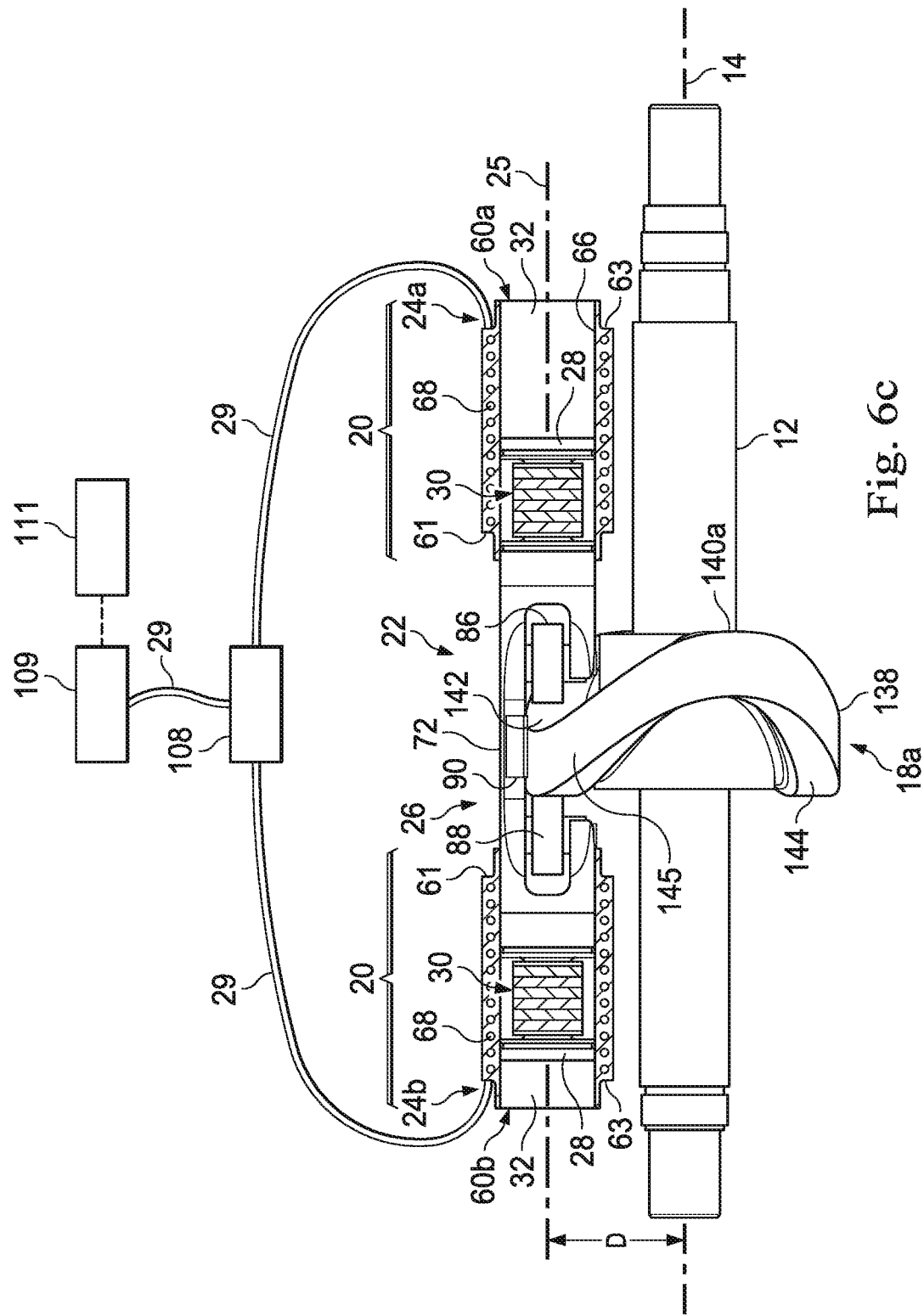

FIG. 6c illustrates a driveshaft 12 having only a single cam 18a mounted thereon, with a magnet assembly 22 engaged with cam 18a. In the illustrated embodiment, magnet assembly 22 has a single cam follower assembly 26 that engages cam 18a, however, unlike the embodiment of FIG. 6b, in order to generate power, cam follower assembly 26 reciprocates a first magnet slide arm 28a relative to a first stator cylinder assembly 24a and reciprocates a second magnet slide arm 28b relative to a second stator cylinder assembly 24b. Cam follower assembly 26 engages cam 18a so that the shoulder 138 of cam 18a extends into opening 84 of cam follower assembly 26, allowing first roller 86 to engage inwardly facing track 142 of cam 18a and second roller 88 to engage outwardly facing track 144 of cam 18a. Adjustable spacer 90 bears against outer surface 145 of cam shoulder 138. Spacer 90 can be radially adjusted to correspondingly adjust the position and alignment of rollers 86, 88 on tracks 142, 144, respectively.

Magnet assembly 22, and in particular, magnet slide arms 28a, 28b, are constrained to reciprocate along coil assembly axis 25 which is spaced apart from driveshaft axis 14 a distance D, which may be approximately the cam radius $R_c$. As such, rotational movement of driveshaft 12 about driveshaft axis 14 is translated into axial movement of magnet assembly 22, and thus, magnet 30 carried on each of magnet slide arms 28a, 28b, along coil assembly axis 25 by virtue of rotation of cam 18a, whereby magnet slide arm 28a of magnet assembly 22 moves within stator cylinder 60a and magnet slide arm 28b of magnet assembly 22 moves within stator cylinder 60b. Specifically, the magnet 30 carried by each magnet slide arm 28 is moved along coil assembly axis 25 within its magnet slide chamber 32 formed its respective stator cylinder 60a, 60b of the stator cylinder assembly 24. Windings 68 are mounted along cylinder wall 66 of each stator cylinder 60a, 60b around magnet slide chamber 32 and extend between a first winding edge 61 and a second winding edge 63. As magnet 30 moves within magnet slide chamber 32 of its respective stator cylinder 60a, 60b between the winding edges 61, 63, current is generated within windings 68 in a manner well known in the industry.

Thus, it will be appreciated that in this embodiment, a single cam 18a is utilized to actuate first and second magnets 30 disposed on opposite sides of cam shoulder 138 from one another along a single coil assembly axis 25.

Also shown in FIG. 6c is an electrical inverter 108 electrically connected to a power source 109 via electrical leads 29, which also interconnect electrical inverter 108 to windings 69 of the stator cylinder assembly 24 to convert alternating current generated by stator cylinder assembly 24 into direct current that can be stored by power source 109. In other embodiments, electrical inverter 108 may be eliminated. Power source 109 may be any device for storing an electric charge generated by a stator cylinder assembly 24 including without limitation, batteries, capacitors and the like. It will be appreciated that power source 109 may be utilized to operate electric device 10 whereby power source 109 may supply electrical current, either directly or through electrical inverter 108, to windings 69 in order to energize windings 69 to cause magnet slide arms 31 to reciprocate within their respective stator cylinders 47. A controller 111 may also be provided to control operation of power generation assemblies 20, power source 109 and inverter 108. Controller 111 may be utilized to selectively energize one or both sets of electromagnetic coils 68 depending on the output requirements a power generation assembly 20 and electric device 10. For example, under certain output conditions for electric device 10, only one power generation assembly 20 shown in FIG. 6c may be energized, while under other output conditions, both power generation assembly 20 shown in FIG. 6c may be utilized. In this same vein, one power generation assembly 20 shown in FIG. 6c may have a first coil density and the other power generation assembly 20 may have a second coil density different than the first coil density such that the power generation assemblies 20 when energized have different power outputs for driving cam 18a. Controller 111 may be utilized to selectively energize a set of windings 69 with a particular coil density depending on the desired power output at a particular time.

Figure 6D:
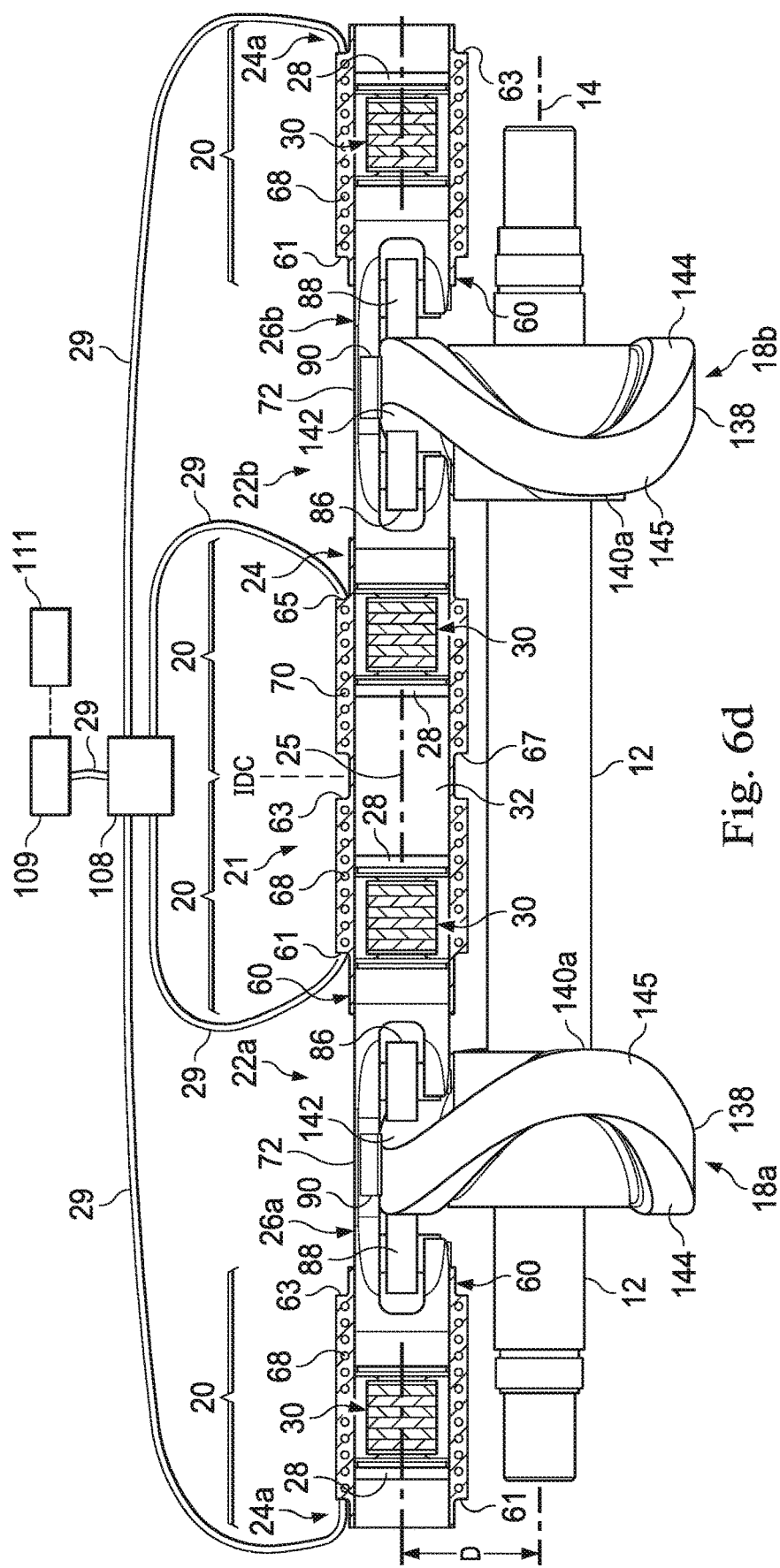

FIG. 6d illustrates a driveshaft 12 having two cam 18a, 18b mounted thereon, with a magnet assembly 22 engaged with each of cams 18a, 18b. In the illustrated embodiment, magnet assembly 22a has a cam follower assembly 26a that engages cam 18a, while magnet assembly 22b has a cam follower assembly 26b that engages cam 18b. Each cam follower assembly 26 reciprocates first and second magnet slide arms 28 mounted opposite from one another about shoulder 138 of its respective cam 18a, 18b. Specifically, cam follower assembly 26a reciprocates a magnet slide arm 28a relative to a first stator cylinder assembly 24a and reciprocates magnet slide arm 28b relative to a second stator cylinder assembly 24b. Likewise, cam follower assembly 26b reciprocates a magnet slide arm 28c relative to a third stator cylinder assembly 24c and reciprocates a magnet slide arm 28d relative to stator cylinder assembly 24b. Thus, stator cylinder assembly 24b is disposed to receive magnet slide arm 28b within a first end 62 and magnet slide arm 28d within a second end 64. With respect to stator cylinder assembly 24b, a stator cylinder 60b extending between the first end 62 and the second end 64 and generally formed of a cylinder wall 66. A first set of electromagnetic coils or windings 68 is disposed along cylinder wall 66 between the first and second ends 62, 64, as are a second set of windings 70, spaced apart from first set of windings 68. In other embodiments, stator cylinder assembly 24b may be replaced with two separate stator cylinder assemblies 24 having only a single set of windings 68, such as stator cylinder assembly 24a.

Cam follower assembly 26a engages cam 18a so that the shoulder 138 of cam 18a extends into opening 84 of cam follower assembly 26a, allowing first roller 86 to engage inwardly facing track 142 of cam 18a and second roller 88 to engage outwardly facing track 144 of cam 18a.

Adjustable spacer 90 bears against outer surface 145 of cam shoulder 138. Spacer 90 can be radially adjusted to correspondingly adjust the position and alignment of rollers 86, 88 on tracks 142, 144, respectively. Magnet assembly 22a, and in particular, magnet slide arms 28a, 28b of magnet assembly 22a, are constrained to reciprocate along coil assembly axis 25 which is spaced apart from driveshaft axis 14 a distance D, which may be approximately the cam radius $R_c$. As such, rotational movement of driveshaft 12 about driveshaft axis 14 is translated into axial movement of magnet assembly 22a, and thus, magnet 30 carried on each of magnet slide arms 28a, 28b, along coil assembly axis 25 by virtue of rotation of cam 18a, whereby magnet slide arm 28a of magnet assembly 22a moves within stator cylinder 60a and magnet slide arm 28b of magnet assembly 22a moves within stator cylinder 60b. Specifically, the magnet 30 carried by each magnet slide arm 28a, 28b is moved along coil assembly axis 25 within its respective stator cylinder 60a, 60b of the stator cylinder assembly 24a, 24b. Windings 68 are mounted along cylinder wall 66 of each stator cylinder 60a, 60b. As each magnet 30 moves within its respective stator cylinder 60a, 60b, current is generated within each set of windings 68 in a manner well known in the industry.

Similarly, cam follower assembly 26b engages cam 18b so that the shoulder 138 of cam 18b extends into opening 84 of cam follower assembly 26b, allowing first roller 86 to engage inwardly facing track 142 of cam 18b and second roller 88 to engage outwardly facing track 144 of cam 18b. Adjustable spacer 90 bears against outer surface 145 of cam shoulder 138.

Spacer 90 can be radially adjusted to correspondingly adjust the position and alignment of rollers 86, 88 on tracks 142, 144, respectively. Magnet assembly 22b, and in particular, magnet slide arms 28a, 28b of magnet assembly 22b, are constrained to reciprocate along coil assembly axis 25 which is spaced apart from driveshaft axis 14 a distance D, which may be approximately the cam radius $R_c$. As such, rotational movement of driveshaft 12 about driveshaft axis 14 is translated into axial movement of magnet assembly 22b, and thus, magnet 30 carried on each of magnet slide arms 28c, 28d, along coil assembly axis 25 by virtue of rotation of cam 18b, whereby magnet slide arm 28c of magnet assembly 22b moves within stator cylinder 60c and magnet slide arm 28*d* of magnet assembly 22*b* moves within stator cylinder 60*b*. Specifically, the magnet 30 carried by each magnet slide arm 28*c*, 28*d* is moved along coil assembly axis 25 within its respective stator cylinder 60*c*, 60*b* of the stator cylinder assembly 24*c*, 24*b*. Windings 68 are mounted along cylinder wall 66 of stator cylinder 60*c* around magnet slide chamber 32, while windings 70 are mounted along cylinder wall 66 of stator cylinder 60*b*, spaced apart from windings 68 of stator cylinder 60*b*. As each magnet 30 moves within its respective stator cylinder 60*a*, 60*b*, current is generated within each set of windings 68, 70, respectively, in a manner well known in the industry.

Thus, it will be appreciated that in this embodiment having two spaced apart cams 18*a*, 18*b*, aligned along a given coil assembly axis 25 are at least three stator cylinder assemblies 24*a*, 24*b*, 24*c* disposed to receive four magnet slide arms 28*a*, 28*b*, 28*c*, 28*d*, each of which carries magnets 30 to energize windings 68, 70 as described.

Also shown in FIG. 6*d* is an electrical inverter 108 electrically connected to a power source 109 via electrical leads 29, which also interconnect electrical inverter 108 to windings 69 of the stator cylinder assembly 24 to convert alternating current generated by stator cylinder assembly 24 into direct current that can be stored by power source 109. In other embodiments, electrical inverter 108 may be eliminated. Power source 109 may be any device for storing an electric charge generated by a stator cylinder assembly 24 including without limitation, batteries, capacitors and the like. It will be appreciated that power source 109 may be utilized to operate electric device 10 whereby power source 109 may supply electrical current, either directly or through electrical inverter 108, to windings 69 in order to energize windings 69 to cause magnet slide arms 31 to reciprocate within their respective stator cylinders 47. A controller 111 may also be provided to control operation of power generation assemblies 20, power source 109 and inverter 108. Controller 111 may be utilized to selectively energize one or more sets of electromagnetic coils 68 depending on the output requirements a power generation assembly 20 and electric device 10. For example, under certain output conditions for electric device 10, only a limited or select number of power generation assembly 20 shown in FIG. 6*d* may be energized, while under other output conditions, all power generation assemblies 20 shown in FIG. 6*d* may be utilized. In this same vein, one or more power generation assemblies 20 shown in FIG. 6*d* may have a first coil density and the other power generation assemblies 20 may have a second coil density different than the first coil density such that the power generation assemblies 20 when energized have different power outputs for driving cam 18*a*. Controller 111 may be utilized to selectively energize a set of windings 69 with a particular coil density depending on the desired power output at a particular time. In this regard, during operation of electric device 10, controller 111 may be used to dynamically switch back and forth between power generation assemblies 20 or may be used to operate all power generation assemblies 20 depending on the output requirements of electric device 10 during a particular stage of operation.

Figure 7A:
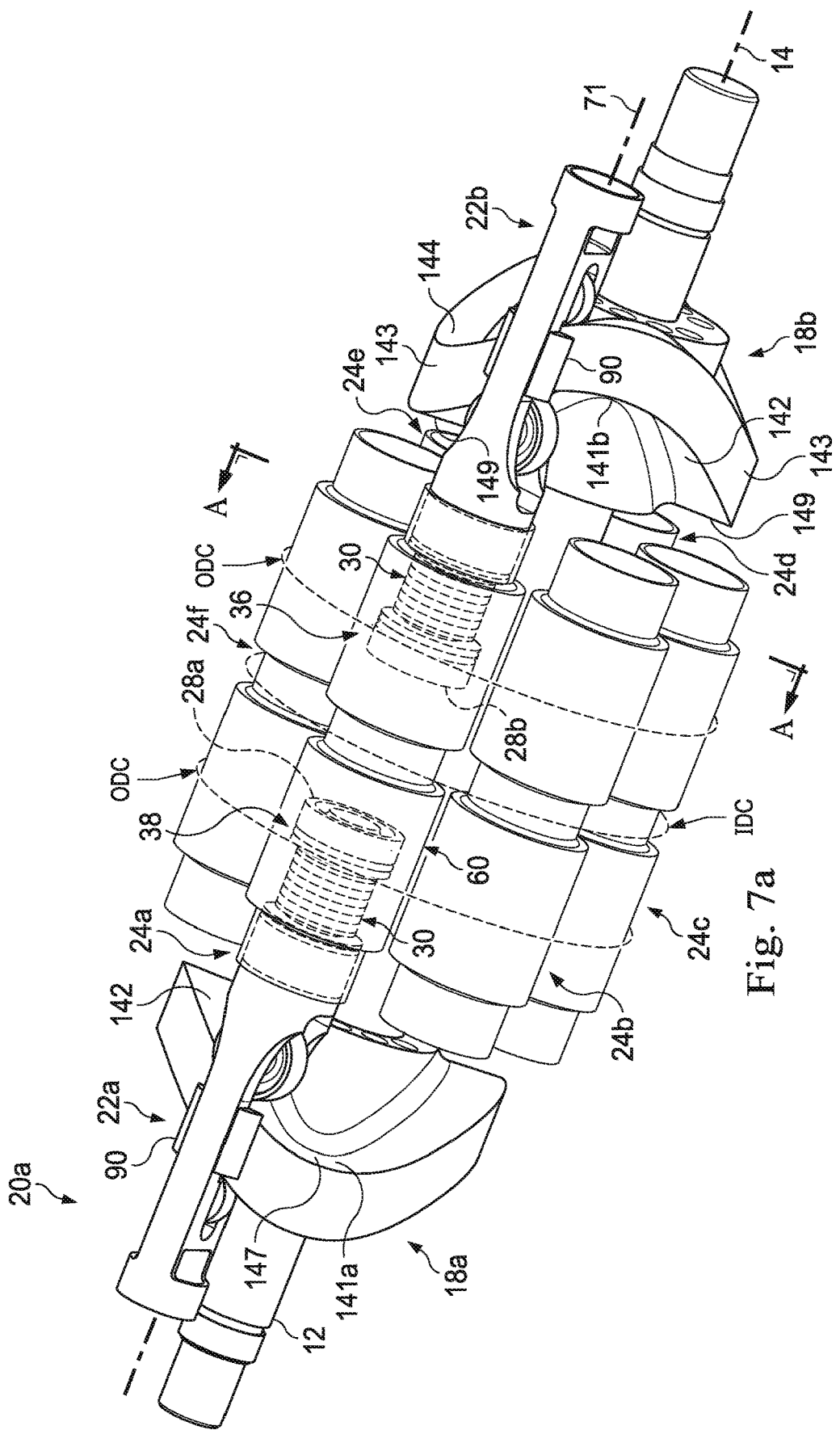
FIG. 7a is a perspective view of six stator cylinder assemblies deployed about a driveshaft.

FIGS. 7*a* and 7*b* illustrate the stator cylinder assemblies 24 of power generation assemblies 20 symmetrically positioned around driveshaft 12. While stator cylinder assemblies 24 are generally supported by enclosure 53 (see FIG. 1), for ease of depiction, the enclosure 53 is not shown in FIGS. 7*a* and 7*b*. In one embodiment, six stator cylinder assemblies 24*a*, 24*b*, 24*c*, 24*d*, 24*e* and 24*f* are utilized, although fewer or more stator cylinder assemblies 24 could be incorporated as desired. In any event, the stator cylinder assemblies 24*a*-24*f* are positioned around driveshaft 12 between cams 18*a*, 18*b*. It will be understood that for ease of description, while only one power generation assembly 20*a* is illustrated (having stator cylinder assembly 24*a* with magnet assemblies 22*a*, 22*b* disposed therein), each of the stator cylinder assemblies 24 depicted are disposed to receive at least one magnet assembly 22 together forming a power generation assembly 20. In any event, a first magnet assembly 22*a* and a second magnet assembly 22*b* which magnet assemblies 22*a*, 22*b* are axially aligned with one another within a stator cylinder assembly 24*a*. Cams 18*a*, 18*b* are mounted on driveshaft 12 so that the cams 18*a*, 18*b* are aligned to generally mirror one another. Each magnet assembly 22*a*, 22*b* within stator cylinder 60 moves between ODC to a position adjacent IDC. It will be appreciated that the length of the stroke of a magnet slide arm 28 within cylinder 60, and more specifically, the degree of movement of a magnet 30 relative to the length of the windings 68 of a stator cylinder assembly 24, can be utilized to adjust the electrical current generated by power generation assembly 20. Rotation of cams 18*a*, 18*b* drives first magnet assembly 22*a* and second magnet assembly 22*b* away from one another along the axis 71 of stator cylinder assembly 24*a* towards ODC. Stator cylinder 60 constrains each magnet assembly 22*a*, 22*b* to axial reciprocation along axis 71. Rotational movement of driveshaft 12 about driveshaft axis 14 (as driven by an external power source) results in rotation of cams 18*a* and 18*b* which translates the rotational movement into axial movement of magnet assemblies 22*a*, 22*b* along axis 71 as the rollers 86, 88 of respective cam follower assemblies 26*a*, 22*b* move along the tracks 142, 144 of their respective cams 18*a*, 18*b*.

While cams 18*a*, 18*b* generally mirror one another, as explained above, in some embodiments where shoulder 143 has a sinusoidal shape, the trough 141*a* of cam 18*a* may be shaped to include a flat portion 147 (a portion that lies in a plane perpendicular to driveshaft axis 14) relative to corresponding opposing trough 141*b* of cam 18*b*, which is illustrated as generally curved through the entire trough 141*b*, causing magnet slide arm 28*a* to have a different momentary displacement in stator cylinder 60 relative to magnet slide arm 28*b*. In particular, as shown, as cam follower assembly 26*a* reaches flat portion 147 of track 142 of cam 18*a*, magnet slide arm 28*a* will remain retracted at outer dead center ("ODC") momentarily even as magnet slide arm 28*b* continues to translate as its cam follower assembly 26*b* moves along track 142 of cam 18*b* and back towards IDC. A similar phenomenon occurs when cam followers 26*a*, 26*b* reach an apex 143 of their respective cams 18*a*, 18*b*. As described, the apex 143*b* of cam 18*b* includes a flat portion 149 (a portion that lies in a plane perpendicular to driveshaft axis 14) relative to corresponding opposing apex 143*a* of cam 18*a*, which is illustrated as generally curved through the entire apex 143*a*, causing magnet slide arm 28*b* to have a different displacement in stator cylinder 60 relative to magnet slide arm 28*a*. In particular, as cam follower assembly 26*b* reaches flat portion 149 of track 142 of cam 18*b*, magnet slide arm 28*b* will remain extended towards inner dead center ("IDC") momentarily even as magnet slide arm 28*a* continues to translate as its cam follower assembly 26*a* moves along track 142 of cam 18*a* and back towards ODC. It will be appreciated in other embodiments, it may be desirable to ensure that each magnet slide arm 28 is continuously moving within stator cylinder 60, in which case, the shape of shoulder 138 does not include a portion that lies in a plane perpendicular to driveshaft axis 14. Thus, by utilizing the shape of shoulders 138 of opposing cams 18a, 18b, the relative translation of magnet slide arms 28a, 28b can be adjusted to achieve a desired goal, such as controlling the shape of the waveform generated by virtue of movement of a magnet slide arm 28. In other words, the cams 18a, 18b control the waveform shape utilizing the curvilinear shape of cam shoulder 138 to provide desired timing for the magnet slide arms 28 as they translate within their stator cylinders 60.

In addition, or alternatively, to using the shape of cam shoulders 138 to adjust relative axial movement of magnet slide arms 28a, 28b, it will be appreciated that cam 18a can be radially displaced on driveshaft 12 relative to cam 18b, thereby achieving the same objective described above. Cams 18 may be located on driveshaft 12 with a small angular displacement with respect to each other in order to cause one of magnet slide arms 28 to be displaced in the stator cylinder 60 slightly ahead or behind its opposing magnet slide arm 28. This asymmetric magnet slide phasing feature can be used to enhance power generation operations, particularly as may be desirable when different waveforms or outputs are desired from electric device 10.

In FIG. 7b, power generation assembly 20a is depicted as having a stator cylinder assembly 24a and a magnet assembly 22a. Stator cylinder assembly 24a includes a stator cylinder 60 disposed to carry windings 68. Likewise, magnet assembly 22a includes a magnet slide arm 28 on which is mounted a magnet 30. It will be appreciated that as illustrated by stator assemblies 24b-24f, additional power generation assemblies 20 may be deployed about driveshaft 12 by simply increasing the cam diameter CD of cam shoulder 138. In some embodiments, where high torque is required, cam shoulder 138 may be large, with a corresponding large plurality of power generation assemblies 20.

Figure 8:
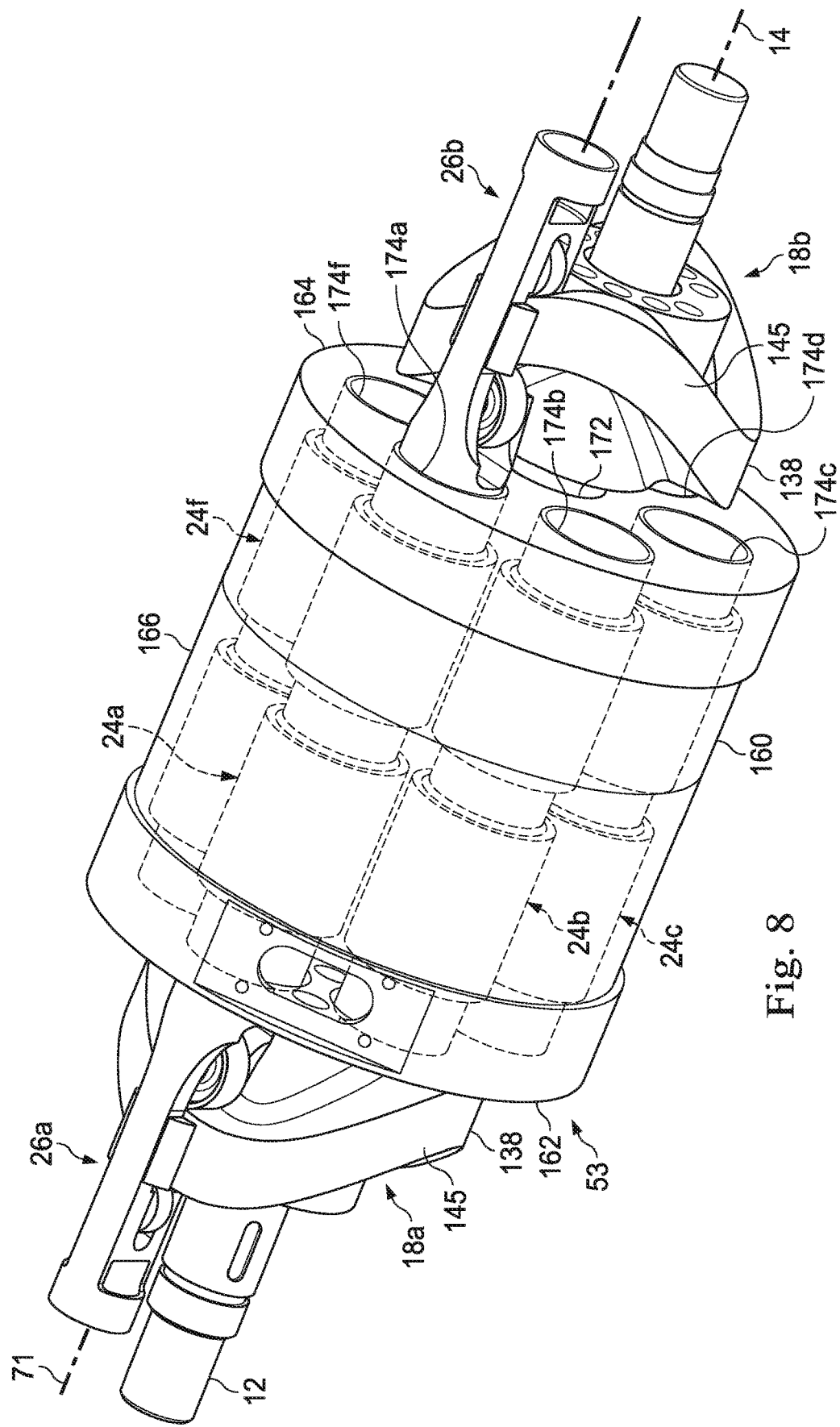

FIG. 8 illustrates the stator cylinder assemblies 24a-24f and driveshaft 12 of FIG. 7a in relation to enclosure 53. Thus, as shown, enclosure 53 is positioned about driveshaft 12 between cam 18a and cam 18b. Enclosure 53 is generally extends between a first end 162 and a second end 164 and includes an annular guide body portion 160 therebetween, which annular guide body portion 160 is characterized by an exterior surface 166. A central driveshaft bore 172 extends between ends 162, 164. Likewise, two or more symmetrically positioned cylinder bores 174 extend between ends 162, 164 and are radially spaced outward of central driveshaft bore 172. In the illustrated embodiment, enclosure 53 has six cylinder bores 174 symmetrically spaced about driveshaft bore 172, of which cylinder bores 174a, 174b 174c and 174f are visible. Disposed in each cylinder bore 174 is a stator cylinder assembly 24, and thus, illustrated are stator cylinder assemblies 24a, 24b, 24c and 24f. As such, enclosure 53 supports the stator cylinder assemblies 24. Opposing cam follower assemblies 26a, 26b are illustrated as engaging their respective cams 18a, 18b and extending along axis 71 into the stator cylinder assembly 24a supported in cylinder bore 174a of enclosure 53.

Figure 9:
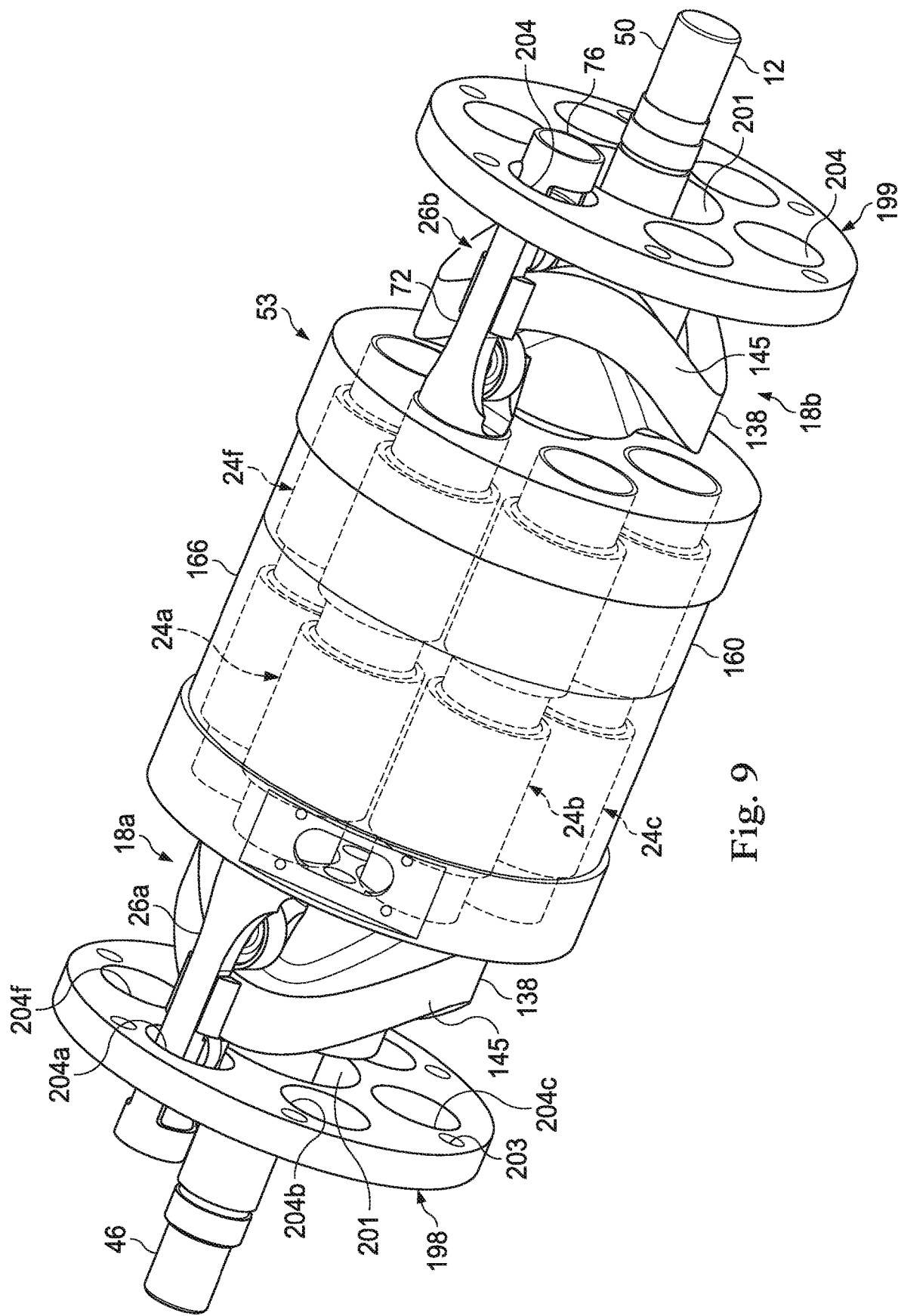
FIG. 9 is a perspective view of a linear electric device illustrating magnet assembly supports.

FIG. 9 illustrates the stator cylinder assemblies 24a-24f, driveshaft 12, cam follower assemblies 26a, 26b, cams 18a, 18b and enclosure 53 of FIG. 8, but with guidance caps disposed for supporting cam follower assemblies 26. In particular, a first guidance cap 198 is deployed around driveshaft 12 between its first end 46 and cam 18a, and a second guidance cap 199 deployed around driveshaft 12 between its second end 50 and cam 18b. Each guidance cap 198, 199 generally includes a central bore 201 through which driveshaft 12 extends and two or more symmetrically positioned bores 204 radially spaced outward of central bore 201 with each bore 204 corresponding with and axially aligned with an adjacent stator cylinder assembly 24 supported by enclosure 53 (in some embodiments). In one or more embodiments, a guidance cap 198, 199 may be a plate with the above described bores 201, 204 formed therein. In other embodiments, a guidance cap 198, 199 may be a plate with support cylinders passing through the plate to form each guide bore 204. The support cylinders may, in turn, seat in corresponding cylindrical-shaped reliefs formed in sump casings 54, 56, thereby providing additional support to guidance caps 198, 199. In the illustrated embodiment, each guidance cap 198, 199 has six bores 204, namely 204a, 204b, 204c, 204d, 204e and 204f, symmetrically spaced about central bore 201. Each bore 204 is disposed to receive a cam follower assembly 26 to provide support to the cam follower assembly 26 as it reciprocates into and out of its respective stator cylinder assembly 24. In particular, as shown, the bore 204 is sized to correspond with the smaller diameter cylindrical end 76 of cam follower assembly 26, allowing the smaller diameter cylindrical end 76 to magnet slide within bore 204 as magnet slide arm 28 reciprocates in stator cylinder assembly 24. In addition, one or both guidance caps 198, 199 may be utilized to inject lubricating and cooling oil into to port 98 of the cam follower assembly 26. In particular, the guidance caps may be used to transfer the oil from an oil pump (not shown) to bearings 87, 89 of cam follower assembly 26. Each guidance cap 198, 199 may include one or more ports 203 utilized to transfer the oil to port 98 of the cam follower assembly 26.

Figure 10:
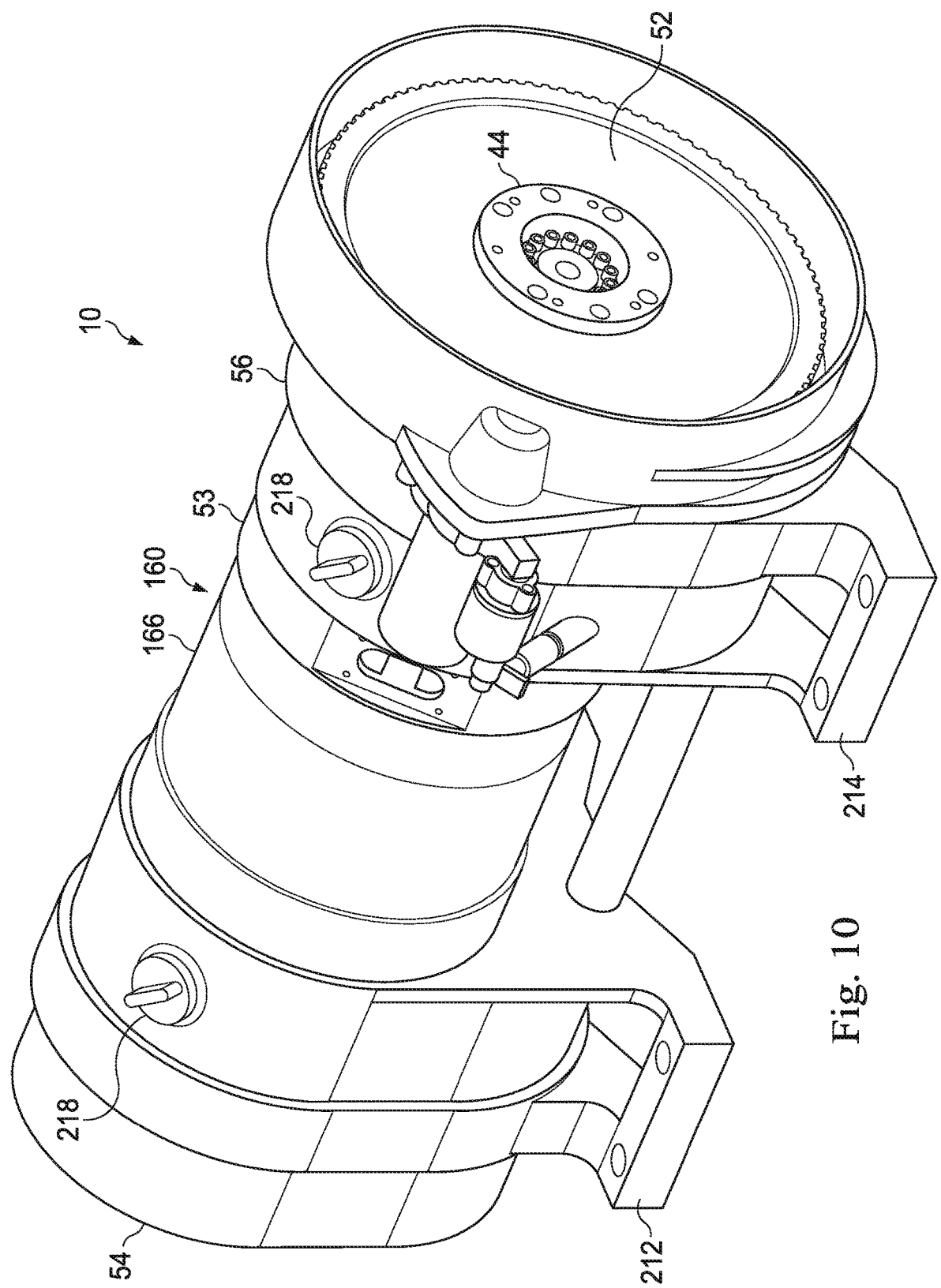
FIG. 10 is a perspective view of an assembled linear electric device of the disclosure.

FIG. 10 is a perspective view of linear electric device 10. In the illustrated embodiment, electric device 10 is generally encased by enclosure 53 and supported by a first support block 212 at one end of the linear electric device 10 and a second support block 214 at the opposite end of the linear electric device 10. In this regard, sump casing 54 cooperates with first support block 212 to enclose enclosure 53 around the first end 46 of driveshaft 12 forming an oil lubrication and cooling chamber for providing oil to cam 18a and its associated cam follower assemblies 26, while sump casing 56 cooperates with second support block 214 to enclose enclosure 53 around the second end 50 of driveshaft 12 forming an oil lubrication and cooling chamber for providing oil to cam 18b and its associated cam follower assemblies 26. An oil port 218 may be provided in each of support block 212, 214 or sump casing 54, 56.

A first flange 44 may be attached to a driveshaft 12 with a flywheel 52 mounted on first flange 44.

As described above, an external driving force (not shown), such as an internal combustion engine, wind turbine, water turbine or other drive system may be provided to drive rotation of driveshaft 12 where electric device 10 is an alternator.

Figure 11A:
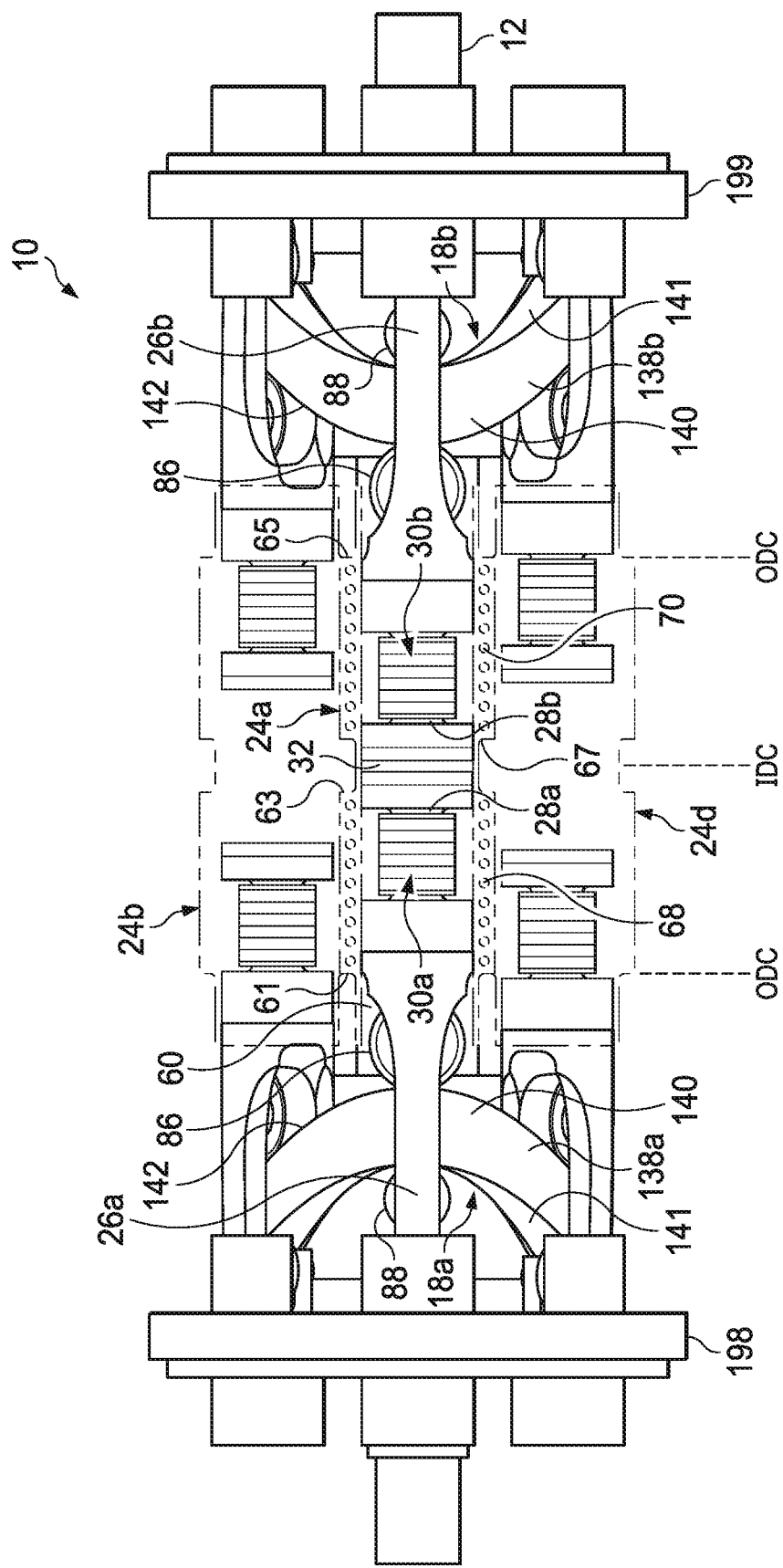
FIGS. 11a-11c illustrate the movement of magnet slides of a power generation assembly through a stroke.
Figure 11B:
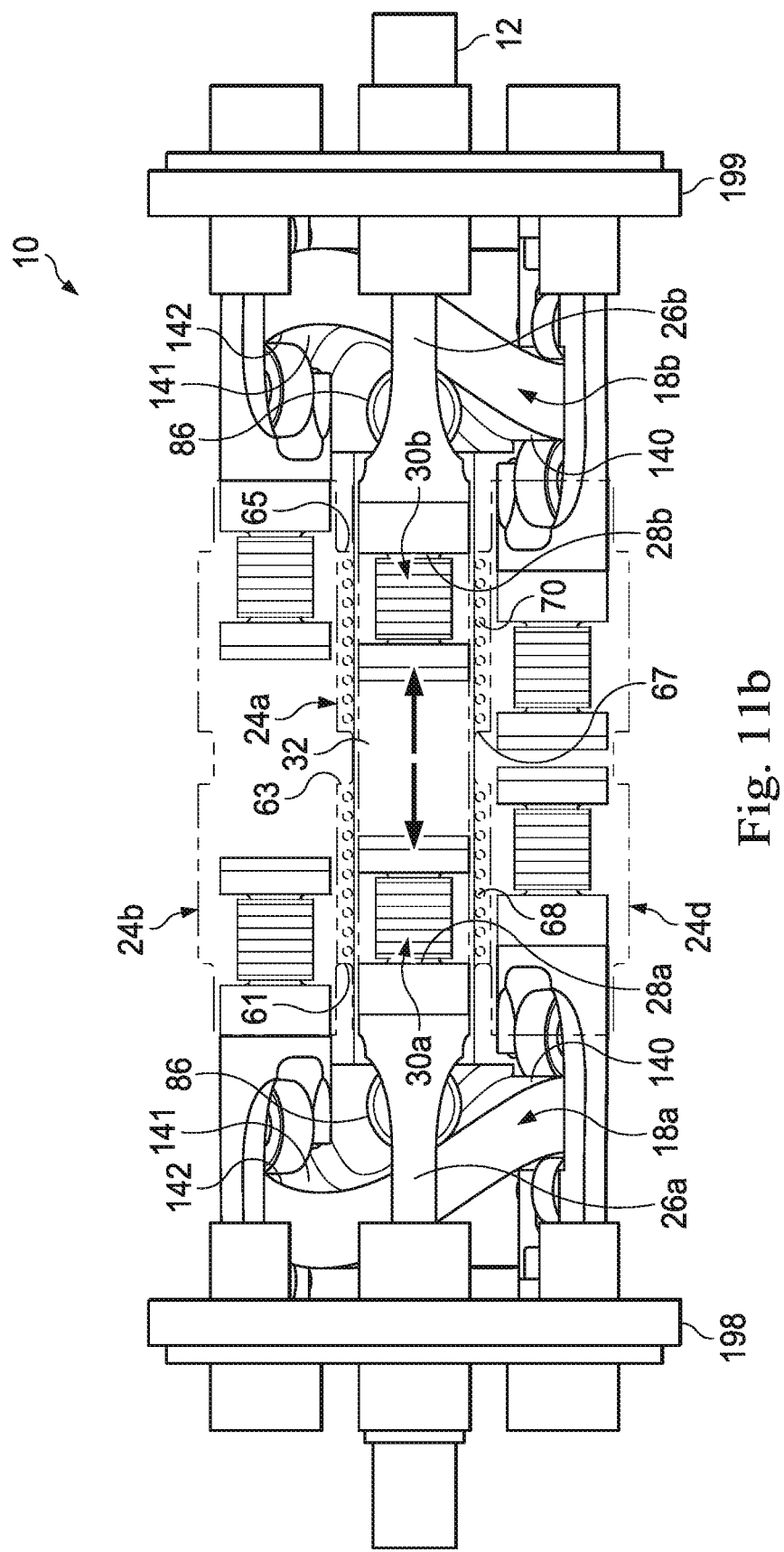
Figure 11C:
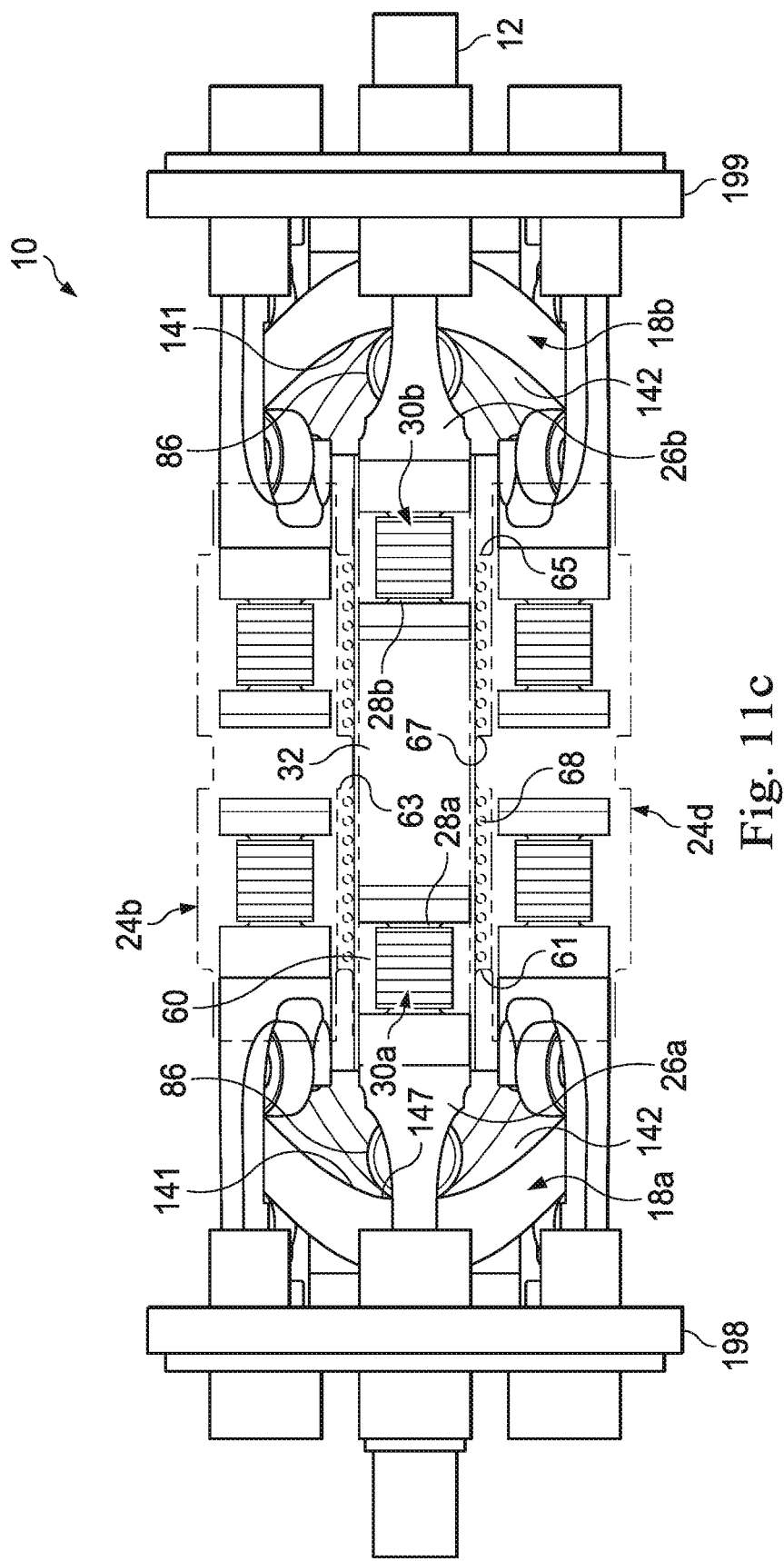

Turning to FIGS. 11a-11c, the operation of linear electric device 10 will be described with reference to a system of four stator cylinder assemblies 24, of which stator cylinder assembly 24a will be the primary focal point, with references to stator cylinder assemblies 24b and 24d.

Generally depicted is driveshaft 12 on which is mounted cams 18a and 18b, each having a curvilinear shaped shoulder 138. In the illustrated embodiment, each of cams 18a, 18b has two lobes 151 formed by two peaks 140 and two troughs 141 and are disposed on driveshaft so as to be radially aligned, i.e., without a radial offset of one cam 18 relative to the other cam. A cam follower assembly 26a engaged cam 18a and a cam follower assembly 26b engages cam 18b so that roller 86 of the respective cam follower assemblies 26a, 26b engage the inwardly facing track 142 of the shoulder 38 of each cam 18a, 18b. Cam follower assembly 26a reciprocates a magnet slide arm 28a and magnet 30a within stator cylinder 60 of cylinder assembly 24a, while cam follower assembly 26b reciprocates a magnet slide arm 28b and magnet 30b within stator cylinder 60. First guidance cap 198 supports cam follower assembly 26a while second guidance cap 199 supports cam follower assembly 26b. Each stator cylinder assembly 24 includes a first set of windings 68 provided along cylinder wall 66 between the first and second ends 62, 64 and a second set of windings 70 provided along cylinder wall 66 and spaced apart from first set of windings 68. Windings 68 have an outer winding edge 61 closest to the first end 62 and an inner winding edge 63 closest to second end 64, while windings 70 have an outer winding edge 65 closest to the second end 64 and an inner winding edge 67 closest to first end 62. Movement of magnet 30a within stator cylinder 60 will be described relative to cam 18a and windings 68. Movement of magnet 30b within stator cylinder 60 will be described relative to cam 18b and windings 70. Although two sets of windings 68, 70 are illustrated, it will be appreciated that as described above in FIG. 3a, only one set of windings may be provided in other embodiments. In the illustrated embodiment, the windings 68, 70 are spaced apart from one another so that each set of windings cooperates with its own magnet slide arm 28a, 28b, respectively, while in other embodiments, each magnet slide arm 28 may cooperate with multiple sets of windings as the magnet slide arm 28 translates within stator cylinder 60. The area between opposing magnet slide arms 28a, 28b within stator cylinder 60 forms magnet slide chamber 32 with at least a portion of the windings 68 disposed around magnet slide chamber 32. Inner dead center (IDC) and outer dead center (ODC) relative to the magnet slide arm 28 for stator cylinder assembly 24a are indicated.

FIG. 11a illustrates the magnet slide arms 28a, 28b extended in their respective strokes so as to be closest to IDC, where each magnet slide arm 28a, 28b is at its innermost axial position within stator cylinder 60. In this position, each cam follower assembly 26a, 26b engages its respective cam 18a, 18b at a peak 140. In this position, magnet 30a of magnet slide arm 28a has been translated substantially through windings 68, whereby the magnet 30a is positioned closest to IDC within magnet slide chamber 32. Likewise, magnet 30b of magnet slide arm 28b has been substantially translated through windings 70, whereby the magnet 30b is positioned closest to IDC within magnet slide chamber 32 and adjacent magnet 30a. In this position, driveshaft 12 is illustrated as being at a reference angle of 0°. Moreover, magnet assemblies 22b, 22d are shown at a point farthest from IDC in their respective stator cylinder assemblies 24b, 24d, respectively.

In FIG. 11b, as driveshaft 12 rotates, cams 18a, 18b likewise rotate and each cam follower assembly 26a, 26b begins to move along a descending portion of the shoulder track of their respective cams 18a, 18b. In doing so, the rotational motion of the cams 18a, 18b is converted into axial motion of the cam follower assembly 26. The result is that magnet slide arms 28a, 28b within stator cylinder 60 of stator cylinder assembly 24a begin to move axially away from one another (as shown by the arrows) in a retraction stroke. At this point in the retraction stroke, both magnets 30a, 30b begin to move past the windings 68, 70 with which the respective magnet slide arms 28a, 28b cooperate. As described above, the speed of movement of the respective magnet slide arms 28a, 28b can be adjusted by adjusting the slope of the descending portion of a cam 18. In the illustrated embodiment, the magnet slide arms 28 within stator cylinder assembly 24d have now moved to an IDC position, while the magnet slide arms 28 within stator cylinder assembly 24b remain retracted relative to IDC. Thus, as shown each individual power generation assembly 20 may be at a different stage of power generation depending on the orientation of cams 18 and the relative engagement of cam follower assemblies 26 with the cams 18.

In FIG. 11c, each magnet slide arm 28a, 28b reaches ODC of stator cylinder assembly 24a by virtue of cam follower assemblies 26a, 26b reaching the bottom of the troughs 141 of their respective cams 18a, 18b. When magnet slide arms 28a, 28b are at ODC, their respective magnets 30a, 30b may have been retracted relative to their respective windings 68, 70 so that power generation in power generation assembly 20a temporality ceases, although, as will be appreciated, power generation associated with stator cylinder assemblies 24b, 24d continues. In this regard, the magnet slide arms 28 of stator cylinder assembly 24b are shown moving inward towards IDC, while magnet slide arms 28 of stator cylinder assembly 24d are shown moving outward towards ODC, although not as retracted as magnet slide arms 28 of stator cylinder assembly 24a. In the illustrated embodiment, cams 18a, 18b are depicted with substantially sinusoidal shaped cam shoulders 138a, 138b, and as such, as described above, it will be observed that on the one side of the linear electric device 10, a portion 147 of trough 141 of cam 18a is flattened (as compared to opposing trough 141 of cam 18b which is rounded).

Figure 12:
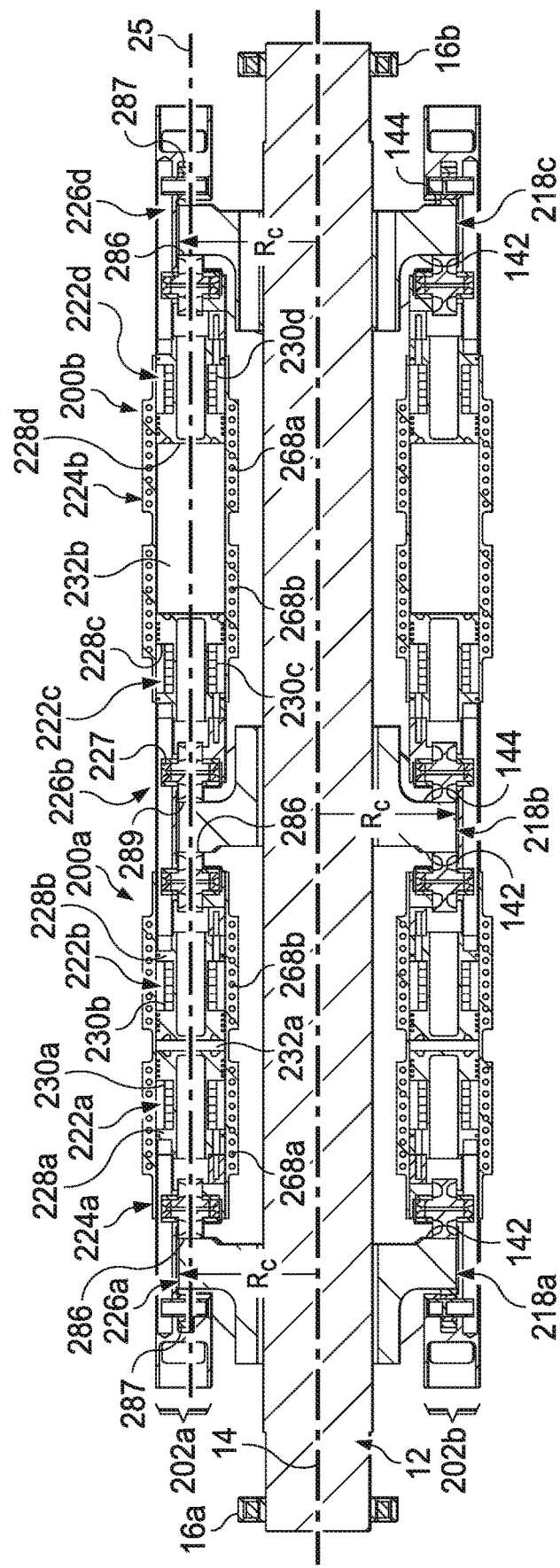
FIG. 12 is a cut-away side view of a linear electric device with stator cylinder assemblies axially aligned in series.

Turning to FIG. 12, an alternative embodiment of linear electric device 10 is illustrated, wherein two or more power generation assemblies 200, such as power generation assemblies 200a, 200b, are axially aligned in series along coil assembly axis 25, together forming a coil assembly series 202, such as coil assembly series 202a. Specifically, in FIG. 12, driveshaft 12 extends along a driveshaft axis 14 and passes axially through the center of the linear electric device 10. Driveshaft 12 is supported by a pair of bearings 16a, 16b in a fixed axial position. Positioned along driveshaft 12 in spaced apart relationship to one another are at least three harmonic cams 218a, 218b, 218c, such as the cams 18 described above. Each power generation assembly 200 is comprised of a first magnet assembly 222a and a second magnet assembly 222b which magnet assemblies 222a, 222b are axially aligned with one another within a stator cylinder assembly 224a disposed along coil assembly axis 25. Coil assembly axis 25 is spaced apart from but generally parallel with driveshaft axis 14 of driveshaft 12. Magnet assembly 222a includes a cam follower assembly 226a attached to a magnet slide arm 228a to which is mounted a magnet 230a. Likewise, opposing magnet assembly 222b includes a cam follower assembly 226b attached to a magnet slide arm 228b to which is mounted a magnet 230b. Each cam follower assembly 226a, 226b engages its respective cam 218a, 218b and acts on its respective magnet slide arm 228a, 228b. Opposed magnet slide arms 228a, 228b within stator cylinder assembly 224a generally define a magnet slide chamber 232a therebetween within at least one set of windings 268a through which magnets 230a, 230b translate.

Power generation assembly 200b of coil assembly series 202a likewise includes a first magnet assembly 222c and a second magnet assembly 222d which magnet assemblies 222c, 222d are axially aligned with one another within a stator cylinder assembly 224b disposed along a coil assembly axis 25. Magnet assembly 222c includes a magnet slide arm 228c to which is mounted a magnet 230c. Opposing magnet assembly 222d includes a cam follower assembly 226d attached to a magnet slide arm 228d to which is mounted a magnet 230d. Opposed magnet slide arms 228c, 228d within stator cylinder assembly 224b generally define a magnet slide chamber 232b within at least one set of windings 268b and through which magnets 230c, 230d translate.

Thus, power generation assembly 200a is axially aligned with power generation assembly 200b so that their respective stator cylinder assemblies 224a, 224b are positioned in series along coil assembly axis 25.

Cam follower assembly 226b may include a cam follower bridge 227 interconnecting magnet slide arm 228c to cam follower assembly 226b of magnet assembly 222b. Each cam follower assembly 226a, 226b, 226d engages its respective cam 218a, 218b, 218c and is movable with respect to its respective cam 218a, 218b, 218c so that radial rotation of the respective cams 218a, 218b, 218d via rotation of driveshaft 12 can be translated into axial movement of magnet slide arms 228a, 228b and 228d. Each cam follower assembly 226 may include an engagement mechanism, such as engagement mechanisms 286, 287 and 289 as shown. In some embodiments, one or more engagement mechanisms 286, 287, 289 may be rollers as described above. Further, because cam follower bridge 227 interconnects magnet assemblies 222b and 222c, radial rotation of cam 218b is utilized to drive axial movement of magnet slide arm 228c. In this regard, the second roller 289 of cam follower assembly 226b may be of a larger diameter than the second roller 287 of the other cam followers, since both rollers 286, 289 of cam follower assembly 226b are used to transfer load from cam 218b. Thus, rollers 286, 289 may be larger in diameter than rollers 287 in order to transfer load. Additionally, cam 218b may have an inwardly facing track 142 and an outwardly facing track 144 that are shaped the same as the corresponding track inwardly facing track of cam 218a and 218c.

In some embodiments, linear electric device 10 includes at least two coil assembly series 202 symmetrically spaced about driveshaft axis 14, such as coil assembly series 202a and 202b. In one or more embodiments, linear electric device 10 includes at least three symmetrically spaced coil assembly series 202, while in other embodiments, linear electric device 10 incudes at least four symmetrically spaced coil assembly series 202.

Moreover, while two serially aligned stator cylinder assemblies 224 with three corresponding cams 18 have been described, the disclosure is not limited in this regard. Thus, in other embodiments three or more stator cylinder assemblies 224 may be axially aligned in series along coil assembly axis 25, with a cam 18 disposed between adjacent stator cylinder assemblies 224, as well as a cam 18 disposed at opposing ends of the series of stator cylinder assemblies 224.

Figure 13A:
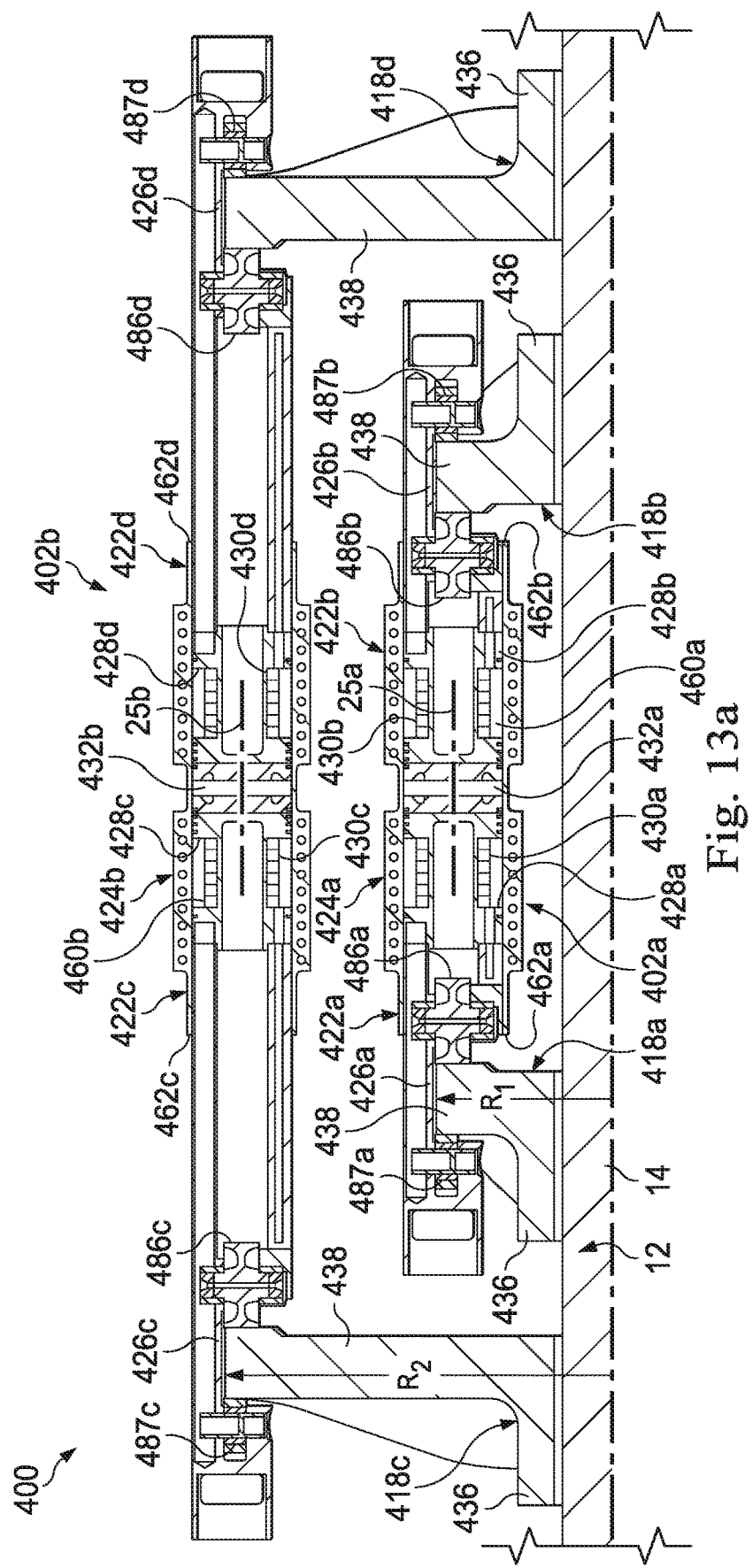
FIG. 13a is a cut-away side view of one embodiment of a linear electric device with stator cylinder assemblies deployed in parallel.

Turning to FIG. 13a, an alternative embodiment of linear electric device 10 (of FIG. 1) is illustrated as linear electric device 400, wherein two or more power generation assemblies 402, such as power generation assemblies 402a, 402b, are positioned to be parallel with driveshaft 12 but at different diameters about driveshaft 12, and as such, utilize two or more cam pairs of different diameters mounted on driveshaft 12. As shown, driveshaft 12 extends along a driveshaft axis 14. Mounted along driveshaft 12 between driveshaft ends 412 and 413, in spaced apart relationship to one another, are at least four harmonic cams 418a, 418b, 418c and 418d, such as the cams 18 described above, with cams 418a, 418b forming a first set of cams or cam pair and cams 418c, 418d forming a second set of cams or cam pair. The cams 18 of each set oppose one another as generally described above. However, cams 18a, 18b of the first cam set have a first cam set diameter $D_1$ (defined as $R_1*2$) while cams 18c, 18d of the second cam set have a second cam set diameter $D_2$ (defined as $R_2*2$) that is greater than the first cam set diameter $D_1$.

In some embodiments, power generation assemblies 402a, 402b may have the same angular position about driveshaft 12 so as to be generally adjacent one another, but radially spaced apart from one another in the same plane extending radially from driveshaft 12, while in other embodiments, power generation assemblies 402a, 402b may have different angular position about driveshaft 12.

More specifically, power generation assembly 402a is comprised of a first magnet assembly 422a and a second magnet assembly 422b which magnet assemblies 422a, 422b are axially aligned with one another within a stator cylinder assembly 424a disposed along a coil assembly axis 25a. Stator cylinder assembly 424a is formed of a stator cylinder 460a extending between a first end 462a and a second end 464a and windings 468a disposed along stator cylinder 460a. Coil assembly axis 25a is spaced apart from, but generally parallel with, driveshaft axis 14 of driveshaft 12. Magnet assembly 422a includes a cam follower assembly 426a attached to a magnet slide arm 428a to which is mounted a magnet 430a. Likewise, opposing magnet assembly 422b includes a cam follower assembly 426b attached to a magnet slide arm 428b to which is mounted a magnet 430b. Each cam follower assembly 426a, 426b includes a first engagement mechanism 486 and a second engagement mechanism 487 and straddles its respective cam 418a, 418b so that engagement mechanisms 486, 487 engage the cam 18. Each cam follower assembly 426a, 426b acts on its respective magnet slide arms 428a, 428b. Opposed magnet slide arms 428a, 428b within stator cylinder assembly 424a generally define a magnet slide chamber 432a within at least one set of windings 468a and through which magnets 430a, 430b translate.

Power generation assembly 402b likewise is comprised of a first magnet assembly 422c and a second magnet assembly 422d which magnet assemblies 422c, 422d are axially aligned with one another within a stator cylinder assembly 424b disposed along a coil assembly axis 25b. Stator cylinder assembly 424b is formed of a stator cylinder 460b extending between a first end 462c and a second end 464d and windings 468b disposed along stator cylinder 460b. Coil assembly axis 25b is spaced radially outward from, but generally parallel with coil assembly axis 25a of magnet slide arms 428a, 428b. Magnet assembly 422c includes a cam follower assembly 426c attached to a magnet slide arm 428c to which is mounted a magnet 430c. Likewise, opposing magnet assembly 422d includes a cam follower assembly 426d attached to a magnet slide arm 428d to which is mounted a magnet 430d. Each cam follower assembly 426c, 426d straddles its respective cam 418c, 418d and acts on its respective magnet slide arms 428c, 428d. Opposed magnet slide arms 428c, 428d within stator cylinder assembly 424b generally define a magnet slide chamber 432b within at least one set of windings 468b and through which magnets 430c, 430d translate.

Thus, the stator cylinder 460a associated with power generation assembly 402a is spaced apart from driveshaft 12 at a first radius $R_1$ and the stator cylinder 460b associated with power generation assembly 402b is spaced apart from driveshaft 12 at a second radius $R_2$, where the second radius $R_2$ is greater than the first radius $R_1$. In some embodiments, therefore, a plurality of first stator cylinders 460a may be spaced about driveshaft 12 at the first radius $R_1$ and a plurality of second stator cylinders 460b may be spaced about driveshaft 12 at the second radius $R_2$.

In one or more embodiments, magnet slide arms 428c, 428d are longer than magnet slide arms 428a, 428b, it being appreciated that the cams 418c, 418d are spaced farther apart from one another on driveshaft 12 than cams 418a, 418b, thus requiring longer magnet slides to permit the corresponding magnet assemblies 422c, 422d to engage cams 418c, 418d, respectively. In this regard, the lengths of the shafts 104 (see FIG. 3) of the various magnet slide arm 428 may be adjusted as desired.

Each cam follower assembly 426a, 426b, 426c and 426d straddles its respective cam 418a, 418b, 418c, 418d and is movable with respect to its respective cam 418a, 418b, 418c, 418d so that radial rotation of the respective cams 418a, 418b, 418c, 418d resulting from rotation of driveshaft 12 can translate into axial movement of magnet slides 430a, 430b, 430c and 430d.

In one or more embodiments, each cam 418 further includes a circumferential shoulder 438 extending around the cylindrical periphery of a cam hub 436. Shoulder 438 is generally curvilinear in shape and can be characterized as having a certain frequency, where the frequency may generally refer to the number of occurrences of repeating peaks and troughs about the 360-degree circumference of the circumferential shoulder 438. In some embodiments, the curvilinear shape of shoulders 438 of the first cam 418a and second cam 418b are of a first frequency and the curvilinear shape of shoulders 438 of the third cam 418c and fourth cam 418d are of a second frequency, which in some embodiments may differ from the first frequency, permitting different power generation assemblies 402 to have different electrical and/or waveform outputs. In some embodiments, it may be desirable for magnet slide arms 428a, 428b, 428c and 428d to translate in unison. In such case, the second frequency is less than the first frequency. In other embodiments, it may be desirable for magnet slide arms 428c and 428d to translate more rapidly than magnet slide arms 428a and 428b, in which case, the second frequency may be equal to or greater than the first frequency.

Similarly, in one or more embodiments, the amplitude of the curvilinear shoulders 438 of each cam 418a, 418b, 418c, 418d are the same, with the depth of the troughs and the height of the peaks being substantially equal, while in other embodiments, the depth of the troughs may differ from height of the peaks, permitting different power generation assemblies 402 to have different electrical and/or waveform outputs. In some embodiments, the amplitude of the third and fourth cams 418c, 418d, respectively is less than the amplitude of the first and second cams 418a, 418b in order to adjust timing of the respective magnet slide arms 428a, 428b, 428c and 428d. Because cams 418a, 418b of the first cam set have a different diameter $D_1$ than the diameter $D_2$ of cams 418c, 418d, shoulders 438 of the respective cams 418 are at different diameters. As such, magnet slide arms 428a, 428b, 428c and 428d may have the same angular position about driveshaft 12 so as to be generally adjacent one another, but radially spaced apart from one another in the same plane extending radially from driveshaft 12.

While only two sets of cam pairs are illustrated, any number of sets of cam pairs may be utilized, each set with a different diameter, thereby allowing the density of power generation assemblies 402 about driveshaft 12 to be increased. It will be appreciated that the greater number of power generation assemblies about driveshaft 12, the greater the power generation capacity of linear electric device 10. Thus, the foregoing arrangement allows greater alternator power output than would a traditional electrical alternator.

Figure 13B:
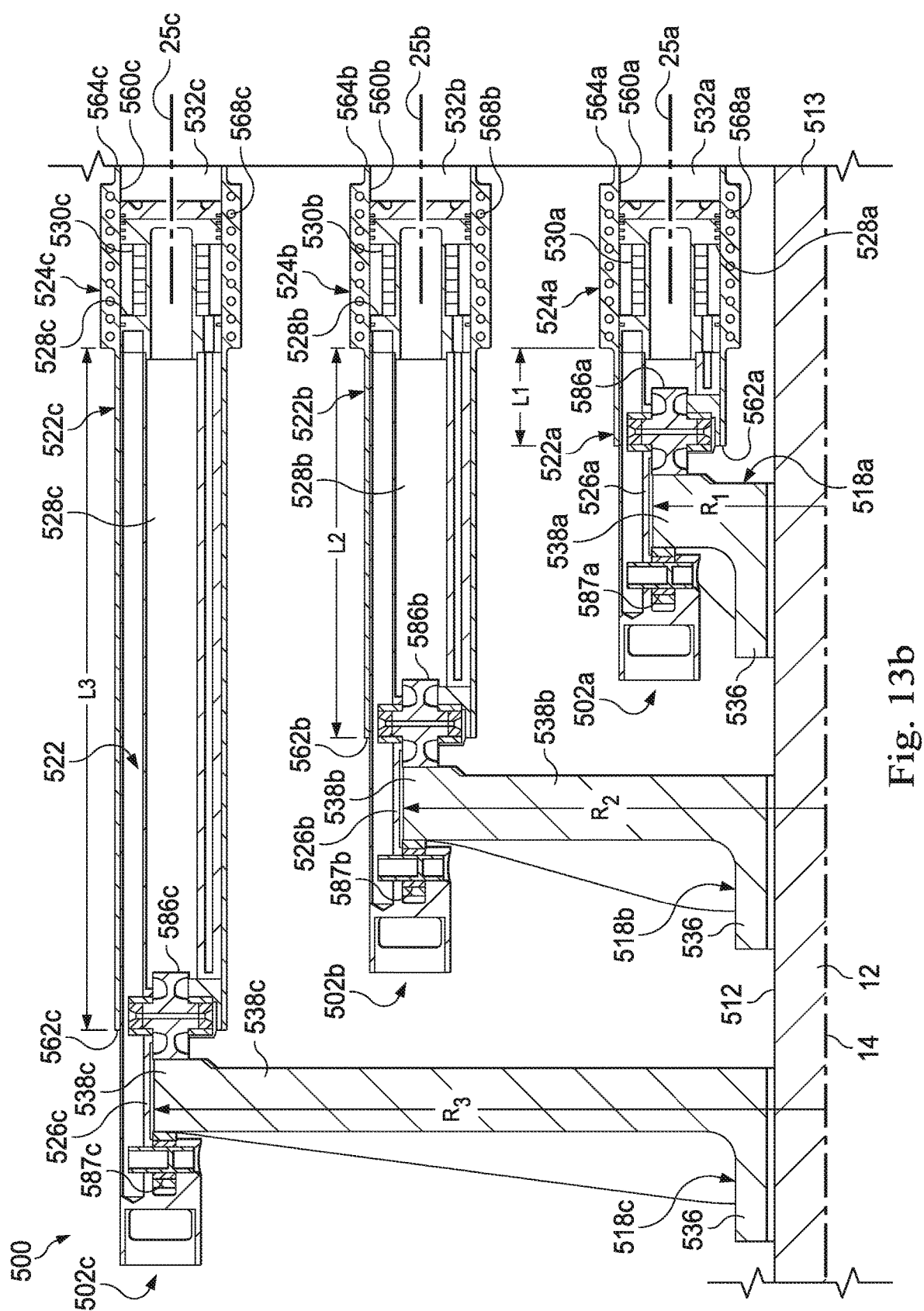
FIG. 13b is a cut-away side view of another embodiment of a linear electric device with stator cylinder assemblies deployed in parallel.

Similar to FIG. 13a in FIG. 13b, a linear electric device 10 (of FIG. 1) is illustrated as linear electric device 500, wherein two or more power generation assemblies 502 are positioned to be parallel with driveshaft 12 but at different diameters about driveshaft 12 to permit a desired level of power generation from linear electric device 10 across a range of RPM input speeds of the driveshaft 12 from an external source (not shown), such as from an internal combustion engine, wind turbine, water turbine or other rotary drive equipment. In the illustrated embodiment, three such power generation assemblies 502a, 502b, 502c are shown, each associated with a cam 518a, 518b, 518c mounted on driveshaft 12. While in FIG. 13a each power generation assembly is described as being positioned between a pair of cams 418 (see FIG. 13a), as previously described in other embodiments, a power generation assembly need only have a single magnet assembly reciprocating in a coil assembly. Thus, shown in FIG. 14b is a driveshaft 12 extending along a driveshaft axis 14. Mounted along driveshaft 12 between driveshaft ends 512 and 513, in spaced apart relationship to one another, are at first, second and third harmonic cams 518a, 518b and 518c. Cam 518a has a first cam diameter $D_1$ (defined as $R_1*2$); cam 518b has a second cam diameter $D_2$ (defined as $R_2*2$) that is greater than the first cam diameter $D_1$; and cam 518c has a third cam diameter $D_3$ (defined as $R_3*2$) that is greater than the second cam diameter $D_2$. In some embodiments, power generation assemblies 502a, 502b 502c may have the same angular position about driveshaft 12 so as to be generally adjacent one another, but radially spaced apart from one another in the same plane extending radially from driveshaft 12, while in other embodiments, power generation assemblies 502a, 502b, 502c may have different angular positions about driveshaft 12.

More specifically, power generation assembly 502a is comprised of a first magnet assembly 522a which magnet assembly 522a is axially aligned within a stator cylinder assembly 524a disposed along a coil assembly axis 25a. Stator cylinder assembly 524a is formed of a stator cylinder 560a extending between a first end 562a and a second end 564a with windings 568a disposed along stator cylinder 560a. Coil assembly axis 25a is spaced apart from, but generally parallel with, driveshaft axis 14 of driveshaft 12. Magnet assembly 522a includes a cam follower assembly 526a attached to a magnet slide arm 528a to which is mounted a magnet 530a. Cam follower assembly 526a includes a first engagement mechanism 586a and a second engagement mechanism 587a and straddles cam 518a so as to be engaged by engagement mechanism s 586a, 587a. Cam follower assembly 526a is attached to and acts upon magnet slide arm 528a which carries magnet 530a. At least one set of windings 568a along stator cylinder 560a generally define a magnet slide chamber 532a within and through which magnet 530a can translate.

Power generation assembly 502b likewise is comprised of a second magnet assembly 522b axially aligned within a stator cylinder assembly 524b disposed along a coil assembly axis 25b. Stator cylinder assembly 524b is formed of a stator cylinder 560b extending between a first end 562b and a second end 564b and windings 568b disposed along stator cylinder 560b. Coil assembly axis 25b is spaced apart from, but generally parallel with, driveshaft axis 14 of driveshaft 12. Magnet assembly 522b includes a cam follower assembly 526b attached to a magnet slide arm 528b to which is mounted a magnet 530b. Cam follower assembly 526b includes a first engagement mechanism 586b and a second engagement mechanism 587b and straddles cam 518b so as to be engaged by engagement mechanism 586b, 587b, which are shown as rollers in this embodiment. Cam follower assembly 526b is attached to and acts upon magnet slide arm 528b which carries a magnet 530b. At least one set of windings 568b along stator cylinder 560b generally define a magnet slide chamber 532b within and through which magnet 530b can translate.

Power generation assembly 502c likewise is comprised of a third magnet assembly 522c axially aligned within a stator cylinder assembly 524c disposed along a coil assembly axis 25c. Stator cylinder assembly 524c is formed of a stator cylinder 560c extending between a first end 562c and a second end 564c and windings 568c disposed along stator cylinder 560c. Coil assembly axis 25c is spaced apart from, but generally parallel with, driveshaft axis 14 of driveshaft 12. Magnet assembly 522c includes a cam follower assembly 526c attached to a magnet slide arm 528c to which is mounted a magnet 530c. Cam follower assembly 526c includes a first engagement mechanism 586c and a second engagement mechanism 587c and straddles cam 518c so as to be engaged by engagement mechanism s 586c, 587c, which are shown as rollers in this embodiment. Cam follower assembly 526c is attached to and acts upon magnet slide arm 528c which carries a magnet 530c. At least one set of windings 568c along stator cylinder 560c generally define a magnet slide chamber 532c within and through which magnet 530c can translate.

Stator cylinder 560a associated with power generation assembly 502a is spaced apart from driveshaft 12 at a first radius $R_1$, stator cylinder 560b associated with power generation assembly 502b is spaced apart from driveshaft 12 at a second radius $R_2$, and stator cylinder 560c associated with power generation assembly 502c is spaced apart from driveshaft 12 at a second radius $R_3$, where the second radius $R_2$ is greater than the first radius $R_1$ and the third radius $R_3$ is greater than the second radius $R_2$. In some embodiments, therefore, a plurality of first stator cylinders 560a may be spaced about driveshaft 12 at the first radius $R_1$; a plurality of second stator cylinders 560b may be spaced about driveshaft 12 at the second radius $R_2$; and a plurality of third stator cylinders 560c may be spaced about driveshaft 12 at the second radius $R_3$.

In one or more embodiments, magnet slide arm 528a has a first length L1, magnet slide arm 528b has a second length L2 and magnet slide arm 528c has a third length, where L3 is longer than L2, which is longer than L1. In this regard, the lengths of the shafts 104 (see FIG. 3) of the various magnet slide arm 528 may be adjusted as desired for the appropriate magnet slide length L.

Each cam follower assembly 526a, 526b, 526c straddles its respective cam 518a, 518b, 518c and is movable with respect to its respective cam 518a, 518b, 518c so that radial rotation of the respective cams 518a, 518b, 518c resulting from rotation of driveshaft 12 can translate into axial movement of magnet slide arms 528a, 528b, 528c within their respective stator cylinder assemblies 524a, 524b, 524c.

In one or more embodiments, each cam 518 further includes a circumferential shoulder 538 extending around the cylindrical periphery of a cam hub 536. Shoulder 538 is generally curvilinear in shape and can be characterized as having a certain frequency, where the frequency may generally refer to the number of occurrences of repeating peaks and troughs about the 360-degree circumference of the circumferential shoulder 538. In some embodiments, the curvilinear shape of shoulder 538a of the first cam 518a is of a first frequency and the curvilinear shape of shoulder 538b of the second cam 518b is of a second frequency, which in some embodiments may differ from the first frequency, permitting different power generation assemblies 502 to have different electrical and/or waveform outputs. Likewise, the curvilinear shape of shoulder 538c of the third cam 518c is of a third frequency which may differ from the first and second frequencies. In some embodiments, it may be desirable for the magnet assemblies 522a, 522b and 522c to translate in unison. In such case, the third frequency is less than the second frequency which is less than the first frequency. In other embodiments, it may be desirable for magnet assembly 522c to translate more rapidly than magnet assembly 522b and for magnet assembly 522b to translate more rapidly than magnet assembly 522a, in which case, the third frequency may be equal to or greater than the second frequency which may be equal to or greater than the first frequency. Thus, different electrical and/or waveform outputs can be achieved as desired without altering the rotational speed of driveshaft 12.

Similarly, in one or more embodiments, the amplitude of the curvilinear shoulders 538 of each cam 518a, 518b and 518c are the same, with the depth of the troughs and the height of the peaks being substantially equal, while in other embodiments, the depth of the troughs may differ from height of the peaks, permitting different power generation assemblies 502 to have different electrical and/or waveform outputs. In some embodiments, the amplitude of the second and third cams 518b, 518c, respectively is less than the amplitude of the first cam 518a, as well as from one another, in order to adjust timing of the respective power generation assemblies 502b, 502c. Because cam 518a has a different diameter $D_1$ than the diameter $D_2$ of cams 518b, 518c, shoulder 538 of the respective cams 518a, 518b, 518c are at different diameters. As such, power generation assemblies 502a, 502b, 502c may have the same angular position about driveshaft 12 so as to be generally adjacent one another, but radially spaced apart from one another in the same plane extending radially from driveshaft 12.

While only three sets of cam pairs are illustrated, any number of sets of cam pairs may be utilized, each set with a different diameter D, thereby allowing the density of power generation assemblies 502 about driveshaft 12 to be increased. It will be appreciated that the greater number of power generation assemblies 502 about driveshaft 12, the greater the power generation capacity of linear electric device 10. Thus, the foregoing arrangement allows greater alternator power output than would a traditional electrical alternator.

Figure 14:
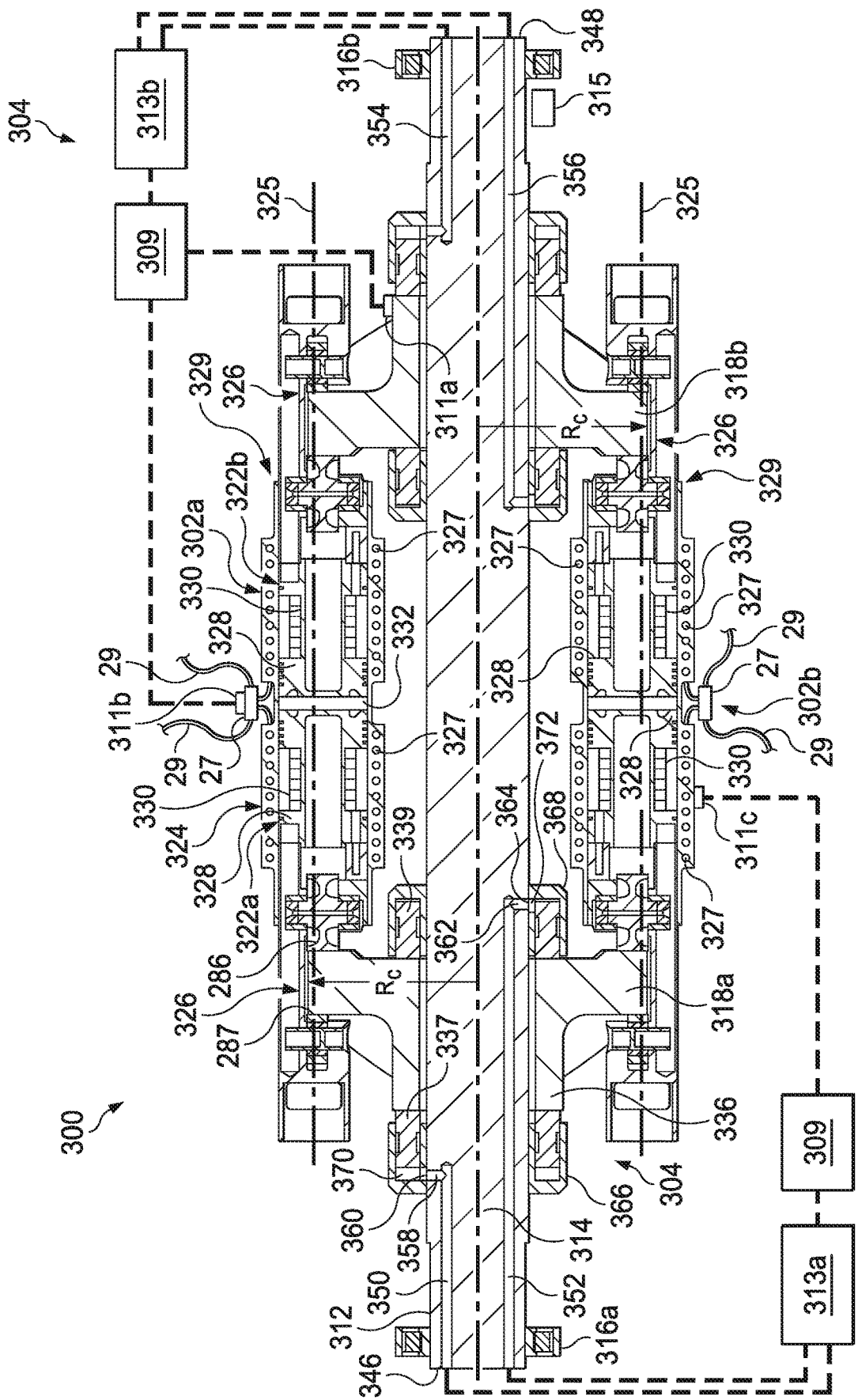
FIG. 14 is a cut-away side view of a linear electric device with a radial adjustment mechanism for altering the relative position of a cam on a driveshaft.

Turning to FIG. 14, linear electric device 300 is illustrated, where one or more cams 318, such as spaced apart cams 318a and 318b, are radially adjustable relative to driveshaft 312 utilizing a radial adjustment mechanism 304. Specifically, in FIG. 14, a simplified longitudinal section and cutaway view of a linear electric device 300 is shown, where driveshaft 312 extends along a primary axis 314 and passes axially through the center of the linear electric device 300. Driveshaft 312 is supported by a pair of bearings 316a, 316b in a fixed axial position. Positioned along driveshaft 312 in spaced apart relationship to one another are harmonic cams 318a, 318b. A power generation assembly 302a comprises a first magnet assembly 322a and a second magnet assembly 322b which magnet assemblies 322a, 322b are axially aligned with one another within a stator cylinder assembly 324 disposed along a coil assembly axis 325. Coil assembly axis 325 is spaced apart from but generally parallel with primary axis 314 of driveshaft 312. Each magnet assembly 322 generally includes a cam follower assembly 326 attached to a magnet slide 328 to which is mounted a magnet 330. Each cam follower assembly 326 straddles its respective cam 318 and moves magnet 330 by virtue of magnet slide 328. Stator cylinder assembly 324 generally includes a stator cylinder 329 along which windings 327 are disposed. Opposed magnet slides 328 within cylinder assembly 324 generally define a magnet slide chamber 332 that allows the magnet slides to pass though the windings 327 in order to generate electric power. Rotation of the driveshaft 312 from an external source (not shown) such as an internal combustion engine, wind turbine, water turbine or other rotary power source results in rotation of cams 318a, 318b, which in turn causes magnet slides 328 to reciprocate though magnet slide chamber 332 along coil assembly axis 325, all as generally described above with respect to other embodiments. In the illustrated embodiment, linear electric device 300 further includes a second power generation assembly 302b symmetrically positioned relative to power generation 302a.

Driveshaft 312 is further characterized by a first end 346 and a second end 348. Axially formed in at least one end of driveshaft 312 is a first axially extending hydraulic passage 350 and a second axially extending hydraulic passage 352, such as shown at first end 346. In the illustrated embodiment, second end 348 likewise has a first axially extending hydraulic passage 354 and a second axially extending hydraulic passage 356. A first radial passage 358 in fluid communication with the first hydraulic passage 350 is formed in driveshaft 312 and terminates at an outlet 360. Likewise, a second radial passage 362 in fluid communication with the second hydraulic passage 352 is formed in driveshaft 312 and terminates at an outlet 364.

Formed along driveshaft 312 is first collar 366 and second collar 368, each extending radially outward from driveshaft 312. In one embodiment, collars 366, 368 are spaced apart from one another along driveshaft 312. Collars 366, 368 may be integrally formed as part of driveshaft 312 or separately formed.

Cam 318 is mounted on driveshaft 312 adjacent outlets 360, 364 and collars 366, 368. In particular, cam 318 includes a hub 336 having a first end 337 mounted relative to first collar 366 so as to form a first pressure chamber 370 therebetween, with outlet 360 in fluid communication with first pressure chamber 370. Likewise, hub 336 has a second end 339 mounted relative to second collar 368 so as to form a second pressure chamber 372 therebetween, with outlet 364 in fluid communication with second pressure chamber 372.

Radial adjustment mechanism 304 may include a hydraulic fluid source 313a in fluid communication with each of hydraulic passage 350 and hydraulic passage 352 to alternatively supply pressurized fluid (not shown) to one or the other of first pressure chamber 370 or second pressure chamber 372. In this regard, radial adjustment mechanism 304 may further include a controller 309 to control delivery of fluid from fluid source 313 to the pressure chambers 370, 372. In this regard, controller 309 may receive data from one or more sensors 311 about a condition of linear electric device 300, such as the rotational speed of cam 318 (sensor 311a) or shape of waveform being generated (sensor 311b) or the power output (sensor 311c), and control delivery of fluid from fluid source 313 in order to optimize the position of cam 318 relative to driveshaft 312 for a particular purpose. For example, it has been found that cam 318 may be in a first radial orientation relative to driveshaft 312 when a first waveform shape is desired from linear electric device 300 and cam 318 may be in a second radial orientation (different than the first radial orientation) relative to driveshaft 312 when a second waveform shape is desired from linear electric device 300. Persons of ordinary skill in the art will appreciate that application of a pressurized fluid to first pressure chamber 370 will result in radial rotation of cam 318 in a first direction relative to driveshaft 312 and application of a pressurized fluid (not shown) to second pressure chamber 372 will result in radial rotation of cam 318 in a second direction relative to driveshaft 312. Moreover, the relative pressures of the pressurized fluids in each of the chambers 370, 372 may be adjusted to adjust the radial orientation of cam 318 on driveshaft 12, as described above. It will also be appreciated that the foregoing is particularly desirable because changes to the relative position of cam 318 may be made dynamically in real time while linear electric device 300 is in operation. These changes may be based on monitoring of various operational parameters and/or conditions of linear electric device 300 with one or more sensors 315 in real time. Thus, in some embodiments, based on measurements from sensor 315, hydraulic fluid source 313 may be operated to rotate cam 318 in a first direction or a second direction relative to driveshaft 312 in order to achieve a desired output from a power generation assembly 302. Alternatively, the system may be static by maintaining the relative fluid pressure in each chamber at the same pressure.

Figure 15:
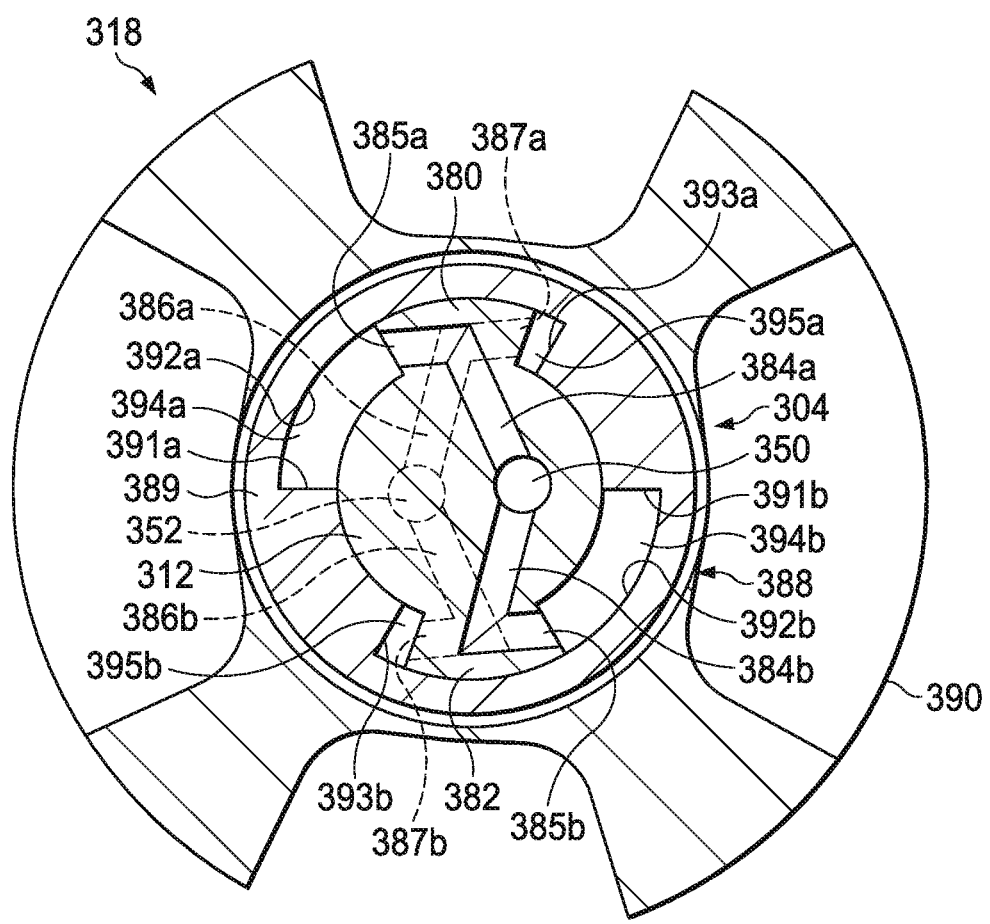
FIG. 15 is a cut-away axial view another embodiment of a radial adjustment mechanism for altering the relative position of a cam on a driveshaft.
Figure 16:
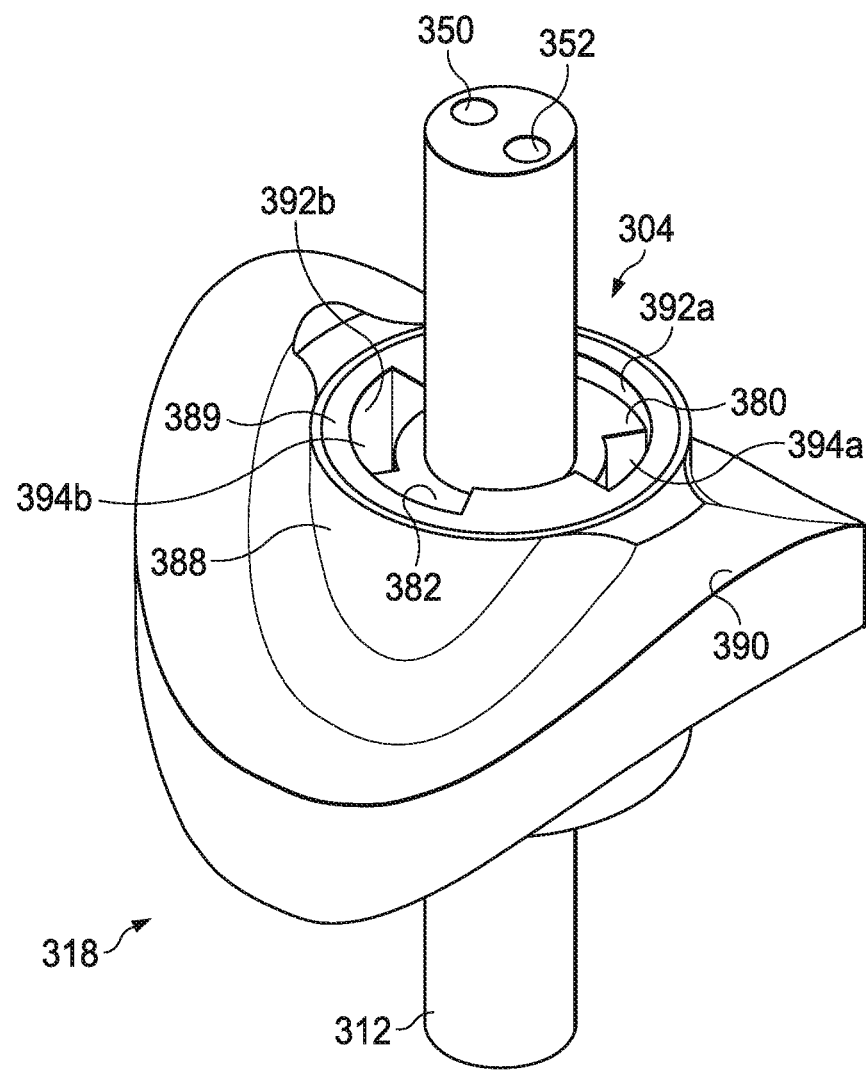
FIG. 16 is a perspective view of the radial adjustment mechanism of FIG. 15.

Turning to FIGS. 15 and 16, cam 318 is shown with another embodiment of radial adjustment mechanism 304. Specifically, in this embodiment, driveshaft 312 includes a first lug 380 and second lug 382, each extending radially outward from driveshaft 312. In one embodiment, lugs 380, 382 opposed one another about driveshaft 312. Lugs 380, 382 may be integrally formed as part of driveshaft 312, as shown, or separately formed.

Driveshaft 312 further includes a first axially extending hydraulic passage 350 and a second axially extending hydraulic passage 352, preferably of varied axial lengths.

A first set of radial passages 384a, 384b is in fluid communication with the first axially extending hydraulic passage 350, each of the radial passages 384a, 384b formed in a lug 380, 382, respectively, and terminates at a ported lug outlet 385a, 385b. Likewise, a second set of radial passages 386a, 386b (shown in dashed), preferably spaced apart axially from the first set of radial passages 384a, 384b, is in fluid communication with the second axially extending hydraulic passage 352. Each of the radial passages 386a, 386b is formed in a lug 380, 382, respectively, and terminates at a ported lug outlet 387a, 387b.

Cam 318 is mounted on driveshaft 312 adjacent outlets 385, 387 and lugs 380, 382. In particular, cam 318 includes a hub 388 having a hub wall 389 with a curvilinear shoulder 390 extending radially outward from the outer circumference of hub wall 389. In some embodiments, as illustrated, shoulder 390 may be shaped to have two peaks with a corresponding number of troughs, such that the cam profiles describe two complete cycles per revolution and are thus double harmonics, while in other embodiments, shoulder 390 may have other number of peaks and troughs, as desired.

Formed along the inner circumference of hub wall 389 are first and second spaced apart slots 392a, 392b, each slot 392a, 392b disposed to receive a lug 380, 382, respectively. In one or more embodiments, the slots 392a, 392b may oppose one another. First slot 392a is characterized by a first shoulder 391a and a second shoulder 393a, while second slot 392b is characterized by a third shoulder 391b and a fourth shoulder 393b. In particular, lug 380 extends into first slot 392*a* to form a first pressure chamber 394*a* between lug 380 and a first slot shoulder 391*a*, with outlet 385*a* in fluid communication with first pressure chamber 394*a*. Likewise, lug 382 extends into second slot 392*b* to form a third pressure chamber 394*b* between lug 382 and a third slot shoulder 391*b*, with outlet 385*b* in fluid communication with third pressure chamber 394*b*.

In one or more embodiments, such as the illustrated embodiments, a second pressure chamber 395*a* is formed between lug 380 and a second slot shoulder 393*a*, with outlet 387*a* in fluid communication with second pressure chamber 395*a*. Likewise, a fourth pressure chamber 395*b* is formed between lug 382 and a fourth slot shoulder 393*b*, with outlet 387*b* in fluid communication with fourth pressure chamber 395*b*.

It will be appreciated that in some embodiments, pressure chambers 394*b* and 395*b*, as well as passages 384*b* and 386*b* and outlets 385*b* and 387*b* can be eliminated, with only a pressure chamber 394*a* utilized as a first pressure chamber to rotate cam 318 in a first direction relative to driveshaft 312, and only a pressure chamber 395*a* utilized as a second pressure chamber to rotate cam 318 in a second opposite direction relative to driveshaft 312.

Moreover, during operation of linear electric device 300 employing the radial adjustment mechanism 304, pressurized fluid can be alternatingly supplied to chamber 394*a* or chamber 395*a* to dynamically adjust the radial position of cam 318 relative to driveshaft 312 as desired, rotating cam 318 either in a first clockwise direction or a second counterclockwise direction about driveshaft 312.

In one or more embodiments, power generation assemblies 20 can be engaged and disengaged from the driveshaft 12 as power requirements for electric device 10 change. This is particularly true where different sets of power generation assemblies 20 are connected to different sets of cams 18, such as is the case in FIGS. 13*a* and 13*b*. During start-up or when the electric device is subjected to heavy loads, both all of the power generation assemblies 20 can be used to provide power to driveshaft 12. Where power requirements are lower, electric device 10 can operate only with a portion of the power generation assemblies 20. For example, electric device 400 shows power generation assembly 402*a* engaging cams 418*a*, 418*b*, while power generation assembly 402*b* engaging cams 418*c*, 418*d*. Likewise, electric device 500 shows power generation assembly 502*a* engaging cam 518*a*, power generation assembly 502*b* engaging cam 518*b* and power generation assembly 502*c* engaging cam 518*c*. In each case, electric device 10, 400, 500, as the case may be, may include a clutch (not shown) to engage and disengage power generation assemblies 20, 402, 502 from driveshaft 12. In one or more embodiments, one or more cams 18, 418, 518 may include a clutch (not shown) that engages and disengages cams 18, 418, 518 from driveshaft 12. Such a clutch man be mechanically operated, hydraulically operated, electrically operated or operated in any other way generally known in the industry. In one or more embodiments, cams 18, 418, 518 may be rotated to engage and disengage the driveshaft 12 utilizing the radial adjustment mechanism 304 illustrated in FIGS. 14, 15 and 16, whereby rotation of cams 318 in a first direction couples cams 318 to driveshaft 312 and rotation in a second direction, opposite the first direction, decouples cams 318 from driveshaft 312.

It will be appreciated that in each of the embodiments of an electric device 10 described above, the electric device 10 may be utilized as a linear electric alternator to generate electricity in the form of an electrical output or alternatively, as an electric motor to driveshaft 12. In the former case, electrical terminal 27 may be utilized to direct electrical power generated in windings 68 (and 70) away from linear electric alternator 10 via leads 29 as an electrical output, whereas in the latter case, electrical terminal 27 may be used to supply electricity to windings 68 (and 70) via leads 29 as an electrical input in order to energize windings 68 (and 70). In such case, the energized electromagnetic windings or coils may be utilized to urge magnet slide arm 28 to move axially within stator cylinder 60. In one or more embodiments, the electrical input is an alternating electric current.

Figure 17:
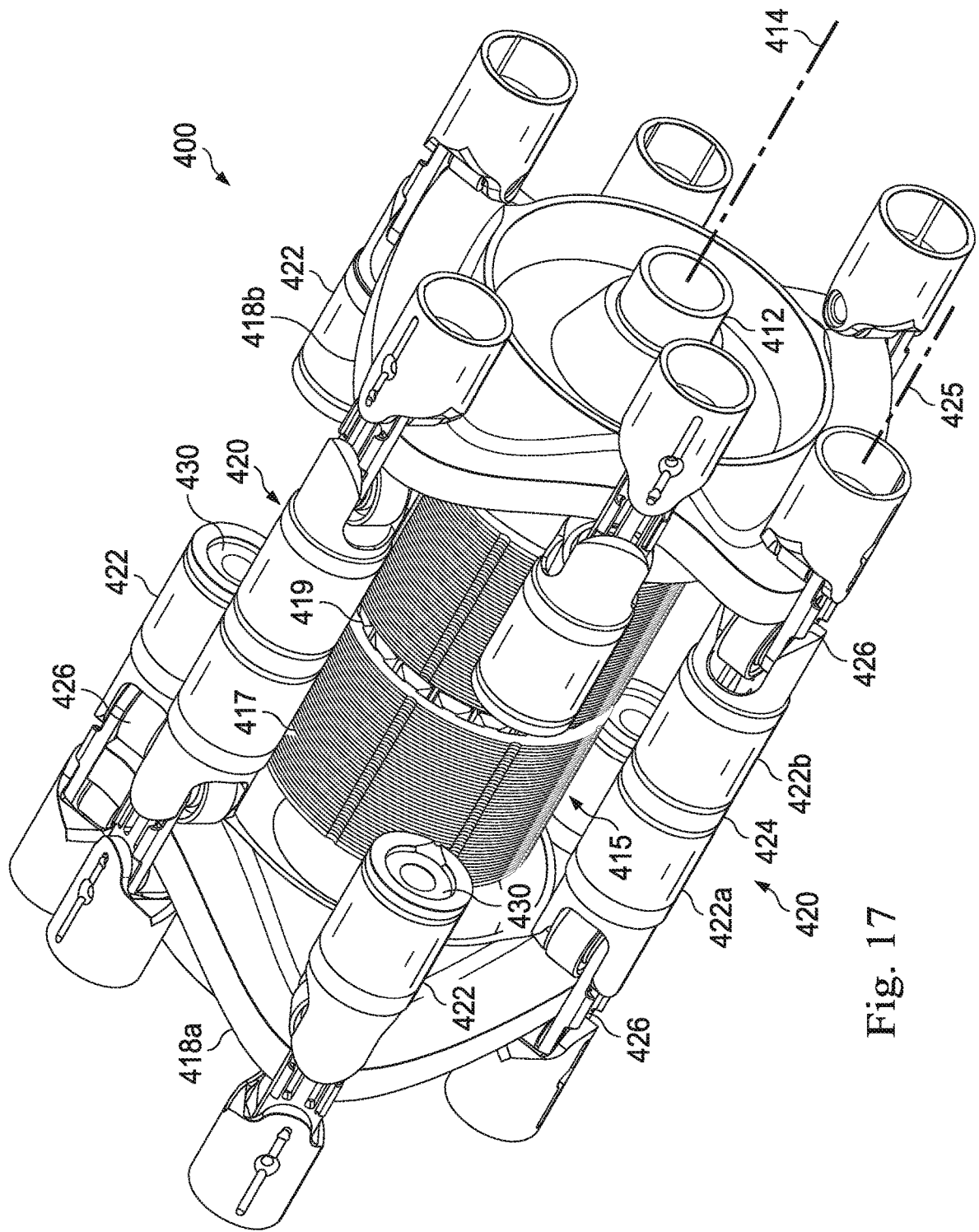
FIG. 17 is a perspective view of another embodiment of view of an electric device constructed according to the present invention showing a plurality of radial electric power assemblies engaging twin, harmonic cams and positioned around an axial electric power assembly disposed on a driveshaft.

Turning to FIG. 17 another embodiment of electric device 400 is illustrated wherein two harmonic cams 418*a*, 418*b* are shown spaced apart along a driveshaft 412 which extends along a driveshaft axis 414 with an electric power assembly 415 disposed along driveshaft 412 between the two cams 418*a*, 418*b* and with at least one electric power assembly 420 positioned radially outward from driveshaft 412 and electric power assembly 415. As such, electric power assembly 415 is coupled to the driveshaft and functions as an axial electric power assembly or a driveshaft electric power assembly, as distinguished from the radial electric power assemblies positioned radially outward from driveshaft 412 and coupled to cams. In the illustrated embodiment, six power generation assemblies 420 are shown spaced symmetrically about driveshaft 412 so as to be spaced from one another and driveshaft 412. Each power generation assembly 420 includes a stator cylinder assembly 424 and at least one magnet assembly 422 which may be configured in some embodiments as generally described above with respect to FIGS. 1-16. In one or more embodiments, each power generation assembly 420 has a first magnet assembly 422*a* and a second magnet assembly 422*b* which magnet assemblies 422*a*, 422*b* are axially aligned with one another within stator cylinder assembly 424 disposed along a coil assembly axis 425. Coil assembly axis 425 is spaced apart from but generally parallel with driveshaft axis 414 of driveshaft 412. Each magnet assembly 422 generally includes a cam follower assembly 426 attached to a magnet slide arm (not shown) to which is mounted a magnet 430. The opposed magnet slide arms of a power generation assembly 420 are adapted to reciprocate in opposite directions along coil assembly axis 425. Each cam follower assembly 426 straddles a corresponding cam 418 and acts to move a magnet 430 through its associated magnet slide arm (not shown) within a stator cylinder assembly 424 as generally described above.

In the embodiment of FIG. 17, disposed along driveshaft 412 adjacent harmonic cams 418*a*, 418*b* is a driveshaft electric power assembly 415. In this embodiment, driveshaft electric power assembly 415 is positioned between harmonic cams 418*a*, 418*b* and radially inward of power generation assemblies 420, and generally includes a stator assembly 417 and a rotor assembly 419. In or more embodiments, a plurality of power generation assemblies 420 are positioned around driveshaft 412 at a first radius and the driveshaft electric power assembly 415 is characterized by an outer radius that is less than the first radius such that the driveshaft electric power assembly 412 is positioned radially inward of the power generation assemblies 420. Although not limited to a particular configuration in electric device 400 other than being positioned along driveshaft 412 between harmonic cams 418*a*, 418*b*, in one or more embodiments, driveshaft electric power assembly 415 is coaxial with driveshaft 412, with a rotor assembly 419 mounted on driveshaft 412 and a stator assembly 417 spaced radially outward from stator assembly 417 in the general arrangement of a radial flux electric motor. In other embodiments, driveshaft electric power assembly 415 may be an axial flux electric motor, in which case rotor assembly 419 and stator assembly 417 are spaced apart from one another axially along driveshaft 412.

Figure 18:
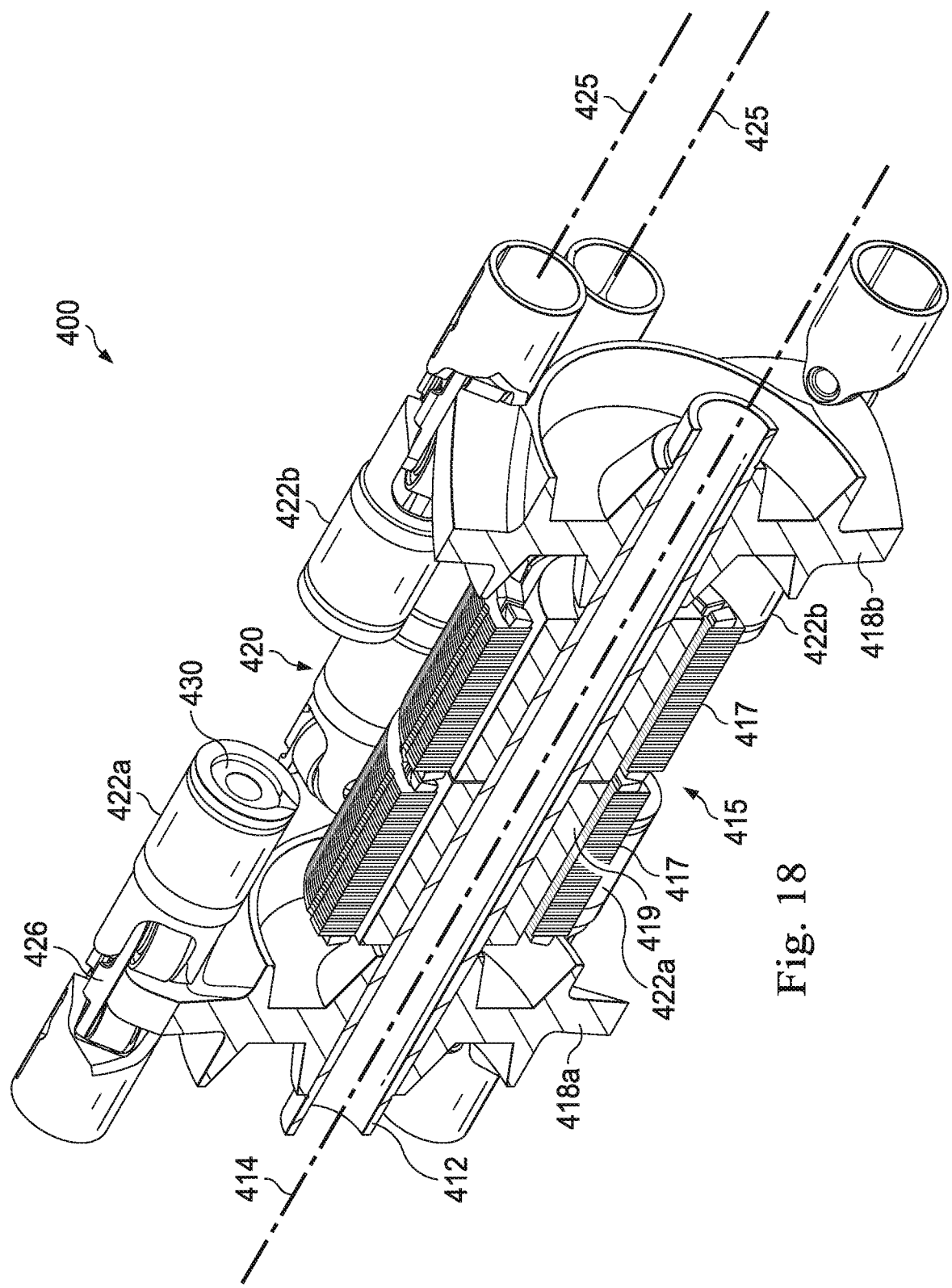
FIG. 18 is a perspective cutaway view of the electric device of FIG. 17.

FIGS. 18 and 19 better illustrated the positioning of driveshaft electric power assembly 415 along driveshaft 412 adjacent harmonic cams 418a, 418b. In these figures, rotor assembly 419 is shown mounted on driveshaft 412 between harmonic cams 418a, 418b. In this particular embodiment, driveshaft 412 is shown as hollow, although it need not be. As will be appreciated, stator assembly 417 and rotor assembly 419 are not limited to a particular configuration. In one or more embodiments, rotor assembly 419 may include one or more windings or coils, while in other embodiments, rotor assembly 419 may include one or more permanent magnets. Spaced radially outward from rotor assembly 419 is one or more stator assemblies 417, which in some embodiments may consist of electromagnetic windings or coils 469 while in other embodiments may consist of one or more permanent magnets (not shown). Stator assembly 417 may generally be mounted within an electric motor housing or frame (not shown) as is well known in the art. As a non-liming example, stator assembly 417 may be supported by support block, such as enclosure 53 described above, that also supports first magnet assembly 422a, second magnet assembly 422b and stator cylinder assembly 424 of the power generation assemblies 420.

It will be appreciated that one of the benefits of the above-described electric device 400 is that electric power assemblies 420 may be utilized to enhance the torque output of electric device 400 and driveshaft electric power assembly 415 may be utilized to enhance the speed output of electric device 400. In other words, electric power assemblies 420 may be utilized to provide torque to driveshaft 412, while driveshaft electric power assembly 415 may be utilized to provide speed to driveshaft 412. For example, during start-up, electric power assemblies 420 may be actuated to provide torque to driveshaft 412 through harmonic cams 418a, 418b, while driveshaft electric power assembly 415 may be utilized during on-going operation of driveshaft 412. In this regard, electric device 400 may include one or more clutches (not shown) to engage and disengage radial electric power assemblies 420 or axial electric power assembly 415 from driveshaft 412. Such a clutch may be mechanically operated, hydraulically operated, electrically operated or operated in any other way generally known in the industry. In one or more embodiments, harmonic cams 418a, 418b may include a clutch (not shown) that engages and disengages cams 418a, 418b from driveshaft 412. In one or more embodiments, cams 418a, 418b may be rotated to engage and/or disengage the driveshaft 12 (and hence, radial electric power assemblies 420) utilizing the radial adjustment mechanism 304 illustrated in FIGS. 14-16, whereby rotation of cams 418 in a first direction couples cams 418 to driveshaft 412 and rotation in a second direction, opposite the first direction, decouples cams 418 from driveshaft 412. Likewise, a clutch (not shown) disposed along driveshaft 12 between cams 418a, 418b may be utilized to engage and/or disengage driveshaft electric power assembly 415 from driveshaft 12.

In this regard, one or more of the controller 111, power source 109 and inverter 108 such as described above in FIG. 6 may be utilized to selectively operate power generation assemblies 420 and driveshaft electric power assembly 415 based on the output requirements of electric device 400 during a particular stage of operation. In this regard, controller 111 may be used to dynamically switch back and forth between power generation assemblies 420 and driveshaft electric power assembly 415, or may be used to operate both power generation assemblies 420 and driveshaft electric power assembly 415, again, depending on the output requirements of electric device 400 during a particular stage of operation. The electrical inverter 108 may be electrically connected to a power source 109 via electrical leads 29, which may also interconnect electrical inverter 108 to driveshaft electric power assembly 415 to convert alternating current generated by stator assembly 417 into direct current that can be stored by power source 109 or alternatively, to supply power to stator assembly 417. In other embodiments, electrical inverter 108 may be eliminated.

In one or more embodiments, one benefit of the above descried electric device 10 operating as an electric motor is that the electric device can be used to alter or adjust the output RPM of the driveshaft 12 without the need for a variable frequency drive. Rather, various electromagnetic windings or coils associated with various cams may be selectively energized to produce different RMPs on driveshaft 12, particularly where the coil density among the windings differ. Thus, for example, a first set of electromagnetic windings or coils associated with a first stator cylinder and a first cam with a first number of lobes may be energized to drive the driveshaft at a first RPM speed. Thereafter, to a second set of electromagnetic windings or coils associated with a second stator cylinder and a second cam with a second number of lobes different than the first number of lobes may be energized to drive the driveshaft at a second RPM speed different than the first RPM speed. In one or more embodiments, the second cam has more lobes than the first cam, resulting in an increase in the output RPMs of the driveshaft, whereby the second RPM speed is greater than the first RPM speed. In such embodiments, opposing cams in an electric motor may be selected to have different frequencies. Moreover, in some embodiments, an electric device 10 having multiple cams 18 mounted on driveshaft 12 may be particularly suited for such adjustability. In this same vein, by adjusting the number of cams, the shape and number of cam lobes, the diameter of the cams and the arrangement of the magnetic slides relative to one another, such an electric motor can achieve significantly greater output and torque than traditional electric motors. In addition to being readily controlled to alter power output, an additional benefit of the electric devices described herein is their capability of easily controlling the waveform of the power output.

An additional benefit of the electric devices described herein is that they are readily scalable for large scale power generation.

Thus, an electric device has been described. The electric device can function as either an electric alternator to generate electricity or an electric motor to rotate a driveshaft. The electric device may include a driveshaft having a first end and a second end and disposed along a driveshaft axis; a first cam mounted on the driveshaft, the first cam having a cam hub attached to the driveshaft and a circumferential cam shoulder extending around a periphery of the hub, the cam shoulder having a first cam radius and a first curvilinear shape with a first surface and an opposing second surface, the shoulder having at least two lobes formed by the first curvilinear shape, each lobe characterized by a peak positioned between a first trough and a second trough and a lobe wavelength between the two troughs, the peak having a maximum amplitude for the lobe; and a first stator cylinder defined along a first coil assembly axis and adjacent the first cam, the stator cylinder having a first end and a second end with windings disposed along at least a portion of the first stator cylinder between the first and second ends and about the first coil assembly axis, the first coil assembly axis being parallel with but spaced apart from the driveshaft axis approximately the distance of the first cam radius, wherein a magnet slide chamber is defined within the first stator cylinder between the two cylinder ends. In other embodiments, the electric device may include a driveshaft having a first end and a second end and disposed along a driveshaft axis; a first cam mounted on the driveshaft, the first cam having a cam hub attached to the driveshaft and a circumferential cam shoulder extending around a periphery of the hub, the cam shoulder having a first cam radius and a first curvilinear shape with a first surface and an opposing second surface, the shoulder having at least two lobes formed by the first curvilinear shape, each lobe characterized by a peak positioned between a first trough and a second trough and a lobe wavelength between the two troughs, the peak having a maximum amplitude for the lobe; a second cam mounted on the driveshaft, the second cam having a cam hub attached to the driveshaft and a circumferential second cam shoulder extending around a periphery of the second cam hub, the cam shoulder of the second cam having a second cam radius approximately the same as the first cam radius and a second curvilinear shape with a first surface and an opposing second surface, the second cam shoulder having at least two lobes formed by the second curvilinear shape, each lobe characterized by a peak positioned between a first trough and a second trough and a lobe wavelength between the two troughs, the peak having a maximum amplitude for the lobe; a first stator cylinder defined along a first coil assembly axis, the first stator cylinder positioned between the two cams, the stator cylinder having a first end and a second end with windings disposed along at least a portion of the first stator cylinder between the first and second ends and about the first coil assembly axis, the first coil assembly axis being parallel with but spaced apart from the driveshaft axis approximately the distance of the first cam radius, wherein a magnet slide chamber is defined within the first stator cylinder between the two cylinder ends; a first magnet assembly, at least a portion of which is disposed in the first cylinder end of the first stator cylinder, the first magnet assembly engaging the curvilinear shaped shoulder of the first cam, the first magnet assembly axially movable within the magnet slide chamber; a first magnet carried by the portion of the first magnet assembly disposed in the first cylinder end; a second magnet assembly, at least a portion of which is disposed in the second cylinder end of the first stator cylinder, the second magnet assembly engaging the curvilinear shaped shoulder of the second cam, the second magnet assembly axially movable within the magnet slide chamber of the first stator cylinder; and a second magnet carried by the portion of the second magnet assembly disposed in the first stator cylinder. In other embodiments, the electric device may include a driveshaft having a first end and a second end and disposed along a driveshaft axis; a first cam mounted on the driveshaft, the first cam having a cam hub attached to the driveshaft and a circumferential cam shoulder extending around a periphery of the hub, the cam shoulder having a first cam radius and a first curvilinear shape with a first surface and an opposing second surface, the shoulder having at least two lobes formed by the first curvilinear shape, each lobe characterized by a peak positioned between a first trough and a second trough and a lobe wavelength between the two troughs, the peak having a maximum amplitude for the lobe; and a first magnet assembly defined along a first coil assembly axis and adjacent the first cam, the first coil assembly axis being parallel with but spaced apart from the driveshaft axis approximately the distance of the first cam radius, the first magnet assembly engaging the curvilinear shaped shoulder of the first cam, the first magnet assembly axially movable along the first coil assembly axis, wherein the magnet assembly comprises a first magnet slide arm having a first end and a second end, with a magnet attached adjacent the first end of the first magnet slide arm, the slide arm having at least one annular guide body of a magnet slide arm diameter and a smaller diameter neck extending from the annular guide body with the magnet disposed along the neck, and wherein the magnet assembly further comprises a cam follower assembly attached to the second end of the magnet slide arm, wherein the cam follower assembly includes an elongated body having a first end and a second, which ends are interconnected by an arm so as to form an opening in the elongated body between the two ends; an engagement mechanism mounted to the body at one of the ends and adjacent the slot, wherein a cam shoulder extends into the opening and the engagement mechanism bears against one of the cam surfaces. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has a second frequency; a first stator cylinder defined along a coil assembly axis, the stator cylinder having a first end and a second end with electromagnetic windings disposed about a circumference of the stator cylinder between the first end and second end, the coil assembly axis being parallel with but spaced apart from the driveshaft axis, wherein a magnet slide chamber is defined within the stator cylinder between the two cylinder ends; and a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has a second frequency; a first stator cylinder defined along a coil assembly axis, the stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; and a second stator cylinder having a first end and a second end, the second stator cylinder defined along the coil assembly axis so as to be axially aligned with the first stator cylinder; a third magnet assembly disposed in the first cylinder end of the second stator cylinder; and an opposing fourth magnet assembly disposed in the second cylinder end of the second stator cylinder. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first stator cylinder defined along a coil assembly axis, the stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; and a second stator cylinder defined along the coil assembly axis so as to be axially aligned with the first stator cylinder, the second stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends with a magnet assembly disposed in each second stator cylinder end so that magnet slide heads of the magnet assemblies of the cylinder oppose one another within the cylinder. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has a second frequency the same as the first curvilinear shape; a first stator cylinder defined along a coil assembly axis, the stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has a second frequency; a first stator cylinder defined along a coil assembly axis, the stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; wherein the first cam comprises a hub mounted on driveshaft with the circumferential shoulder extending around a periphery of hub, the curvilinear shaped first cam shoulder has at least two peaks and at least two troughs formed by the shoulder, wherein each trough includes a substantially flat portion at its base and wherein each peak is rounded at its apex; the second cam comprises a hub mounted on driveshaft with the circumferential shoulder extending around a periphery of hub, the curvilinear shaped second cam shoulder has at least two crests and at least two troughs formed by the shoulder and corresponding in number to the crests and troughs of the first cam, wherein each trough of the second cam is rounded at its base and wherein each peak includes a substantially flat portion at its apex. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first stator cylinder defined along a coil assembly axis, the stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; wherein the first cam comprises a hub mounted on driveshaft with the circumferential shoulder extending around a periphery of hub, the curvilinear shaped first cam shoulder has at least two peaks having a first peak amplitude and at least two troughs having a first trough amplitude, wherein the first trough amplitude is less than the first peak amplitude; and the second cam comprises a hub mounted on driveshaft with the circumferential shoulder extending around a periphery of hub, the curvilinear shaped second cam shoulder has at least two peaks having a second peak amplitude and at least two troughs having a second trough amplitude, wherein the second trough amplitude is greater than the second peak amplitude. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has a second frequency; a first stator cylinder defined along a coil assembly axis, the stator cylinder having a first end and a second end with electromagnetic windings disposed along at least a portion of the length of the cylinder between the two cylinder end, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; wherein the magnet assembly comprises a magnet slide arm having a first annular guide body of a magnet slide arm diameter spaced apart from a second annular guide body having a similar magnet slide arm diameter and interconnected by a smaller diameter neck, with a magnet slide attached to the first annular guide body and a cam follower attached to the second annular guide body. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has a second frequency; a first stator cylinder defined along a coil assembly axis, the stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; wherein the magnet assembly comprises a magnet slide arm having a first end and a second end, with a magnet slide attached to the first end of the magnet slide arm and a cam follower attached to the second end of the magnet slide arm, wherein the cam follower assembly includes an elongated body having a first end and a second end, wherein the elongated body is generally cylindrically shaped at each end, which ends are interconnected by an arm within which is formed a lubrication passage extending along a portion of the length of the arm between the two ends, the elongated body having an axially extending first slot in formed in the body adjacent the first end and an axially extending second slot formed in the body adjacent the second; a first roller mounted to the body in the first slot; and a second roller mounted to the body in the second slot, wherein the lubrication passage extends in the arm between the two rollers. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first stator cylinder defined along a coil assembly axis, the stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; and a first guidance cap positioned adjacent the first end of the driveshaft and a second guidance cap positioned adjacent the second end of the driveshaft, wherein each guidance cap is coaxially mounted around a driveshaft end, outwardly of the cam between the cam and the driveshaft end, wherein the guidance cap comprises a central bore through which the driveshaft extends and two or more symmetrically positioned follower bores radially spaced outward of central bore with each follower bore slidingly receiving the cylindrically shaped second end of a cam follower assembly. In other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has a second frequency; a first stator cylinder defined along a coil assembly axis, the stator cylinder having a first end and a second end with electromagnetic windings disposed along at least a portion of the length of the cylinder between the two cylinder ends, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; a second stator cylinder having a first end and a second end and defined along second coil assembly axis parallel with the first stator cylinder central axis but radially spaced outward from the first stator cylinder central axis; a third cam mounted on the driveshaft between the first cam and the first driveshaft end, the third cam having a circumferential shoulder of a third cam diameter and a third curvilinear shape with a third frequency, the third cam diameter being larger than the first cam diameter; and a fourth cam mounted on the driveshaft between the second cam and the second end of the driveshaft, the fourth cam having a circumferential shoulder of a fourth curvilinear shape which fourth curvilinear shape has a fourth frequency. In yet other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first stator cylinder defined along a coil assembly axis, the stator cylinder having a first end and a second end, the coil assembly axis being parallel with but spaced apart from the driveshaft axis, wherein a magnet slide chamber is defined within the cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; a second stator cylinder having a first end and a second end, the second stator cylinder defined along the coil assembly axis so as to be axially aligned with the first stator cylinder; a third magnet assembly disposed in the first cylinder end of the second stator cylinder; and an opposing fourth magnet assembly disposed in the second cylinder end of the second stator cylinder; a third stator cylinder having a first end and a second end and defined along second coil assembly axis parallel with the first stator cylinder central axis but radially spaced outward from the first stator cylinder central axis; a fifth magnet assembly disposed in the first cylinder end of the third stator cylinder; and an opposing sixth magnet assembly disposed in the second cylinder end of the third stator cylinder; a fourth stator cylinder having a first end and a second end, the fourth stator cylinder defined along the second coil assembly axis so as to be axially aligned with the third stator cylinder; a seventh magnet assembly disposed in the first cylinder end of the fourth stator cylinder; and an opposing eighth magnet assembly disposed in the second cylinder end of the fourth stator cylinder; wherein each cylinder has at least one coil disposed along at least a portion of the length of the cylinder between the two ends. In yet other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has the same frequency as the first curvilinear shape; a first stator cylinder defined along a coil assembly axis, the stator cylinder having a first end and a second end, the coil assembly axis being parallel with but spaced apart from the driveshaft axis, wherein a magnet slide chamber is defined within the first stator cylinder between the two cylinder ends; a first magnet assembly disposed in the first cylinder end of the first stator cylinder and an opposing second magnet assembly disposed in the second cylinder end of the first stator cylinder, the first magnet assembly engaging the curvilinear shaped shoulder of the first cam and the second magnet assembly engaging the curvilinear shaped shoulder of the second cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; a second stator cylinder having a first end and a second end and defined along second coil assembly axis parallel with the first stator cylinder central axis but radially spaced outward from the first stator cylinder central axis, wherein a magnet slide chamber is defined within the second stator cylinder between the two cylinder ends; a third magnet assembly disposed in the first cylinder end of the second stator cylinder and an opposing fourth magnet assembly disposed in the second cylinder end of the second stator cylinder; wherein each cylinder has at least one coil disposed along at least a portion of the length of the cylinder between the two ends. In yet other embodiments, the electric device may include a driveshaft having a first end and a second end and disposed along a driveshaft axis; a first cam mounted on the driveshaft, the first cam having a circumferential shoulder of a first cam diameter and a first curvilinear shape with a first frequency; a second cam mounted on the driveshaft spaced apart from the first cam, the second cam having a circumferential shoulder of a second curvilinear shape which second curvilinear shape has a second frequency; a first stator cylinder defined along a coil assembly axis, the stator cylinder having a first end and a second end with, the coil assembly axis being parallel with but spaced apart from the driveshaft axis, wherein a magnet slide chamber is defined within the first stator cylinder between the two cylinder ends; a first magnet assembly disposed in the first cylinder end of the first stator cylinder and an opposing second magnet assembly disposed in the second cylinder end of the first stator cylinder, each magnet assembly movable between an inner dead center position in which the magnet assembly is extended in the magnet slide chamber away from its corresponding cam and an outer dead center position in which the magnet assembly is retracted in the magnet slide chamber away from the inner dead center position; a second stator cylinder having a first end and a second end and defined along second coil assembly axis parallel with the first stator cylinder central axis but radially spaced outward from the first stator cylinder central axis, wherein a magnet slide chamber is defined within the second stator cylinder between the two cylinder ends; a third magnet assembly disposed in the first cylinder end of the second stator cylinder and an opposing fourth magnet assembly disposed in the second cylinder end of the second stator cylinder; wherein each cylinder has at least one coil disposed along at least a portion of the length of the cylinder between the two ends. In other embodiments, the electric device includes a driveshaft has a first end and a second end and disposed along a driveshaft axis, with a first hydraulic passage extending from a driveshaft end to a first outlet and a second hydraulic passage extending from a driveshaft end to a second outlet spaced apart from the first outlet; a first magnet slide disposed to reciprocate along a magnet slide axis, the first magnet slide axis being parallel with but spaced apart from the driveshaft axis; a first collar formed along the driveshaft adjacent the first outlet and a second collar formed along the driveshaft adjacent the second outlet, each collar extending radially outward from driveshaft; and a first cam rotatably mounted on the driveshaft adjacent the first and second collars, the first cam having a first hub having a first end mounted adjacent the first collar so as to form a first pressure chamber between the hub first end and the first collar, with the first outlet in fluid communication with the first pressure chamber, the hub having a second end mounted adjacent the second collar so as to form a second pressure chamber between the hub second end and the second collar, with the second outlet in fluid communication with second pressure chamber, with a circumferential cam shoulder extending around a periphery of the hub, the cam shoulder having a first cam diameter and a first polynomial shaped track. In other embodiments, the electric device includes a driveshaft having a first end and a second end and disposed along a driveshaft axis, with a first hydraulic passage extending from a driveshaft end and a second hydraulic passage extending from a driveshaft end, a first set of radial passages in fluid communication with the first hydraulic passage and a second set of radial passages in fluid communication with the second hydraulic passage; a first magnet slide disposed to reciprocate along a magnet slide axis, the first magnet slide axis being parallel with but spaced apart from the driveshaft axis; a first cam rotatably mounted on the driveshaft, the first cam having a first hub with a circumferential cam shoulder extending around a periphery of the first hub, the cam shoulder having a first cam diameter and a first polynomial shaped track; a first radially extending lug formed along the driveshaft adjacent the first cam hub and a second radially extending lug formed along the driveshaft adjacent the first cam hub, a radial passage of the first set of radial passages terminating in a first ported lug outlet formed in the first lug and a radial passage of the second set of radial passages terminating in a second ported lug outlet formed in the first lug, a radial passage of the first set of radial passages terminating in a third ported lug outlet formed in the second lug and a radial passage of the second set of radial passages terminating in a fourth ported lug outlet formed in the second lug; a first pressure chamber formed between the first lug and the first cam hub and a second pressure chamber, formed between the first lug and the first cam hub, the first ported lug outlet in the first lug in fluid communication with the first pressure chamber and the third ported lug outlet in the first lug in fluid communication with the second pressure chamber; a third pressure chamber formed between the second lug and the first cam hub; and a fourth pressure chamber formed between the second lug and the first cam hub, the second ported lug outlet in the second lug in fluid communication with the second pressure chamber and the fourth ported lug outlet in the second lug in fluid communication with the fourth pressure chamber. In other embodiments, the electric device includes a driveshaft having a first end and a second end and disposed along a driveshaft axis; a magnet slide disposed to reciprocate along a magnet slide axis, the magnet slide axis being parallel with but spaced apart from the driveshaft axis, and a first cam mounted on the driveshaft, the first cam comprising a cam hub attached the driveshaft, and a circumferential cam shoulder extending around a periphery of the hub, the cam shoulder having a first cam diameter and a first segmented polynomial shape, the shoulder having at least two lobes formed by the polynomial shape, each lobe characterized by a peak positioned between a first trough and a second trough and a lobe wavelength between the two troughs, the peak having a maximum amplitude for the lobe, where the wavelength distance from the first trough to peak along an ascending shoulder portion of the lobe is greater than the wavelength distance from the peak to the second trough along a descending shoulder portion of the lobe; and a second cam mounted on the driveshaft and spaced apart from the first cam, the second cam comprising a cam hub attached the driveshaft, and a circumferential cam shoulder extending around a periphery of the hub, the cam shoulder having a second segmented polynomial shape of constantly changing slope which second segmented polynomial shape has the same frequency as the first segmented polynomial shape, the shoulder having at least two lobes formed by the second polynomial shape, each lobe characterized by a peak positioned between a first trough and a second trough and a lobe wavelength between the two troughs, the peak having a maximum amplitude for the lobe, where the wavelength distance from the first trough to peak along an ascending shoulder portion of the lobe is greater than the wavelength distance from the peak to the second trough along a descending shoulder portion of the lobe, wherein the number of lobes of the second cam corresponds with the number of lobes of the first cam; and wherein the cams oppose one another so that the peak of a lobe of the first cam is substantially aligned with the peak of a lobe of the second cam, but no portion of first segmented polynomial shaped shoulder is parallel with a portion of second segmented polynomial shaped shoulder. In other embodiments, the electric device includes a driveshaft having a first end and a second end and disposed along a driveshaft axis; a magnet slide disposed to reciprocate along a magnet slide axis, the magnet slide axis being parallel with but spaced apart from the driveshaft axis, and a first cam mounted on the driveshaft, the first cam comprising a cam hub attached the driveshaft, and a circumferential cam shoulder extending around a periphery of the hub, the cam shoulder having a first cam diameter and a first segmented polynomial shape, the shoulder having at least two lobes formed by the polynomial shape, each lobe characterized by a peak positioned between a first trough and a second trough, the lobe having an ascending shoulder portion between the first trough and the peak and a descending shoulder portion between the peak and the second trough, wherein the average slope of the ascending shoulder portion is greater than the average slope of the descending shoulder portion; and a second cam mounted on the driveshaft and spaced apart from the first cam, the second cam comprising a cam hub attached the driveshaft, and a circumferential cam shoulder extending around a periphery of the hub, the cam shoulder having a second segmented polynomial shape which second segmented polynomial shape has the a second frequency, the shoulder having at least two lobes formed by the second polynomial shape, each lobe characterized by a peak positioned between a first trough and a second trough, the lobe having an ascending shoulder portion between the first trough and the peak and a descending shoulder portion between the peak and the second trough, wherein the average slope of the ascending shoulder portion is greater than the average slope of the descending shoulder portion; and wherein the first segmented polynomial shaped shoulder and the second segmented polynomial shaped shoulder oppose one another so as to be constantly diverging or converging from one another. In other embodiments, the electric device includes a driveshaft having a first end and a second end and disposed along a driveshaft axis; a magnet slide disposed to reciprocate along a magnet slide axis, the magnet slide axis being parallel with but spaced apart from the driveshaft axis, and a first cam mounted on the driveshaft, the first cam comprising a cam hub attached the driveshaft, and a circumferential cam shoulder extending around a periphery of the hub, the cam shoulder having a first cam diameter and a first segmented polynomial shape, the shoulder having at least one lobe formed by the polynomial shape, each lobe characterized by a peak positioned between a first trough and a second trough and a lobe wavelength between the two troughs, the peak having a maximum amplitude for the lobe, where the wavelength distance from the first trough to peak along an ascending shoulder portion of the lobe is greater than the wavelength distance from the peak to the second trough along a descending shoulder portion of the lobe; and a second cam mounted on the driveshaft and spaced apart from the first cam, the second cam comprising a cam hub attached the driveshaft, and a circumferential cam shoulder extending around a periphery of the hub, the cam shoulder having a second segmented polynomial shape which second segmented polynomial shape has a second frequency, the shoulder having at least one lobe formed by the second polynomial shape, each lobe characterized by a peak positioned between a first trough and a second trough and a lobe wavelength between the two troughs, the peak having a maximum amplitude for the lobe, where the wavelength distance from the first trough to peak along an ascending shoulder portion of the lobe is greater than the wavelength distance from the peak to the second trough along a descending shoulder portion of the lobe, wherein the number of lobes of the second cam corresponds with the number of lobes of the first cam; and wherein the cams oppose one another so that the peak of a lobe of the first cam is substantially aligned with the peak of a lobe of the second cam, but no portion of first segmented polynomial shaped shoulder is parallel with a portion of second segmented polynomial shaped shoulder. In other embodiments, the electric device includes a driveshaft having a first end and a second end and disposed along a driveshaft axis; a magnet slide disposed to reciprocate along a magnet slide axis, the magnet slide axis being parallel with but spaced apart from the driveshaft axis, and a first cam mounted on the driveshaft, the first cam comprising a cam hub attached the driveshaft, and a circumferential cam shoulder extending around a periphery of the hub, the cam shoulder having a first cam diameter and a first segmented polynomial shape, the shoulder having at least one lobe formed by the polynomial shape, each lobe characterized by a peak positioned between a first trough and a second trough, the lobe having an ascending shoulder portion between the first trough and the peak and a descending shoulder portion between the peak and the second trough, wherein the average slope of the ascending shoulder portion is greater than the average slope of the descending shoulder portion; and a second cam mounted on the driveshaft and spaced apart from the first cam, the second cam comprising a cam hub attached the driveshaft, and a circumferential cam shoulder extending around a periphery of the hub, the cam shoulder having a second segmented polynomial shape which second segmented polynomial shape has a second frequency, the shoulder having at least one lobe formed by the second polynomial shape, each lobe characterized by a peak positioned between a first trough and a second trough, the lobe having an ascending shoulder portion between the first trough and the peak and a descending shoulder portion between the peak and the second trough, wherein the average slope of the ascending shoulder portion is greater than the average slope of the descending shoulder portion, and wherein the first segmented polynomial shaped shoulder and the second segmented polynomial shaped shoulder oppose one another so as to be constantly diverging or converging from one another.

The following elements may be combined alone or in combination with any other elements for any of the foregoing electric device embodiments:

At least 4 cylinders symmetrically spaced around the driveshaft.

A second stator cylinder having a first end and a second end, the second stator cylinder defined along the coil assembly axis so as to be axially aligned with the first stator cylinder; a third magnet assembly disposed in the first cylinder end of the second stator cylinder; and an opposing fourth magnet assembly disposed in the second cylinder end of the second stator cylinder.

The electric device is an electric motor.

The electric device is an electric alternator.

The first and second frequencies of the cams are the same.

The first and second frequencies of the cams are different.

The third magnet assembly engages the curvilinear shaped shoulder of the second cam.

A third cam mounted on the driveshaft and spaced apart from the second cam, the third cam having a circumferential shoulder of a third curvilinear shape, wherein the fourth magnet assembly engages the curvilinear shaped shoulder of the third cam.

Two or more stator cylinders axially aligned along the central coil assembly, each stator cylinder having a first end and a second end with a magnet assembly disposed in each cylinder end so that magnet slide heads of the magnet assemblies of a cylinder oppose one another within the cylinder.

A first stator cylinder with a first coil density and a second stator cylinder with a second coil density different than the first coil density.

Three or more cams coaxially mounted on the driveshaft and spaced apart from one another, each cam having a cylindrical shoulder of curvilinear shape, wherein each cam positioned between two successive stator cylinders is engaged by a magnet assembly extending from each of the successive stator cylinders.

First, second and third magnet assemblies, each comprising a magnet slide arm having a first end and a second end, with a magnet attached adjacent the first end of the magnet slide arm and a cam follower attached to the second end of the magnet slide arm, wherein the cam follower assembly includes an elongated body having a first end and a second end, wherein the elongated body is generally cylindrically shaped at each end, the elongated body having an axially extending first slot formed in the body adjacent the first end and an axially extending second slot formed in the body adjacent the second; a first roller mounted to the body in first slot; and a second roller mounted to the body in second slot.

The first roller of the first magnet assembly has a larger diameter than the second roller of the first magnet assembly; the first roller of the second magnet assembly has a larger diameter than the second roller of the second magnet assembly; and the first roller of the third magnet assembly is the same diameter as the second roller of the third magnet assembly.

The first roller has a diameter that is larger than the diameter of the second roller.

The windings comprise a plurality of coil loops wrapped around chamber.

The windings comprise a plurality of coil loops substantially perpendicular to cylinder axis and coaxial with cylinder axis.

The first cam comprises a hub mounted on driveshaft with the circumferential shoulder extending around a periphery of hub, the curvilinear shaped first cam shoulder has at least two peaks and at least two troughs formed by the shoulder, wherein each trough includes a substantially flat portion at its base and wherein each peak is rounded at its apex; the second cam comprises a hub mounted on driveshaft with the circumferential shoulder extending around a periphery of hub, the curvilinear shaped second cam shoulder has at least two crests and at least two troughs formed by the shoulder and corresponding in number to the crests and troughs of the first cam, wherein each trough of the second cam is rounded at its base and wherein each peak includes a substantially flat portion at its apex.

The first cam comprises a hub mounted on driveshaft with the circumferential shoulder extending around a periphery of hub, the curvilinear shaped first cam shoulder has at least two peaks having a first peak amplitude and at least two troughs having a first trough amplitude, wherein the first trough amplitude is less than the first peak amplitude; the second cam comprises a hub mounted on driveshaft with the circumferential shoulder extending around a periphery of hub, the curvilinear shaped second cam shoulder has at least two peaks having a second peak amplitude and at least two troughs having a second trough amplitude, wherein the second trough amplitude is greater than the second peak amplitude.

The windings extend along at least a portion of the length of the cylinder between the two ends.

Each set of windings has a coil density.

The second cam has a second cam diameter which second cam diameter is the same as the first cam diameter.

The first peak amplitude is substantially equivalent to the second trough amplitude, and the first trough amplitude is substantially equivalent to the second peak amplitude.

The first and second cams have the same number of peaks and troughs.

The curvilinear shape of the first cam has a curvilinear frequency that is the same as the curvilinear frequency of the curvilinear shape of the second cam.

The amplitude of the curvilinear shaped shoulders of each cam is the same.

The shoulder of each cam has at least four crests and at least four troughs.

Each curvilinear shaped cam shoulder comprises an inwardly facing track and an outwardly facing track.

Each cam includes a cam index and each cam is mounted on the driveshaft and radially indexed with a driveshaft index, wherein the first cam and the second cam have the same curvilinear shape, and wherein one cam is angularly displaced on the driveshaft an angle of between zero and fifteen degrees relative to the other cam.

The angular displacement between the first and second cams is between 0.5 to 11 degrees.

The magnet assembly comprises a magnet slide arm having a first annular guide body of a magnet slide arm diameter spaced apart from a second annular guide body having a similar magnet slide arm diameter and interconnected by a smaller diameter neck, with a magnet disposed on the neck between the first annular guide body and the second annular guide body, and a cam follower attached to the second annular guide body.

The neck is of solid cross-sectional area.

An annulus is formed around the neck between the first and second annular guide bodies, with the magnet disposed in the annulus.

The magnet comprises a plurality of first magnet elements of a first polarity and a plurality of second magnet elements of a second polarity opposite the first polarity, wherein the first magnet elements are interleaved with the second magnet elements along the neck between the first and second annular guide bodies.

A magnet mounted on the neck between the two annular guide bodies.

A plurality of magnet elements disposed along the neck between the two annular guide bodies.

Each annular guide body includes an annular groove formed around annular guide body with a sealing element disposed in the annular groove.

The windings comprise a first electromagnetic coil and a second electromagnetic coil spaced apart from each other along the length of the cylinder.

The magnet assemblies each comprises a magnet slide arm having a first end and a second end, with a magnet attached adjacent the first end of the magnet slide arm.

A first cam follower linked to first and third magnet assemblies and a second cam follower linked to the second and fourth magnet assemblies, each cam follower assembly includes an elongated body having a first end and a second end, wherein the elongated body is generally cylindrically shaped at each end, which ends are interconnected by an arm, the elongated body having an axially extending first slot formed in the body adjacent the first end and an axially extending second slot formed in the body adjacent the second; a first roller mounted to the body in the first slot; and a second roller mounted to the body in the second slot; and wherein the third and fourth magnet assemblies each comprise a magnet slide arm having a first end and a second end, wherein the first cam follower engages the curvilinear shaped shoulder of the first cam and the second cam follower engages the curvilinear shaped shoulder of the second cam.

The magnet assembly comprises a magnet slide arm having a first end and a second end, with a magnet slide attached to the first end of the magnet slide arm and a cam follower attached to the second end of the magnet slide arm, wherein the cam follower assembly includes an elongated body having a first end and a second end, wherein the elongated body is generally cylindrically shaped at each end, which ends are interconnected by an arm within which is formed a lubrication passage extending along a portion of the length of the arm between the two ends, the elongated body having an axially extending first slot in formed in the body adjacent the first end and an axially extending second slot formed in the body adjacent the second; a first roller mounted to the body in the first slot; and a second roller mounted to the body in the second slot, wherein the lubrication passage extends in the arm between the two rollers.

The first cylindrically shaped end of the cam follower assembly is of a first diameter and the second cylindrically shaped end of the cam follower assembly is of a second diameter smaller than the first diameter.

The magnet assembly comprises a magnet slide arm having a first end and a second end, with a magnet slide attached to the first end of the magnet slide arm and a cam follower attached to the second end of the magnet slide arm, wherein the cam follower assembly includes an elongated body having a first end and a second end, wherein the elongated body is generally cylindrically shaped at each end, which ends are interconnected by an arm, the elongated body having an axially extending first slot in formed in the body adjacent the first end and an axially extending second slot formed in the body adjacent the second; a first roller mounted to the body in the first slot; and a second roller mounted to the body in the second slot.

Adjacent magnet elements of the plurality of magnet elements have different polarities.

The windings comprise a first coil between the cylinder first end and inner dead center and a second coil between inner dead center and the cylinder second end.

A port formed in the arm adjacent the first roller and in fluid communication with the lubrication passage, a port formed in the arm adjacent the second roller and in fluid communication with the lubrication passage, and an additional port formed in the elongated cam follower body in fluid communication with the lubrication passage.

A first roller bearing and a second roller bearing, wherein the first port is in fluid communication with the first roller bearing and the second port is in fluid communication with the second roller bearing.

The elongated body has an outer surface and the additional port is formed in the outer surface of the elongated body.

The cylindrically shaped second end of the cam follower body has a bore formed therein.

The cylindrically shaped second end of the cam follower body has a bore formed therein with a radially extending window formed in the second end and intersecting the bore.

The cam follower assembly further comprises a radially adjustable spacer pad mounted on the arm between the first and second rollers and extending inwardly of the arm between the first and second slots.

The first roller has a larger diameter than the second roller.

The first and second slots are formed along a plane and each roller has a rotational axis that is generally parallel with the rotational axis of the other roller and which axii are generally perpendicular to the plane along which the slots are formed.

The cam follower of the magnet assembly engages the curvilinear shaped shoulder of a cam.

Each curvilinear shaped cam shoulder comprises an inwardly facing track facing the stator cylinder and an outwardly facing track facing away from the magnet slide chamber, wherein the first roller bears against the inwardly facing track and the second roller bears against the outwardly facing track.

The adjustable spacer pad bears against the outer edge of the curvilinear shoulder.

The larger diameter first roller bears against the inwardly facing track and the smaller diameter second roller bears against the outwardly facing track.

A guidance cap coaxially mounted around a driveshaft end, outwardly of the cam between the cam and the driveshaft end, wherein the guidance cap comprises a central bore through which the driveshaft extends and two or more symmetrically positioned follower bores radially spaced outward of central bore with each follower bore slidingly receiving the cylindrically shaped second end of a cam follower assembly.

An electric device block in which the driveshaft is supported, the electric device block extending between a first end and a second end and includes an annular guide body portion therebetween, which annular guide body is generally coaxial with the driveshaft, and which annular guide body portion is characterized by an exterior surface, wherein at least one cylinder bore radially spaced apart from the driveshaft but parallel therewith is formed in the electric device block and coaxial with a follower bore of the guidance cap.

The guidance cap comprises at least six symmetrically spaced follower bores, each slidingly receiving the cylindrically shaped second end of a cam follower assembly.

The follower bores are of a diameter less than the bores of the electric device block.

The guidance cap comprises a port formed within the bore disposed to align with the port along the outer surface of the elongated body of the cam follower assembly.

A first guidance cap positioned adjacent the first end of the driveshaft and a second guidance cap positioned adjacent the second end of the driveshaft.

A first link interconnecting the first and third magnet assemblies and a second link interconnecting the second and fourth magnet assemblies.

The first and second magnet assemblies each comprises a magnet slide arm having a first end and a second end, with a magnet slide attached to the first end of the magnet slide arm and a cam follower attached to the second end of the magnet slide arm, wherein the cam follower assembly includes an elongated body having a first end and a second end, wherein the elongated body is generally cylindrically shaped at each end, which ends are interconnected by an arm, the elongated body having an axially extending first slot formed in the body adjacent the first end and an axially extending second slot formed in the body adjacent the second; a first roller mounted to the body in the first slot; and a second roller mounted to the body in the second slot; and wherein the third and fourth magnet assemblies each comprise a magnet slide arm having a first end and a second end, with a magnet slide attached to the first end of the magnet slide arm.

A first link interconnecting the first and third magnet assemblies and a second link interconnecting the second and fourth magnet assemblies.

The first link interconnects the cam follower assembly of the first magnet assembly with the magnet slide arm of the third magnet assembly, and the second link interconnects the cam follower assembly of the second magnet assembly with the magnet slide arm of the fourth magnet assembly.

The first link interconnects the magnet slide arm of the first magnet assembly with the magnet slide arm of the third magnet assembly, and the second link interconnects the magnet slide arm of the second magnet assembly with the magnet slide arm of the fourth magnet assembly.

The cam follower assembly of the first magnet assembly engages the first cam and the cam follower assembly of the second magnet assembly engages the second cam.

A first stator cylinder having a first end and a second end and defined along first coil assembly axis and a second stator cylinder having a first end and a second end and defined along second coil assembly axis, wherein the first and second stator cylinders are serially aligned with one another so the first coil assembly axis is coaxial with the second coil assembly axis.

A first stator cylinder having a first end and a second end and defined along first coil assembly axis and a second stator cylinder having a first end and a second end and defined along second coil assembly axis, each of the first coil assembly axis and second coil assembly axis parallel with but spaced apart from the driveshaft axis, and wherein the first stator cylinder is spaced radially apart from the and second stator cylinder about the driveshaft axis.

A first stator cylinder having a first end and a second end and defined along first coil assembly axis and a second stator cylinder having a first end and a second end and defined along second coil assembly axis, each of the first coil assembly axis and second coil assembly axis parallel with but spaced apart from the driveshaft axis, and wherein the first coil assembly axis is spaced radially outward from the driveshaft axis at a first radius and the second coil assembly axis is spaced radially outward from the driveshaft axis at a second radius greater than the first radius.

A second stator cylinder having a first end and a second end and defined along second coil assembly axis parallel with the first stator cylinder central axis but radially spaced outward from the first stator cylinder central axis; a third cam mounted on the driveshaft between the first cam and the first driveshaft end, the third cam having a circumferential shoulder of a third cam diameter and a third curvilinear shape with a third frequency, the third cam diameter being larger than the first cam diameter; a fourth cam mounted on the driveshaft between the second cam and the second end of the driveshaft, the fourth cam having a circumferential shoulder of a fourth curvilinear shape which fourth curvilinear shape has the same frequency as the third curvilinear shape.

A third magnet assembly disposed in the first cylinder end of the second stator cylinder and an opposing fourth magnet assembly disposed in the second cylinder end of the second stator cylinder, the third magnet assembly engaging the curvilinear shaped shoulder of the third cam and the fourth magnet assembly engaging the curvilinear shaped shoulder of the fourth cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position.

The fourth cam has a fourth cam diameter which fourth cam diameter is the same as the third cam diameter.

The frequency of the third cam is less than the frequency of the first cam.

The curvilinear shaped first cam shoulder of the first cam has at least two peaks having a first peak amplitude and at least two troughs having a first trough amplitude; and the curvilinear shaped third cam shoulder has at least two peaks having a second peak amplitude and at least two troughs having a second trough amplitude, wherein the amplitudes of the third cam shoulder are less than the amplitudes of the first cam shoulder.

Comprising a magnet slide arm having a first end and a second end, with a magnet slide attached to the first end of the magnet slide arm and a cam follower attached to the second end of the magnet slide arm, wherein the cam follower assembly includes an elongated body having a first end and a second end, the elongated body having an axially extending first slot formed in the body adjacent the first end and an axially extending second slot formed in the body adjacent the second; a first roller mounted to the body in first slot; and a second roller mounted to the body in second slot.

The second cam has a second cam diameter which second cam diameter is the same as the first cam diameter.

The curvilinear shape is sinusoidal shape.

The curvilinear shape is a segmented polynomial shape.

The cams are substantially in phase so that the peak of a lobe of the first cam is aligned with and substantially mirrors the peak of a lobe of the second cam.

The cams are substantially in phase so that the peak of each lobe of the first cam is aligned with and substantially mirrors a peak of each lobe of the second cam.

The average slope of the descending shoulder portion is greater than 45 degrees.

Each lobe is asymmetrical about its peak.

A segment of the shoulder shape extending from a peak towards the second trough is linear.

The linear segment of shoulder shape extending from a lobe peak has a slope greater than zero and less than 20 degrees.

Each adjacent lobe has a linear segment of shoulder shape extending from the lobe peak, and the linear segments have a changing slope that is the same.

The slope of the descending shoulder portion of a lobe of the first cam is the same as the slope of the descending shoulder portion of an adjacent lobe of the second cam.

The segmented polynomial shaped shoulder of the first cam has the same shape as the segmented polynomial shaped shoulder of the second cam.

The descending portions of the segmented polynomial shaped shoulder of the first cam have the same shape as the descending portions of the segmented polynomial shaped track of the second cam.

The ascending portions of the segmented polynomial shaped shoulder of the first cam have the same shape as the ascending portions of the segmented polynomial shaped shoulder of the second cam.

The ascending portions of the segmented polynomial shaped shoulder of the first cam have a different shape than the ascending portions of the segmented polynomial shaped shoulder of the second cam.

A first magnet slide is reciprocatingly disposed in the first cylinder end of the stator cylinder and engages the first cam along the first segmented polynomial shaped shoulder, and an opposing second magnet slide is reciprocatingly disposed in the second cylinder end of the stator cylinder and engages the second cam along the second segmented polynomial shaped shoulder.

The first and second segmented polynomial shaped shoulders are symmetric in shape extending from a respective lobe peak to a point along the descending shoulder portion and asymmetric in shape along the shoulders extending from the respective second trough to the lobe peak.

Each cam has a single lobe and the first trough and second trough are the same.

An electric device block in which the driveshaft is supported, the electric device block extending between a first end and a second end and includes an annular guide body portion therebetween, which annular guide body is generally coaxial with the driveshaft, and which annular guide body portion is characterized by an exterior surface, wherein at least one cylinder bore radially spaced apart from the driveshaft but parallel therewith is formed in the electric device block.

A third hydraulic passage extending along the driveshaft to a third outlet and a fourth hydraulic passage extending along the driveshaft to a fourth outlet spaced apart from the third outlet; a magnet slide chamber coaxial with the magnet slide axis and in which the first magnet slide reciprocates; a second magnet slide disposed to reciprocate within the magnet slide chamber opposite the first magnet slide; a third collar formed along the driveshaft adjacent the third outlet and a fourth collar formed along the driveshaft adjacent the fourth outlet, each collar extending radially outward from driveshaft; and a second cam rotatably mounted on the driveshaft adjacent the second and third collars, the second cam having a second hub having a first end mounted adjacent the third collar so as to form a third pressure chamber between the second hub first end and the third collar, with the third outlet in fluid communication with the third pressure chamber, the second hub having a second end mounted adjacent the fourth collar so as to form a fourth pressure chamber between the second hub second end and the fourth collar, with the fourth outlet in fluid communication with fourth pressure chamber, with a circumferential cam shoulder extending around a periphery of the second hub, the cam shoulder having a second cam diameter and a second polynomial shaped track.

A third hydraulic passage extending along the driveshaft and a fourth hydraulic passage extending along the driveshaft, a third set of radial passages in fluid communication with the third hydraulic passage and a fourth set of radial passages in fluid communication with the fourth hydraulic passage; a magnet slide chamber coaxial with the magnet slide axis and in which the first magnet slide reciprocates; a second magnet slide disposed to reciprocate within the magnet slide chamber opposite the first magnet slide; a second cam rotatably mounted on the driveshaft spaced apart from the first cam, the first cam having a second hub with a circumferential cam shoulder extending around a periphery of the second hub, the second cam shoulder having a second cam diameter and a second polynomial shaped track; a third radially extending lug formed along the driveshaft adjacent the second cam hub and a fourth radially extending lug formed along the driveshaft adjacent the second cam hub, a radial passage of the of radial passages terminating in a first ported lug outlet formed in the third lug and a radial passage of the radial passages terminating in a second ported lug outlet formed in the third lug, a radial passage of the third set of radial passages terminating in a third ported lug outlet formed in the fourth lug and a radial passage of the fourth set of radial passages terminating in a fourth ported lug outlet formed in the fourth lug; a first pressure chamber formed between the third lug and the second cam hub and a second pressure chamber formed between the fourth lug and the second cam hub, the first ported lug outlet in the third lug in fluid communication with the first pressure chamber and the third ported lug outlet in the third lug in fluid communication with the second pressure chamber; a third pressure chamber formed between the third lug and the second cam hub; and a fourth pressure chamber formed between the fourth lug and the second cam hub, the second ported lug outlet of the fourth lug in fluid communication with the third pressure chamber and the fourth ported lug outlet in the fourth lug in fluid communication with the fourth pressure chamber.

The first hub comprises a hub wall having spaced apart first and second slots formed along an inner circumference of the hub wall, wherein the first lug extends into the first slot and the second lug extends into the second slot.

The first slot has a first shoulder and a second shoulder, the first pressure chamber being formed between the first shoulder and the first lug and the second pressure chamber being formed between the second shoulder and the first lug, wherein the second slot has a third shoulder and a fourth shoulder, the third pressure chamber being formed between the third shoulder and the second lug and the fourth pressure chamber being formed between the fourth shoulder and the second lug.

The first cam is rotatable relative to the driveshaft between a first radial position and a second radial position, wherein the first pressure chamber has a volume that is greater than a volume of the second pressure chamber when the first cam is in the first radial position and the second pressure chamber has a volume that is greater than the volume of the first pressure chamber when the first cam is in the second radial position.

A hydraulic fluid source in fluid communication with each of hydraulic passages to alternatively supply pressurized fluid to one pressure chamber or another pressure chamber.

A control mechanism and a sensor, the sensor disposed to measure a condition of the electric device and coupled to the control mechanism disposed to adjust the fluid source based on the measured condition in order to radially rotate the first cam relative to the driveshaft.

Each lug is integrally formed as part of driveshaft.

A first magnet assembly, at least a portion of which is disposed in the first cylinder end of the first stator cylinder, the first magnet assembly engaging the curvilinear shaped shoulder of the first cam, the first magnet assembly axially movable within the magnet slide chamber; and a first magnet carried by the portion of the first magnet assembly disposed in the first stator cylinder.

A second stator cylinder defined along a second coil assembly axis and adjacent the first cam, the stator cylinder having a first end and a second end with windings disposed along at least a portion of the second stator cylinder between the first and second ends and about the second coil assembly axis, the second coil assembly axis being parallel with but spaced apart from the driveshaft axis approximately the distance of the first cam radius, wherein a magnet slide chamber is defined within the second stator cylinder between the two cylinder ends of the second stator cylinder.

The first coil assembly axis and the second coil assembly axis are coaxial with one another, wherein the first stator cylinder is adjacent the first surface of the first cam and the second stator cylinder is adjacent the second surface of the cam.

The first coil assembly axis and the second coil are radially spaced apart from one another about the driveshaft axis.

The magnet comprises one or more permanent magnets.

The magnet is an electromagnet.

The magnet comprises energizable electromagnetic windings or coil.

A first magnet assembly, at least a portion of which is disposed in the first cylinder end of the first stator cylinder, the first magnet assembly engaging the curvilinear shaped shoulder of the first cam, the first magnet assembly axially movable within the magnet slide chamber; a first magnet carried by the portion of the first magnet assembly disposed in the first stator cylinder; a second magnet assembly, at least a portion of which is disposed in the first cylinder end of the second stator cylinder, the second magnet assembly engaging the curvilinear shaped shoulder of the first cam, the second magnet assembly axially movable within the magnet slide chamber of the second stator cylinder; and a second magnet carried by the portion of the second magnet assembly disposed in the second stator cylinder.

The magnet assembly comprises a magnet slide arm having a first end and a second end, with the magnet attached adjacent the first end of the magnet slide arm and a cam follower assembly attached to the second end of the magnet slide arm, wherein the cam follower assembly includes an elongated body having a first end and a second, which ends are interconnected by an arm so as to form an opening in the elongated body between the two ends; an engagement mechanism mounted to the body at one of the ends and adjacent the slot, wherein a cam shoulder extends into the opening and the engagement mechanism bears against one of the cam surfaces.

The magnet slide arm comprises a first annular guide body of a magnet slide arm diameter spaced apart from a second annular guide body having a similar magnet slide arm diameter, the two annular guide bodies interconnected by a smaller diameter neck; wherein the magnet is disposed along the neck between the two annular guide bodies; and wherein the magnet comprises a plurality of discreet magnets arranged along the neck in an alternating magnetic polarity configuration; and wherein the cam follower body has an axially extending first slot in formed in the body adjacent the first end and an axially extending second slot formed in the body adjacent the second, and comprising two engagement mechanisms, wherein one engagement mechanism is a first roller mounted to the body in the first slot; and the other engagement mechanism a second roller mounted to the body in the second slot, wherein the first roller bears against the first surface of the shoulder and the second roller bears against the opposing second surface of the roller.

A second cam mounted on the driveshaft, the second cam having a cam hub attached to the driveshaft and a circumferential second cam shoulder extending around a periphery of the second cam hub, the cam shoulder of the second cam having a second cam radius and a second curvilinear shape with a first surface and an opposing second surface, the second cam shoulder having at least two lobes formed by the second curvilinear shape, each lobe characterized by a peak positioned between a first trough and a second trough and a lobe wavelength between the two troughs, the peak having a maximum amplitude for the lobe.

The second cam radius is approximately the same as the first cam radius, wherein the second cam is spaced apart from the first cam and the first stator cylinder is positioned between the first and second cams so that the first cam is adjacent the first end of the stator cylinder and the second cam is adjacent the second end of the stator cylinder.

A second stator cylinder defined along a second coil assembly axis and adjacent the second cam, the second stator cylinder having a first end and a second end with windings disposed along at least a portion of the second stator cylinder between the first and second ends and about the second coil assembly axis, the second coil assembly axis being parallel with but spaced apart from the driveshaft axis approximately the distance of the second cam radius, wherein a magnet slide chamber is defined within the second stator cylinder between the two cylinder ends of the second stator cylinder.

The second cam radius is larger than the first cam radius and the second stator cylinder is spaced radially outward from the first stator cylinder.

The windings comprise a first coil adjacent the first end of the stator cylinder and a second coil adjacent the second end of the stator cylinder.

An electrical inverter electrically connected to the windings of the stator cylinder and a power source electrically connected to the electrical inverter.

A second stator cylinder having a first end and a second end and defined along second coil assembly axis parallel with the first stator cylinder central axis but radially spaced outward from the first stator cylinder central axis with windings disposed along at least a portion of the second stator cylinder between the first and second ends of the second stator cylinder; a third cam mounted on the driveshaft between the first cam and the first driveshaft end, the third cam having a circumferential shoulder of a third cam diameter and a third curvilinear shape with a third frequency, the third cam diameter being larger than the first cam diameter; a fourth cam mounted on the driveshaft between the second cam and the second end of the driveshaft, the fourth cam having a circumferential shoulder of a fourth cam diameter and a fourth curvilinear shape with a fourth frequency, the fourth cam diameter being the same as the third cam diameter; a third magnet assembly disposed in the first cylinder end of the second stator cylinder and an opposing fourth magnet assembly disposed in the second cylinder end of the second stator cylinder, the third magnet assembly engaging the curvilinear shaped shoulder of the third cam and the fourth magnet assembly engaging the curvilinear shaped shoulder of the fourth cam, each magnet assembly movable between an inner dead center position in which the magnet assembly is extended in the magnet slide chamber away from its corresponding cam and an outer dead center position in which the magnet assembly is retracted in the magnet slide chamber away from the inner dead center position.

Each magnet assembly comprises a magnet slide arm having a first end and a second end, with a magnet attached adjacent the first end of the magnet slide arm and a cam follower assembly attached to the second end of the magnet slide arm, wherein the cam follower assembly includes an elongated body having a first end and a second, which ends are interconnected by an arm so as to form an opening in the elongated body between the two ends; an engagement mechanism mounted to the body at one of the ends and adjacent the slot, wherein a cam shoulder extends into the opening and the engagement mechanism bears against one of the cam surfaces.

The magnet slide arm comprises a first annular guide body of a magnet slide arm diameter spaced apart from a second annular guide body having a similar magnet slide arm diameter, the two annular guide bodies interconnected by a smaller diameter neck; wherein the magnet is disposed along the neck between the two annular guide bodies; and wherein the magnet comprises a plurality of discreet magnets arranged along the neck in an alternating magnetic polarity configuration.

The cam follower body has an axially extending first slot in formed in the body adjacent the first end and an axially extending second slot formed in the body adjacent the second, and comprising two engagement mechanisms, wherein one engagement mechanism is a first roller mounted to the body in the first slot; and the other engagement mechanism a second roller mounted to the body in the second slot, wherein the first roller bears against the first surface of the shoulder and the second roller bears against the opposing second surface of the roller.

A plurality of stator cylinders radially spaced apart from one another about the driveshaft axis, each stator cylinder defined along a coil assembly axis, each stator cylinder positioned between the two cams, each stator cylinder having a first end and a second end with windings disposed along at least a portion of the stator cylinder between the first and second ends and about the coil assembly axis of the stator cylinder, each coil assembly axis being parallel with but spaced apart from the driveshaft axis approximately the distance of the first cam radius, wherein a magnet slide chamber is defined within each stator cylinder between its two cylinder ends; a plurality of first magnet assemblies, each first magnet assembly having at least a portion of which is disposed in the first cylinder end of a stator cylinder, each first magnet assembly engaging the curvilinear shaped shoulder of the first cam, each first magnet assembly axially movable within the magnet slide chamber of the stator cylinder into which first magnet assembly extends; a first magnet carried by the portion of each first magnet assembly disposed in a cylinder end; a plurality of second magnet assemblies, each second magnet assembly having at least a portion of which is disposed in the second cylinder end of a stator cylinder, each second magnet assembly engaging the curvilinear shaped shoulder of the second cam, each second magnet assembly axially movable within the magnet slide chamber of the stator cylinder into which second magnet assembly extends; and a second magnet carried by the portion of each second magnet assembly disposed in a cylinder end.

A second magnet assembly defined along a second coil assembly axis and adjacent the first cam, the second coil assembly axis being parallel with but spaced apart from the driveshaft axis approximately the distance of the first cam radius, the second magnet assembly engaging the curvilinear shaped shoulder of the first cam, the second magnet assembly axially movable along the second coil assembly axis, wherein each magnet assembly comprises a magnet slide arm having a first end and a second end, with a magnet attached adjacent the first end of each magnet slide arm, each magnet slide arm having at least one annular guide body of a magnet slide arm diameter and a smaller diameter neck extending from the annular guide body with the magnet disposed along the neck, and wherein each magnet assembly further comprises a cam follower assembly attached to the second end of each magnet slide arm, wherein each cam follower assembly includes an elongated body having a first end and a second, which ends are interconnected by an arm so as to form an opening in the elongated body between the two ends; an engagement mechanism mounted to the body at one of the ends and adjacent the slot, wherein a cam shoulder extends into the opening and the engagement mechanism of each cam follower assembly bears against one of the cam surfaces.

A first cam follower assembly coupled to the first magnet assembly and engaging the first cam and a second cam follower assembly coupled to the second magnet assembly and engaging the second cam, each cam follower assembly comprising an elongated body having a first end and a second end, wherein the elongated body is generally cylindrically shaped at each end, the elongated body having an axially extending first slot formed in the body adjacent the first end and an axially extending second slot formed in the body adjacent the second; a first roller mounted to the body in the first slot; and a second roller mounted to the body in the second slot.

The cam follower assembly comprises an elongated body having a first end and a second end, the elongated body having a radially extending notch formed in the elongated body between the first end and the second end, the cam follower assembly engaging the a cam so that the curvilinear shaped shoulder of the cam extends into the notch of the cam follower assembly.

A second cam mounted on the driveshaft, the second cam having a cam hub attached to the driveshaft and a circumferential second cam shoulder extending around a periphery of the second cam hub, the cam shoulder of the second cam having a second cam radius and a second curvilinear shape with a first surface and an opposing second surface, the second cam shoulder having at least two lobes formed by the second curvilinear shape, each lobe characterized by a peak positioned between a first trough and a second trough and a lobe wavelength between the two troughs, the peak having a maximum amplitude for the lobe; a second magnet assembly defined along a second coil assembly axis and adjacent the first cam, the second coil assembly axis being parallel with but spaced apart from the driveshaft axis approximately the distance of the second cam radius, the second magnet assembly engaging the curvilinear shaped shoulder of the second cam, the second magnet assembly axially movable along the second coil assembly axis, wherein each magnet assembly comprises a magnet slide arm having a first end and a second end, with a magnet attached adjacent the first end of each magnet slide arm, each magnet slide arm having at least one annular guide body of a magnet slide arm diameter and a smaller diameter neck extending from the annular guide body with the magnet disposed along the neck, and wherein each magnet assembly further comprises a cam follower assembly attached to the second end of each magnet slide arm, wherein each cam follower assembly includes an elongated body having a first end and a second, which ends are interconnected by an arm so as to form an opening in the elongated body between the two ends; an engagement mechanism mounted to the body at one of the ends and adjacent the slot, wherein a cam shoulder extends into the opening and the engagement mechanism of each cam follower assembly bears against one of the cam surfaces.

A second magnet slide arm having a first end and a second end, with a magnet attached adjacent the first end of the second magnet slide arm, the second magnetic slide arm having at least one annular guide body of a magnet slide arm diameter and a smaller diameter neck extending from the annular guide body with the magnet disposed along the neck, and wherein the second end of the second magnet slide arm attaches to the cam follower assembly so that the first and second magnet slide arms are axially aligned along the first coil assembly axis.

The electric device is an electric alternator.
The electric device is an electric motor.
The first and second frequencies of the cams are the same.
The first and second frequencies of the cams are different.
A clutch disposed along driveshaft between cams and disposed to engage and disengage the driveshaft electric power assembly and the driveshaft.

The electric power assembly is mounted radially outward from the driveshaft and adjacent at least one cam as a radial electric power assembly.

The electric power assembly is mounted along the driveshaft between the two cams as an axial electric power assembly.

Thus, a method for operating an electric device has been described. In one or more embodiments, the method may include the steps of reciprocating a magnetic slide arm through a coil chamber along a coil assembly axis; rotating a driveshaft about an axis parallel with the coil assembly axis; and utilizing a cam mounted on the driveshaft and engaging the magnetic slide arm to translate a first motion of one of the magnetic slide arm or driveshaft into a second motion of the other of the driveshaft or magnetic slide arm, where one motion is a reciprocal motion and the other motion is a rotational motion. In some embodiments, the method is utilized to generate an electrical output of an electric alternator and includes the steps of rotating an input driveshaft about an axis; utilizing the driveshaft to rotate a cam about the axis; utilizing the cam to urge a magnetic slide to axially reciprocate parallel to the driveshaft; generating an electrical output based on the reciprocating motion of the magnetic slide. In one or more embodiments, the method of operating an electric device is utilized to drive a driveshaft of an electric motor and includes energizing a set of coils with an electrical input; utilizing the electrical input to urge a magnetic slide to reciprocate along an axis; converting reciprocating motion of the slide into circular motion of a cam; and utilizing the circular motion of the cam to drive a driveshaft extending along an axis parallel with the axis of the magnetic slide. In another embodiment, the method includes energizing coils disposed about a magnet slide chamber to urge axially aligned magnet slides of an electric motor to move relative to one another so as to drive spaced apart cams mounted on a driveshaft parallel with the axially aligned magnet slide; measuring a condition of the electric motor while the electric motor is operating; and rotating at least one of the cams on the driveshaft from a first radial position to a second radial position while the electric motor is operating, the second radial position selected based on the measured condition of the electric motor. In one or more embodiments, the method is utilized to generate an electrical output and includes the steps of providing rotational motion to a driveshaft; converting rotational motion of the driveshaft to undulating motion of a cam; converting undulating motion of a cam to reciprocating axial motion of a magnetic slide; guiding the reciprocating magnetic slide through magnetic coils to generate an electrical output.

In one or more embodiments, the method is utilized to generate an electrical output of an electric alternator and includes the steps of providing rotational motion to a driveshaft; converting rotational motion of the driveshaft to undulating motion of a first cam and simultaneously converting rotational motion of the driveshaft to undulating motion of a second cam; converting undulating motion of the first cam to reciprocating axial motion of a first magnetic slide and simultaneously converting undulating motion of the second cam to reciprocating axial motion of a second magnetic slide; reciprocating the first and second magnetic slides along the same axis; guiding each reciprocating magnetic slide through magnetic coils to generate an electrical output. In other embodiments, the method is utilized to operate an electric motor by energizing a first set of coils associated with a first stator cylinder and a first cam with a first number of lobes to drive a driveshaft at a first RPM speed; and thereafter, energizing a second set of coils associated with a second stator cylinder and a second cam with a second number of lobes to drive the driveshaft at a second RPM speed different from the first RPM speed.

The following steps may be combined alone or in combination with any other steps for any of the foregoing embodiments:

Wherein the electric device is an electrical generator, wherein first motion is rotational motion of the driveshaft and the second motion is reciprocal motion of the magnetic slide arm, and further comprising generating an electrical output by rotating the driveshaft about the driveshaft axis; utilizing the first motion to rotate the cam about the driveshaft axis; utilizing the rotating cam to urge a magnetic slide arm to axially reciprocate parallel to the driveshaft; generating an electrical output based on the reciprocating motion of the magnetic slide arm in the coil chamber.

Wherein the electrical device is a motor, wherein the first motion is reciprocal motion of the magnetic slide arm and the second motion is rotational motion of the driveshaft, and further comprising alternating a current in electromagnetic windings about the coil chamber; utilizing the alternating current to induce the first motion in the magnetic slide arm; utilizing the first motion to drive a cam mounted on the driveshaft; and utilizing the cam driven by the first motion to rotate the driveshaft.

Altering the radial position relative to the driveshaft of at least one cam on the driveshaft based on the desired output of the driveshaft.

Altering the radial position relative to the driveshaft of at least one cam on the driveshaft based on the desired electrical output of the electric alternator.

Rotating comprises injecting a fluid into a fluid chamber adjacent the cam while the electric device is operating in order to alter the relative radial position of the cam on the driveshaft.

The fluid is injected through a channel formed in the driveshaft.

Injecting a hydraulic fluid into a first fluid chamber while the electric device is operating to alter the radial position of a cam relative to the driveshaft in a first direction; measuring an additional condition of the electric device while the electric device is operating and based on the measured additional condition, injecting a hydraulic fluid into a second fluid chamber while the electric device is operating to alter the radial position of the cam relative to the driveshaft in a second direction opposite the first direction.

The first and second magnet slides are in phase as the cam followers move along their respective cams from the first position to the second position, and the first and second magnet slides are out of phase as the cam followers move along their respective cams from the second position through the third, fourth and fifth positions back to the first position.

The second magnet slide leads the first magnet slide when the magnet slides are out of phase.

The magnet slides are continually moving within the stator cylinder during operation of the electric device.

The electric device is an electric alternator.

The electric device is an electric motor.

The magnet slides have a divergence rate as the cam followers move from the first position to the third position and a convergence rate as the cam followers move from the fourth position back to the first position, wherein the divergence rate of the magnet slides at the beginning of movement of the cam followers from the first position to the second position on their respective cams is uniform and occurs at a first divergence rate, and thereafter continued divergence of the magnet slides as movement of the cam followers continues from the first position to the second position on their respective cams is uniform and occurs at a second divergence rate higher than the first divergence rate.

Thus, a method for operating an electric device has been described. The method includes energizing one or more power generation assemblies spaced apart from a driveshaft to increase the torque output of the electric device and energizing a driveshaft electric power assembly positioned on the driveshaft and radially inward of power generation assemblies to increase the speed output of the electric device. In other embodiments, the method includes dynamically alternating between energizing one or more power generation assemblies spaced apart from a driveshaft and energizing a driveshaft electric power assembly positioned on the driveshaft, radially inward of power generation assemblies. In other embodiments, the method includes energizing one or more first set of linearly aligned power generation assemblies to produce a first power output of the electric device and energizing one or more second set of linearly aligned power generation assemblies to produce a second power output of the electric device.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

The invention claimed is:

1. An electric device comprising:
 a driveshaft having a first end and a second end and disposed along a driveshaft axis;
 a driveshaft electric power assembly disposed about the driveshaft axis and colinear with the driveshaft axis, wherein the driveshaft electric power assembly comprises a stator assembly and a rotor assembly; and
 a power generation assembly defined along a power generation assembly axis, the power generation assembly axis being parallel with but spaced apart from the driveshaft axis and radially outward from the driveshaft electric power assembly.

2. The electric device of claim 1, wherein the power generation assembly is one of a plurality of power generation assemblies each having a power generation assembly axis and each power generation assembly axis being parallel with but spaced apart from the driveshaft axis.

3. The electric device of claim 2, wherein each power generation assembly comprises at least one magnet and at least one set of windings.

4. The electric device of claim 3, wherein each set of windings is carried by a stator cylinder defined along the power generation assembly axis, the stator cylinder having a first end and a second end with windings disposed along at least a portion of the stator cylinder between the first and second ends and about the power generation assembly axis; and wherein each magnet of each power generation assembly is disposed on a magnet assembly axially movable within the stator cylinder along the power generation assembly axis.

5. The electric device of claim 1, wherein the power generation assembly is one of at least three power generation assemblies each having a power generation assembly axis and each power generation assembly axis being parallel with but spaced apart from the driveshaft axis, wherein the at least three power generation assemblies are symmetrically spaced apart from one another about the driveshaft axis.

6. The electric device of claim 1, wherein the power generation assembly is one of at least two power generation assemblies disposed along the power generation assembly axis, but axially spaced apart from one another along the power generation assembly axis.

7. The electric device of claim 6, wherein each power generation assembly comprises at least one magnet and at least one set of windings, wherein each set of windings is carried by a stator cylinder defined along the power generation assembly axis, each stator cylinder having a first end and a second end with windings disposed along at least a portion of the stator cylinder between the first and second ends and about the power generation assembly axis; and wherein each magnet of each power generation assembly is disposed on a magnet slide assembly axially movable within one of the stator cylinders along the power generation assembly axis.

8. The electric device of claim 1, wherein the power generation assembly is one of at least six power generation assemblies each having a power generation assembly axis and each power generation assembly axis being parallel with but spaced apart from the driveshaft axis, wherein the at least six power generation assemblies are symmetrically spaced apart from one another about the driveshaft axis.

9. The electric device of claim 1, wherein the rotor assembly is attached to the driveshaft.

10. The electric device of claim 1, wherein the rotor assembly comprises a magnet.

11. An electric device comprising:
a driveshaft having a first end and a second end and disposed along a driveshaft axis;
a driveshaft electric power assembly disposed about the driveshaft axis and colinear with the driveshaft axis, the driveshaft electric power assembly comprising a rotor assembly affixed to the driveshaft and a stator assembly encircling the driveshaft and radially outward of the rotor assembly; and
a plurality of power generation assemblies disposed about the driveshaft axis radially outward from the driveshaft electric power assembly, each power generation assembly defined along a power generation assembly axis that is parallel with but spaced radially apart from the driveshaft axis, wherein each power generation assembly comprises at least one set of windings carried by a stator cylinder defined along the power generation assembly axis, the stator cylinder having a first end and a second end with the windings disposed along at least a portion of the stator cylinder between the first and second ends and about the power generation assembly axis, and each power generation assembly further comprising at least one magnet disposed on a magnet slide assembly axially movable within one of the stator cylinders along the power generation assembly axis.

12. An electric device comprising:
a driveshaft having a first end and a second end and disposed along a driveshaft axis;
a first cam mounted on the driveshaft, the first cam having a first cam hub attached to the driveshaft and a first circumferential cam shoulder extending around a periphery of the first cam hub, the first circumferential cam shoulder having a first cam radius and a first curvilinear shape with a first surface and an opposing second surface, the first circumferential cam shoulder having at least two lobes formed by the first curvilinear shape, each lobe characterized by a peak positioned between a first trough and a second trough and a lobe wavelength between the two troughs, the peak having a maximum amplitude for the lobe;
a power generation assembly defined along a power generation assembly axis, the power generation assembly axis being parallel with but spaced apart radially outward from the driveshaft axis and movably coupled to the first cam;
a first hydraulic passage extending from one of the first and second driveshaft ends to a first outlet and a second hydraulic passage extending from one of the first and second driveshaft ends to a second outlet spaced apart from the first outlet;
a first pressure chamber formed by the first cam hub adjacent the driveshaft and a second pressure chamber formed by the first cam hub adjacent the driveshaft, the second pressure chamber spaced apart and separate from the first pressure chamber, wherein the first outlet is in fluid communication with the first pressure chamber and the second outlet is in fluid communication with the second pressure chamber.

13. The electric device of claim 12, wherein, the first hydraulic passage is an axial hydraulic passage formed in the driveshaft and the second hydraulic passage is an axial hydraulic passage formed in the driveshaft;
wherein a first radial passage is formed in the driveshaft in fluid communication with the first axial hydraulic passage and a second radial passage is formed in the driveshaft in fluid communication with the second axial hydraulic passage;
wherein the first cam is rotatably mounted on the driveshaft;
wherein a first radially extending lug is formed along the driveshaft adjacent the first cam hub, the first outlet formed in the first radially extending lug and the second outlet formed in the first radially extending lug and spaced apart from the first outlet;
wherein the first pressure chamber is formed between the first radially extending lug and the first cam hub and the second pressure chamber is formed between the first radially extending lug and the first cam hub; and
wherein the first outlet is in fluid communication with the first pressure chamber and the second outlet is in fluid communication with the second pressure chamber.

14. The electric device of claim 13, further comprising:
a third radial passage in fluid communication with the first axial hydraulic passage and a fourth radial passage in fluid communication with the second axial hydraulic passage;
a second radially extending lug formed along the driveshaft adjacent the first cam hub, the third radial passage terminating in a third ported lug outlet formed in the second radially extending lug and the fourth radial passage terminating in a fourth ported lug outlet formed in the second radially extending lug and spaced apart from the third ported lug outlet;
a third pressure chamber formed between the second radially extending lug and the first cam hub and a fourth pressure chamber spaced apart from the third pressure chamber and formed between the second radially extending lug and the first cam hub, the third ported lug outlet in the second lug in fluid communication with the third pressure chamber and the fourth ported lug outlet in the second lug in fluid communication with the fourth pressure chamber.

15. The electric device of claim 12, further comprising a first lug extending radially from the driveshaft; and wherein the first cam hub has a hub wall defining an inner circumference with a first slot formed along a portion of the inner circumference of the hub wall to form a first slot shoulder and a second slot shoulder, the first lug extending into the first slot between the first and second slot shoulders so that the first pressure chamber is formed between the first lug and the first slot shoulder and the second pressure chamber is formed between the first lug and the second slot shoulder.

16. The electric device of claim 15, further comprising:
- a second lug extending radially from the driveshaft; and wherein a second slot is formed along a portion of the inner circumference of the hub wall to form a third slot shoulder and a fourth slot shoulder, the second lug extending into the second slot between the third and fourth slot shoulders;
- a third pressure chamber formed between the second lug and the third slot shoulder and a fourth pressure chamber formed between the second lug and the fourth slot shoulder;
- a third outlet in fluid communication with the third pressure chamber and first hydraulic passage; and
- a fourth outlet in fluid communication with the fourth pressure chamber and second hydraulic passage.

17. The electric device of claim 12, further comprising a first collar formed along the driveshaft adjacent a first end of the first cam hub, with the first pressure chamber formed between the first collar and the driveshaft; and a second collar formed along the driveshaft adjacent a second end of the first cam hub, with the second pressure chamber formed between the second collar and the driveshaft.

18. The electric device of claim 12, further comprising a first collar formed along the driveshaft adjacent the first outlet and a second collar formed along the driveshaft adjacent the second outlet, each collar extending radially outward from driveshaft; the first cam rotatably mounted on the driveshaft adjacent the first and second collars, the first cam hub having a first hub end mounted adjacent the first collar so as to form the first pressure chamber between the first hub end and the first collar, the first cam hub having a second hub end mounted adjacent the second collar so as to form the second pressure chamber between the second hub end and the second collar.

19. The electric device of claim 12, further comprising a plurality of power generation assemblies, each power generation assembly defined along a power generation assembly axis that is parallel with but spaced radially outward from the driveshaft axis, each power generation assembly movably coupled to the first cam, wherein each power generation assembly comprises at least one set of windings carried by a stator cylinder defined along the power generation assembly axis, the stator cylinder having a first end and a second end with the windings disposed along at least a portion of the stator cylinder between the first and second ends and about the power generation assembly axis; and each power generation assembly further comprising at least one magnet disposed on a magnet slide assembly axially movable within the stator cylinder along the power generation assembly axis.

* * * * *